(12) United States Patent
Yamamoto et al.

(10) Patent No.: US 10,075,845 B2
(45) Date of Patent: Sep. 11, 2018

(54) AUTHENTICATION SYSTEM, TERMINAL APPARATUS, AND AUTHENTICATION METHOD

(71) Applicants: Kohji Yamamoto, Kanagawa (JP); Minako Sakurai, Kanagawa (JP)

(72) Inventors: Kohji Yamamoto, Kanagawa (JP); Minako Sakurai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/335,056

(22) Filed: Oct. 26, 2016

(65) Prior Publication Data

US 2017/0127278 A1 May 4, 2017

(30) Foreign Application Priority Data

Oct. 29, 2015 (JP) .................. 2015-213347
Nov. 20, 2015 (JP) .................. 2015-228145

(51) Int. Cl.
*H04M 1/725* (2006.01)
*H04W 12/06* (2009.01)
(Continued)

(52) U.S. Cl.
CPC ....... *H04W 12/06* (2013.01); *H04M 1/72577* (2013.01); *H04W 4/023* (2013.01); *H04W 12/04* (2013.01)

(58) Field of Classification Search
CPC ........... G06Q 20/3276; G06Q 20/3829; G06Q 20/40; H04W 12/06; H04W 12/04;
(Continued)

(56) References Cited

U.S. PATENT DOCUMENTS 7,684,783 B1 * 3/2010 Vacon .................. H04W 12/06
370/338
8,924,712 B2 * 12/2014 Varadarajan ....... G06Q 20/3276
713/155
(Continued)

FOREIGN PATENT DOCUMENTS

JP 2010-218186 9/2010
JP 2014-128928 7/2014
(Continued)

*Primary Examiner* — Olumide T Ajibade Akonai
(74) *Attorney, Agent, or Firm* — Oblon, McClelland, Maier & Neustadt, L.L.P.

(57) ABSTRACT

An authentication system includes: an information processing apparatus configured to acquire, from a read result of an authentication image indicating authentication information, the authentication information; and a terminal apparatus configured to communicate with the information processing apparatus. The terminal apparatus includes: a communication unit configured to perform wireless communication with the information processing apparatus; a first determining unit configured to determine whether the terminal apparatus is positioned within a second communication range in which a distance from the information processing apparatus is a threshold or less, within a first communication range that enables wireless communication with the information processing apparatus; and a display controller configured to perform control to display an authentication screen containing the authentication image on a display unit when it is determined that the terminal apparatus is positioned within the second communication range.

18 Claims, 29 Drawing Sheets

(51) Int. Cl.
*H04W 4/02* (2018.01)
*H04W 12/04* (2009.01)

(58) Field of Classification Search
CPC .............. H04W 12/08; H04L 2209/80; H04L 63/0876; H04L 63/08; H04L 51/24; G07C 9/00571
USPC ................................................. 455/410, 411
See application file for complete search history.

(56) References Cited

U.S. PATENT DOCUMENTS

| | | | |
|---|---|---|---|
| 2005/0037734 A1* | 2/2005 | Tanaka | H04W 12/06 455/411 |
| 2010/0317323 A1* | 12/2010 | Facemire | H04L 63/0492 455/411 |
| 2013/0244615 A1* | 9/2013 | Miller | H04W 12/06 455/411 |
| 2016/0006745 A1* | 1/2016 | Furuichi | G06F 21/31 726/28 |
| 2016/0147994 A1* | 5/2016 | Lu | H04L 63/0492 726/26 |
| 2016/0381251 A1 | 12/2016 | Shimazaki | |

FOREIGN PATENT DOCUMENTS

| | | |
|---|---|---|
| JP | 2014-222460 | 11/2014 |
| JP | 2017-010417 | 1/2017 |

\* cited by examiner

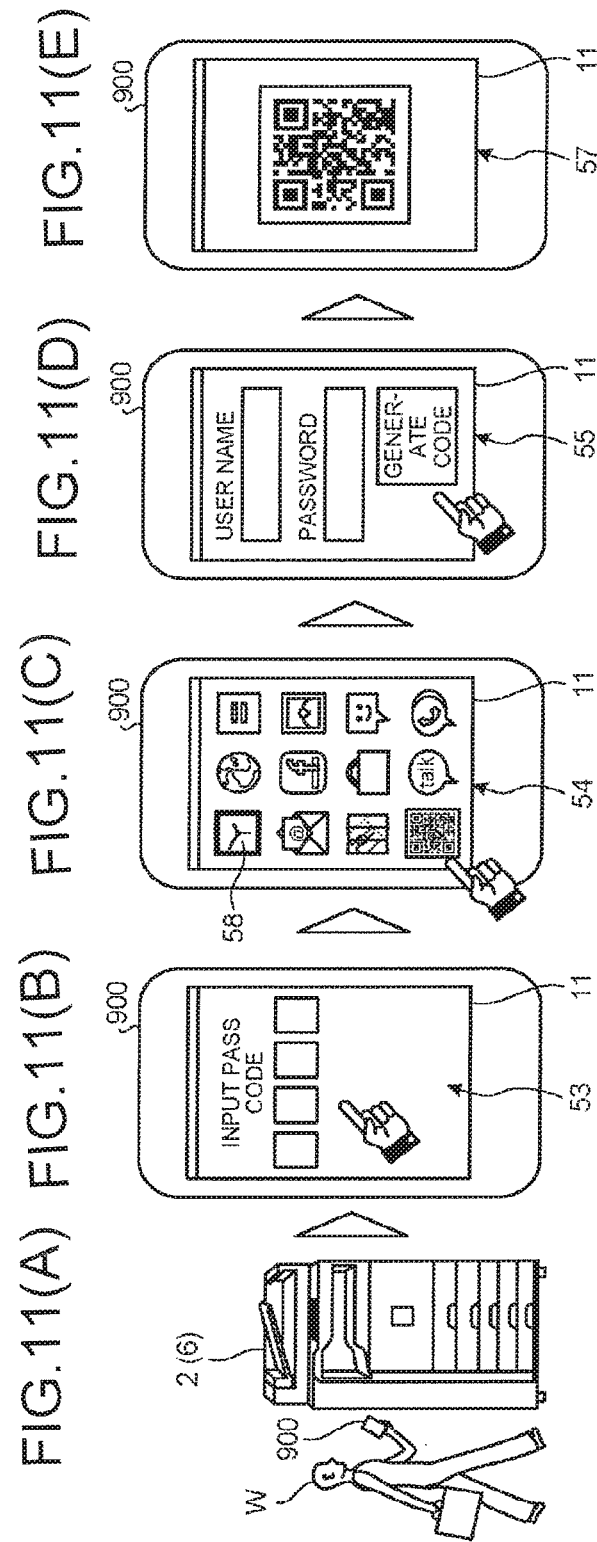

| DISPLAY POSITION INFORMATION (X, Y) | APID | DISPLAY SIZE INFORMATION | EXCLUSION AFFIRMATIVE/ NEGATIVE INFORMATION | DISPLAY POSITION CHANGE AFFIRMATIVE/ NEGATIVE INFORMATION |
|---|---|---|---|---|
| (1, 1) | A | 1×1 | AFFIRMATIVE | - |
| (2, 1) | B | 1×1 | AFFIRMATIVE | - |
| (3, 1) | C | 1×1 | NEGATIVE | NEGATIVE |
| (1, 2) | D | 1×1 | AFFIRMATIVE | - |
| (2, 2) | E | 1×1 | AFFIRMATIVE | - |
| (3, 2) | F | 1×1 | AFFIRMATIVE | - |
| (1, 3) | G | 1×1 | NEGATIVE | AFFIRMATIVE |
| (2, 3) | H | 1×1 | NEGATIVE | AFFIRMATIVE |
| (3, 3) | I | 1×1 | NEGATIVE | AFFIRMATIVE |
| (1, 4) | J | 1×1 | NEGATIVE | AFFIRMATIVE |
| (2, 4) | K | 1×1 | NEGATIVE | AFFIRMATIVE |
| (3, 4) | L | 1×1 | NEGATIVE | AFFIRMATIVE |

FIG.15(A)
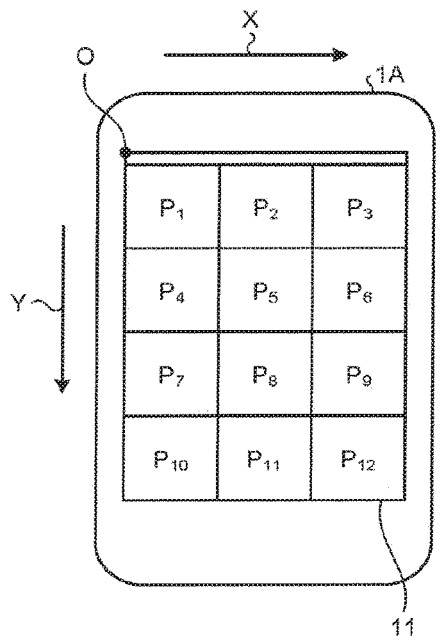
FIG.15(B)
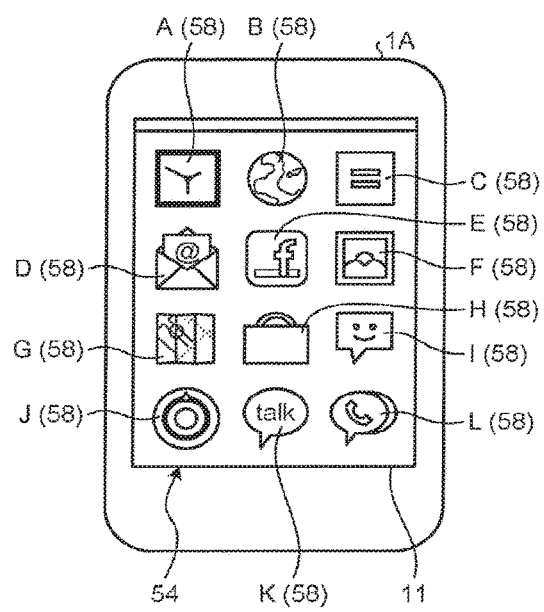
FIG.16
| AUTHENTI-CATION IMAGE DATA | TYPE INFORMA-TION | DATA AMOUNT [NUMBER OF CHARAC-TERS] | DISPLAY SIZE INFORMA-TION | INFORMATION PROCESSING APPARATUS ID |
|---|---|---|---|---|
| X | 2 | 20 | 2×2 | a, b |
| Y | 3 | 50 | 3×3 | d |

| DISPLAY POSITION INFORMATION (X, Y) | APID | DISPLAY SIZE INFORMATION | EXCLUSION AFFIRMATIVE/ NEGATIVE INFORMATION | DISPLAY POSITION CHANGE AFFIRMATIVE/ NEGATIVE INFORMATION |
|---|---|---|---|---|
| (1, 1) | A | 1×1 | AFFIRMATIVE | - |
| (2, 1) | B | 1×1 | AFFIRMATIVE | - |
| (3, 1) | C | 1×1 | NEGATIVE | NEGATIVE |
| (1, 2) | D | 1×1 | AFFIRMATIVE | - |
| (2, 2) | E | 1×1 | AFFIRMATIVE | - |
| (3, 2) | F | 1×1 | AFFIRMATIVE | - |
| (1, 3) | G | 1×1 | NEGATIVE | AFFIRMATIVE |
| (1, 4) | J | 1×1 | NEGATIVE | AFFIRMATIVE |

| DISPLAY POSITION INFORMATION (X, Y) | APID |
|---|---|
| (1, 1) | A |
| (2, 1) | B |
| (3, 1) | C |
| (1, 2) | D |
| (2, 2) | E |
| (3, 2) | F |
| (1, 3) | G |
| (2, 3) | QR |
| (3, 3) | QR |
| (1, 4) | J |
| (2, 4) | QR |
| (3, 4) | QR |

| DISPLAY POSITION INFORMATION (X, Y) | APID |
|---|---|
| (1, 1) | QR |
| (2, 1) | QR |
| (3, 1) | C |
| (1, 2) | QR |
| (2, 2) | QR |
| (3, 2) | F |
| (1, 3) | G |
| (2, 3) | H |
| (3, 3) | I |
| (1, 4) | J |
| (2, 4) | K |
| (3, 4) | L |

FIG.26
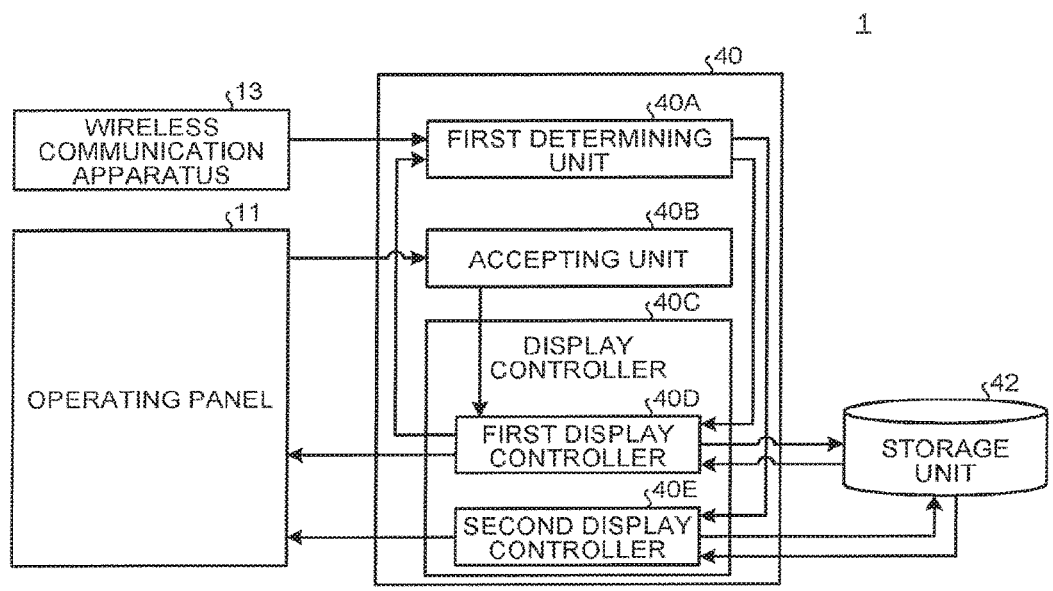
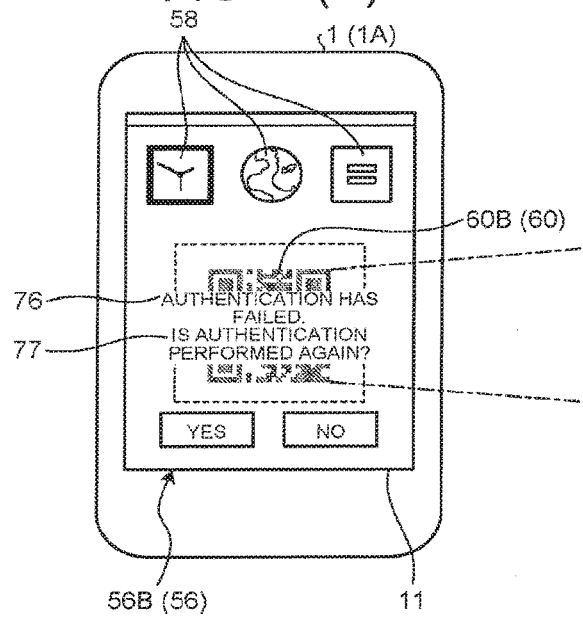
FIG.27(A)
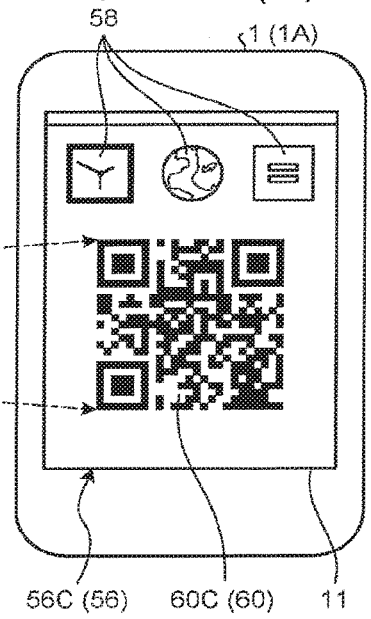
FIG.27(B)

AUTHENTICATION SYSTEM, TERMINAL APPARATUS, AND AUTHENTICATION METHOD

CROSS-REFERENCE TO RELATED APPLICATIONS

The present application claims priority under 35 U.S.C. § 119 to Japanese Patent Application No. 2015-213347, filed Oct. 29, 2015 and Japanese Patent Application No. 2015-228145, filed Nov. 20, 2015. The contents of which are incorporated herein by reference in their entirety.

BACKGROUND OF THE INVENTION

1. Field of the Invention

The present invention relates to an authentication system, a terminal apparatus, and an authentication method.

2. Description of the Related Art

A technique is known that causes a terminal apparatus such as a smartphone to display an authentication image such as a QR code (registered trademark) and causes a device to read the authentication image as a mechanism of authentication.

Techniques have conventionally been disclosed that read a displayed QR code by an information processing apparatus such as an image forming apparatus to perform authentication (refer to Japanese Unexamined Patent Application Publication No. 2010-218186 and Japanese Unexamined Patent Application Publication No. 2014-222460, for example).

However, a plurality of types of operation input by a user have conventionally been required in order to cause a display unit of a terminal apparatus to display an authentication image. For this reason, operability when the authentication image is displayed has conventionally been bad.

Techniques have conventionally been disclosed that read a QR code (registered trademark) displayed on a portable terminal apparatus by an information processing apparatus such as an image forming apparatus to perform authentication (refer to Japanese Unexamined Patent Application Publication No. 2014-222460 and Japanese Unexamined Patent Application Publication No. 2014-128928, for example).

However, the terminal apparatus may continuously display the authentication image even after the authentication image is read, which may leak the authentication image.

SUMMARY OF THE INVENTION

According to one aspect of the present invention, there is provided an authentication system including: an information processing apparatus configured to acquire, from a read result of an authentication image indicating authentication information, the authentication information; and a terminal apparatus configured to communicate with the information processing apparatus, the terminal apparatus including: a communication unit configured to perform wireless communication with the information processing apparatus; a first determining unit configured to determine whether the terminal apparatus is positioned within a second communication range in which a distance from the information processing apparatus is a threshold or less, within a first communication range that enables wireless communication with the information processing apparatus; and a display controller configured to perform control to display an authentication screen containing the authentication image on a display unit when it is determined that the terminal apparatus is positioned within the second communication range.

According to another aspect of the present invention, there is provided a terminal apparatus including: a communication unit configured to perform wireless communication with an information processing apparatus that acquires, from a read result of an authentication image indicating authentication information, the authentication information; a first determining unit configured to determine whether the terminal apparatus is positioned within a second communication range in which a distance from the information processing apparatus is a threshold or less, within a first communication range that enables wireless communication with the information processing apparatus; and a display controller configured to perform control to display an authentication screen containing the authentication image on a display unit when it is determined that the terminal apparatus is positioned within the second communication range.

According to still another aspect of the present invention, there is provided an authentication method performed by a terminal apparatus, the method including: performing wireless communication with an information processing apparatus that acquires, from a read result of an authentication image indicating authentication information, the authentication information; determining whether the terminal apparatus is positioned within a second communication range in which a distance from the information processing apparatus is a threshold or less, within a first communication range that enables wireless communication with the information processing apparatus; and performing control to display an authentication screen containing the authentication image on a display unit when it is determined that the terminal apparatus is positioned within the second communication range.

BRIEF DESCRIPTION OF THE DRAWINGS

FIGS. 11(A) to 11(E) are schematic diagrams of screen transitions in a conventional terminal apparatus;

FIG. 14 is a diagram of an example of a data configuration of setting information;

FIGS. 15(A) and 15(B) are explanatory diagrams of a display position;

FIG. 16 is a diagram of an example of a data configuration of an authentication image DB;

FIGS. 17(A) and 17(B) are diagrams of examples of data structures of setting information and arrangement information;

FIG. 20 is a diagram of an example of a data configuration of the arrangement information;

FIG. 26 is a block diagram of a functional configuration example of a terminal apparatus according to the second embodiment;

FIGS. 27(A) and 27(B) are schematic diagrams of an example of a screen transition of an operating panel according to the second embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
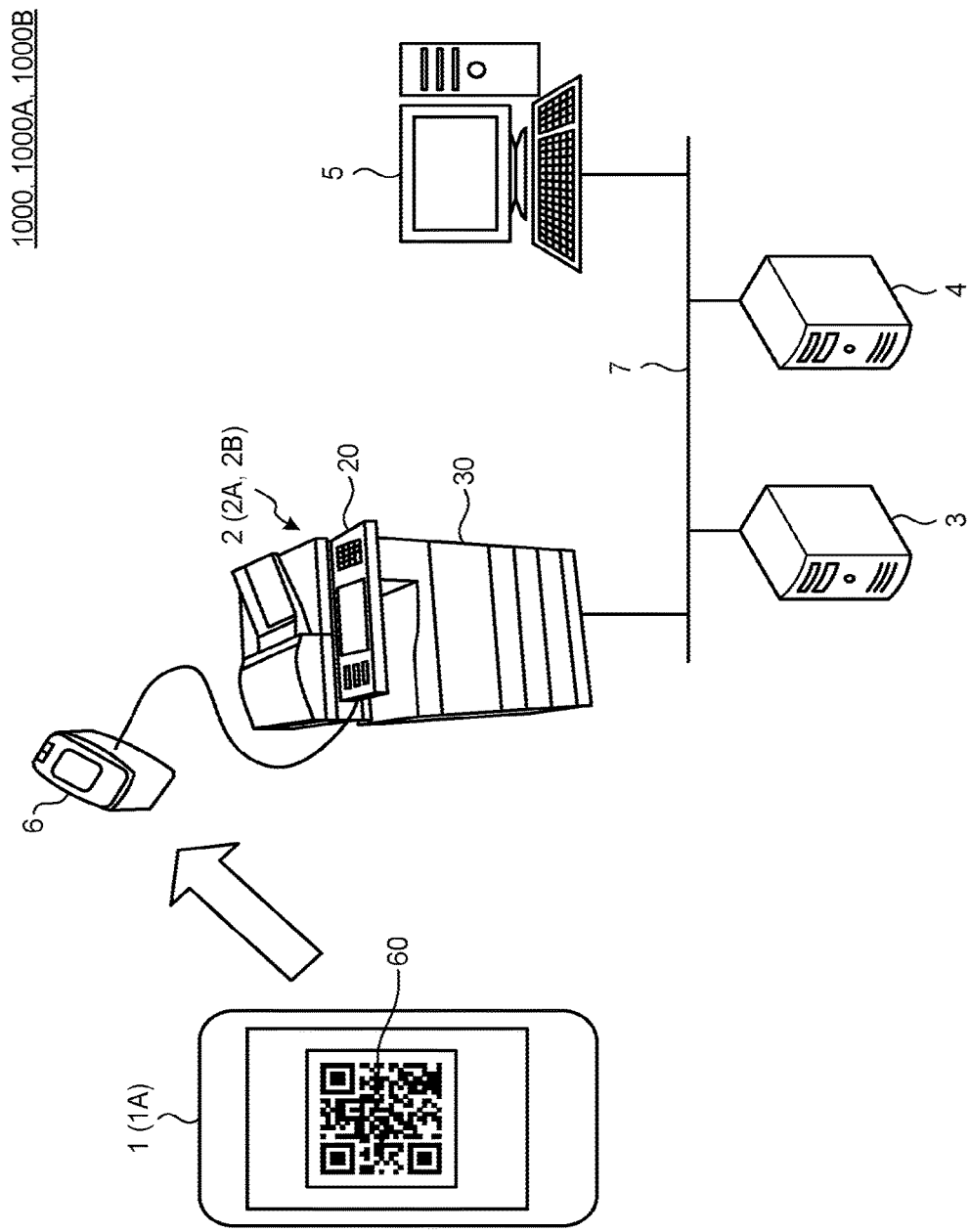
FIG. 1 is a schematic diagram of an example of a configuration of an authentication system.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The following describes embodiments for performing the present invention.

First Embodiment

The following describes embodiments of an authentication system, a terminal apparatus, and a computer program of the present embodiment in detail with reference to the accompanying drawings. Although the following describes a case in which an information processing apparatus is used for a multifunction peripheral (MFP) (hereinafter, referred to as an MFP) as an example, this is not limiting. The multifunction peripheral is an apparatus having at least two functions among a printing function, a copying function, a scanning function, and a facsimile function.

In the present specification, parts indicating the same configuration and function are denoted by the same symbols, and a detailed description thereof may be omitted.

First Embodiment

FIG. 1 is a schematic diagram of an example of a configuration of an authentication system 1000 of the present embodiment.

The authentication system 1000 of the present embodiment includes a terminal apparatus 1, an information processing apparatus 2, an authentication server 3, a print server 4, and a personal computer (PC) 5.

The information processing apparatus 2, the authentication server 3, the print server 4, and the PC 5 are connected to each other via a network 7 so as to enable data and the like to be exchanged with each other.

The authentication system 1000 may include at least the terminal apparatus 1 and the information processing apparatus 2.

The terminal apparatus 1 is an apparatus portable by a user. The terminal apparatus 1 is a smartphone, a tablet terminal, or a cellular phone, for example. The terminal apparatus 1 may be an apparatus that has a display function and is portable.

In the present embodiment, the terminal apparatus 1 displays an authentication image 60.

The authentication image 60 is an image indicating authentication information. The authentication image 60 is a two-dimensional code such as a QR code or a one-dimensional code such as a bar code, for example. The present embodiment describes a case in which the authentication image 60 is a QR code as an example.

The authentication information is information used when an authentication request is made to the information processing apparatus 2. The authentication information contains one or a plurality of types of user identification information. The user identification information is information that can identify a user. The user identification information contains a user name, a password, an answer to a secret question, and a department to which one belongs, for example. The authentication information may contain the user identification information of a type required at the time of authentication by the information processing apparatus 2 as an object to which the authentication request is made. It is assumed that the type of the user identification information required at the time of authentication by the information processing apparatus 2 is the user name and the password, for example. In this case, the authentication information may be information containing at least the user name and the password.

The information processing apparatus 2 acquires the authentication information from a read result of the authentication image 60 displayed on the terminal apparatus 1. The information processing apparatus 2 performs user authentication (details will be described below) using the authentication information. When permitting the execution of a function provided in the information processing apparatus 2 as a result of performing the user authentication, the information processing apparatus 2 permits the execution of the function provided in the information processing apparatus 2 for the user.

Examples of the function provided in the information processing apparatus 2 include a copying function, a scanner function, a facsimile function, and a printing function.

The information processing apparatus 2 is only required to be an apparatus having a function of performing the user authentication and is not limited to the MFP. The information processing apparatus 2 may be a storage server, an information display apparatus (a projector, a TV set, a display, or an electronic blackboard), or a teleconference apparatus, for example.

A reading device 6 is electrically connected to the information processing apparatus 2. The information processing apparatus 2 and the reading device 6 are connected to each other via a Universal Serial Bus (USB) cable, for example. The information processing apparatus 2 and the reading device 6 are arranged close to each other to the extent that they are regarded as the same position. For this reason, the following description will be given based on the premise that the position of the information processing apparatus 2 and the position of the reading device 6 in the real space are the same. The information processing apparatus 2 may include the reading device 6.

The reading device 6 reads the authentication image 60 and outputs authentication image data, which is the read result, to the information processing apparatus 2. The reading device 6 is a QR code reader or a scanner apparatus, for example.

The user holds the authentication image 60 displayed on the terminal apparatus 1 over an image reading face of the reading device 6, for example. The reading device 6 then reads the authentication image 60 displayed on the terminal apparatus 1 and outputs the authentication image data of the read authentication image 60 to the information processing apparatus 2 as the read result. The information processing apparatus 2 acquires the authentication information indicated by the authentication image 60 using the authentication image data acquired from the reading device 6.

The authentication server 3 receives the authentication information from the information processing apparatus 2 and performs authentication processing (details will be described below). The authentication server 3 then transmits an authentication result to the information processing apparatus 2. The PC 5 transmits a print job containing the print data of an object to be printed to the print server 4. The print server 4 stores therein the print job received from the PC 5.

When permitting the execution of the function of the information processing apparatus 2, the information processing apparatus 2 displays a list of print jobs stored in the print server 4, for example. The information processing apparatus 2 then executes a print job selected by an operation instruction by the user or the like.

At least one function of the print server 4 and the authentication server 3 may be installed in the information processing apparatus 2.

Figure 2:
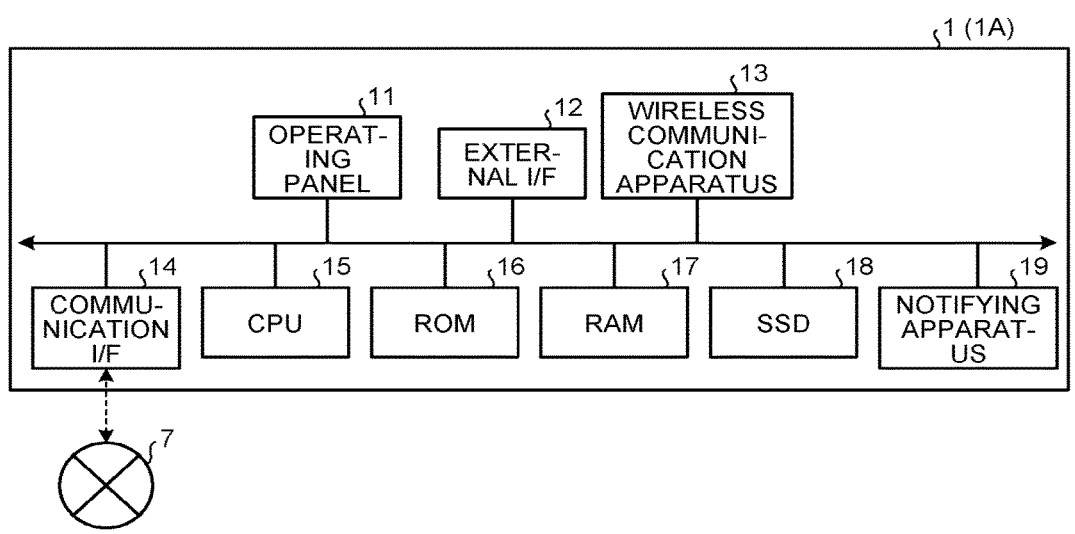
FIG. 2 is a schematic diagram of an example of a hardware configuration of a terminal apparatus.

The following describes an example of a hardware configuration of the terminal apparatus 1. FIG. 2 is a schematic diagram of an example of the hardware configuration of the terminal apparatus 1.

The terminal apparatus 1 includes an operating panel 11, an external interface (I/F) 12, a wireless communication apparatus 13, a communication I/F 14, a central processing unit (CPU) 15, a read only memory (ROM) 16, a random access memory (RAM) 17, a solid state drive (SSD) 18, and a notifying apparatus 19.

The operating panel 11, the external I/F 12, the wireless communication apparatus 13, the communication I/F 14, the CPU 15, the ROM 16, the RAM 17, the SSD 18, and the notifying apparatus 19 are connected to each other via a bus.

The CPU 15 comprehensively controls the operation of the terminal apparatus 1. The CPU 15 executes computer programs stored in the ROM 16, the SSD 18, or the like with the RAM 17 as a work area, thereby controlling the operation of the entire terminal apparatus 1 and implementing various kinds of functional units described below.

The SSD 18 stores therein computer programs, data, and the like. The terminal apparatus 1 may include a hard disk drive (HDD) in place of the SSD 18.

The operating panel 11 accepts various kinds of input corresponding to operations by the user and displays various kinds of information and various kinds of images such as a standard screen and an authentication screen described below.

The present embodiment describes a case in which the operating panel 11 is a touch panel integrally including both an accepting function that accepts the various kinds of input and a display function that displays the various kinds of information. However, the configuration of the operating panel 11 is not limited to such a configuration. The operating panel 11 may separately include an input apparatus that accepts the various kinds of input and a display apparatus that displays the various kinds of information, for example. The display function of the operating panel 11 corresponds to a display unit of the present invention.

The external I/F 12 is an interface for communicating with an external memory such as a recording medium.

The wireless communication apparatus 13 is a communication apparatus for communicating with an external apparatus by wireless communication. In the present embodiment, the wireless communication apparatus 13 is a communication apparatus for performing wireless communication with the information processing apparatus 2. The wireless communication apparatus 13 corresponds to a communication unit of the present invention.

The wireless communication apparatus 13 performs communication in line with a communication standard such as Bluetooth (registered trademark), for example. In the present embodiment, a communication distance by the wireless communication apparatus 13 is particularly preferably in the range of 3 meters or more and 5 meters or less. The present embodiment describes a case in which a maximum wirelessly communicable distance by the wireless communication apparatus 13 is 5 meters as an example. However, the maximum wirelessly communicable distance is not limited to 5 meters.

The maximum wirelessly communicable distance by the wireless communication apparatus 13 may be able to be adjusted as appropriate. The maximum wirelessly communicable distance by the wireless communication apparatus 13 may be adjusted as appropriate by the installation position of the information processing apparatus 2, for example. Specifically, when the information processing apparatus 2 is installed near a passage through which users pass, the maximum wirelessly communicable distance is preferably adjusted (adjusted to be reduced) so as not to cause all terminal apparatuses 1 carried by the users to be wirelessly communicated. A desired distance may vary among the users. For this reason, the maximum wirelessly communicable distance may be able to be set by the terminal apparatuses 1.

The communication I/F 14 is an interface for communicating with an external apparatus via the network 7.

The notifying apparatus 19 is an apparatus for notifying the user of various kinds of information. The notifying apparatus 19 is a vibrator, a speaker, or a light, for example.

Figure 3:
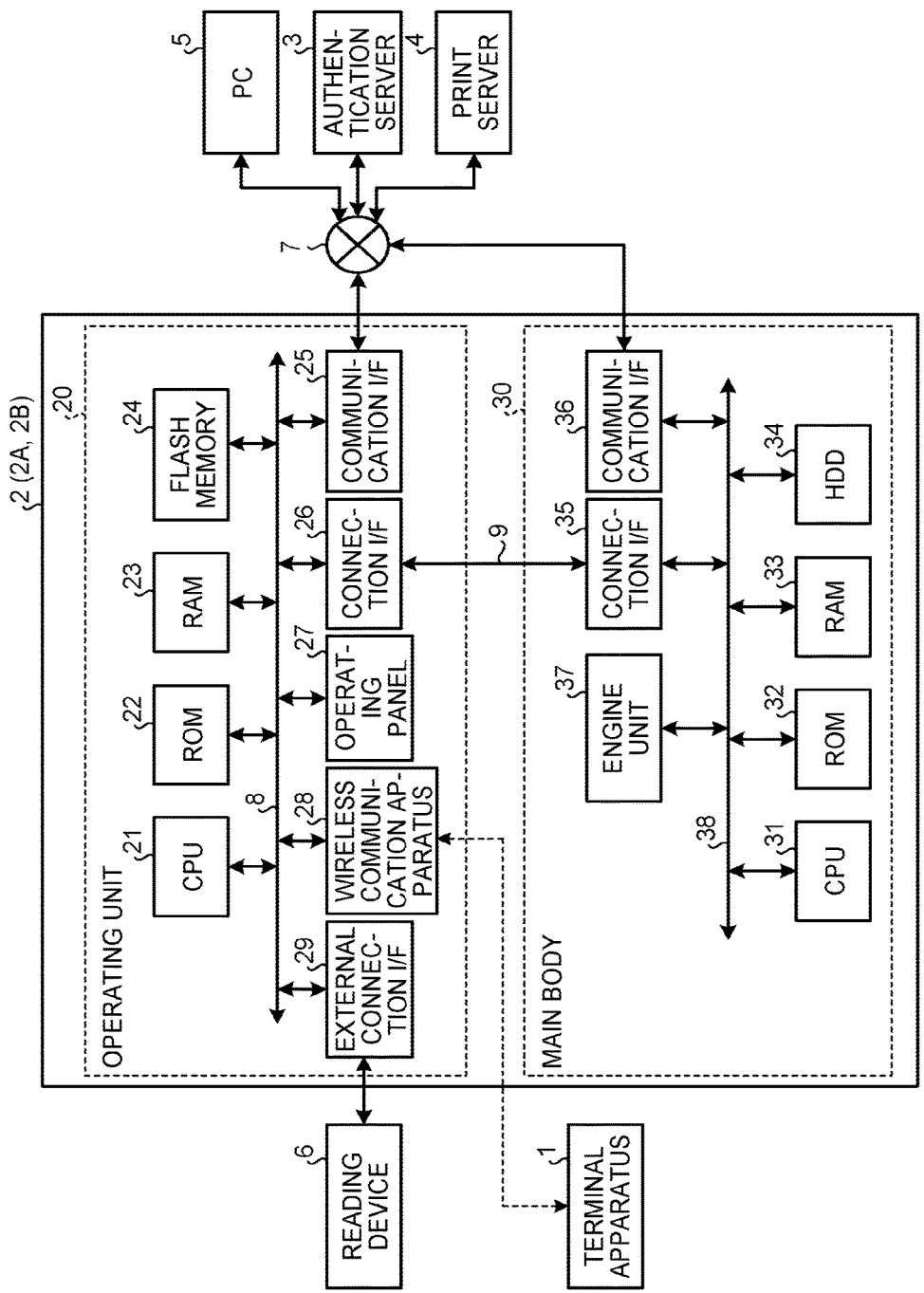
FIG. 3 is a schematic diagram of an example of a hardware configuration of an information processing apparatus.

The following describes an example of a hardware configuration of the information processing apparatus 2. FIG. 3 is a schematic diagram of an example of the hardware configuration of the information processing apparatus 2.

The information processing apparatus 2 includes a main body 30 and an operating unit 20. The main body 30 and the operating unit 20 are mutually communicably connected via an exclusive communication path 9. For the communication path 9, one conforming to the Universal Serial Bus (USB) standard is used, for example. The communication path 9 may be either wired or wireless. The communication path 9 may be a network such as the Internet, a telephone line, or the like. The authentication server 3 and the main body 30 are connected to each other via the network 7 such as the Internet.

The main body 30 is an apparatus that can implement various kinds of functions such as a copying function, a scanner function, a fax function, and a printer function. The main body 30 includes a CPU 31, a ROM 32, a RAM 33, an HDD 34, a connection I/F 35, a communication I/F 36, and an engine unit 37. The engine unit 37, the CPU 31, the ROM 32, the RAM 33, the HDD 34, the connection I/F 35, and the communication I/F 36 are connected to each other via a system bus 38.

The engine unit 37 executes the various kinds of functions such as the copying function, the scanner function, the fax function, and the printer function. The engine unit 37 is hardware that performs general-purpose processing and processing other than communication for implementing the various kinds of functions such as the copying function, the scanner function, the fax function, and the printer function. The engine unit 37 includes a scanner (an image reading unit) that reads document images, a plotter (an image forming unit) that performs printing on a sheet material such as paper, and a fax unit that performs fax communication, for example. The engine unit 37 can further include specific options such as a finisher that sorts printed sheet materials and an automatic document feeder (ADF) that automatically feeds documents.

The CPU 31 comprehensively controls the operation of the main body 30. The CPU 31 executes computer programs stored in the ROM 32, the HOD 34, or the like with the RAM 33 as a work area, thereby controlling the operation of the entire main body 30. With this control, the CPU 31 causes the engine unit 37 to execute the copying function, the scanner function, the fax function, the printer function, and the like.

The connection I/F 35 is an interface for communicating with the operating unit 20 via the communication path 9. The communication I/F 36 is an interface for communicating with the print server 4 or an external apparatus via the network 7.

The following describes the operating unit 20. The operating unit 20 accepts input corresponding to operations by the user. The operating unit 20 includes an original operating system (OS) and a screen transition mechanism. The main body 30 performs operations corresponding to the input received by the operating unit 20.

The operating unit 20 includes a CPU 21, a ROM 22, a RAM 23, a flash memory 24, a communication I/F 25, a connection I/F 26, an operating panel 27, a wireless communication apparatus 28, and an external connection I/F 29, which are connected to each other via a bus 8.

The CPU 21 comprehensively controls the operation of the operating unit 20. The CPU 21 executes computer programs stored in the ROM 22, the flash memory 24, or the like with the RAM 23 as a work area, thereby controlling the operation of the entire operating unit 20. With the execution of the computer programs, the CPU 21 implements various kinds of functions described below.

The connection I/F 26 is an interface for communicating with the main body 30 via the communication path 9.

The operating panel 27 accepts various kinds of input corresponding to operations by the user and displays various kinds of information and various kinds of images. The present embodiment describes a case in which the operating panel 27 is a touch panel integrally including both an accepting function that accepts the various kinds of input and a display function that displays the various kinds of information. However, the configuration of the operating panel 27 is not limited to such a configuration. The operating panel 27 may separately include an input apparatus that accepts the various kinds of input and a display apparatus that displays the various kinds of information, for example.

The wireless communication apparatus 28 is a communication apparatus for communicating with an external apparatus by wireless communication. In the present embodiment, the wireless communication apparatus 28 communicates with the terminal apparatus 1 by wireless communication. The wireless communication apparatus 28 performs communication in accordance with a communication standard such as Bluetooth (registered trademark), for example.

In the present embodiment, a maximum communicable distance by the wireless communication apparatus 28 is similar to that of the wireless communication apparatus 13 provided in the terminal apparatus 1. In other words, the maximum communicable distance of the wireless communication apparatus 28 can preferably be adjusted as appropriate by the installation position of the information processing apparatus 2 or the like similarly to the wireless communication apparatus 13 of the terminal apparatus 1. In an environment in which a plurality of information processing apparatuses 2 are installed, for example, when the information processing apparatuses 2 are installed at relatively close positions, the distance is reduced, whereby the interference of wireless ranges can be prevented. For this reason, the maximum wirelessly communicable distance in the information processing apparatus 2 can preferably be adjusted as appropriate.

Figure 4:
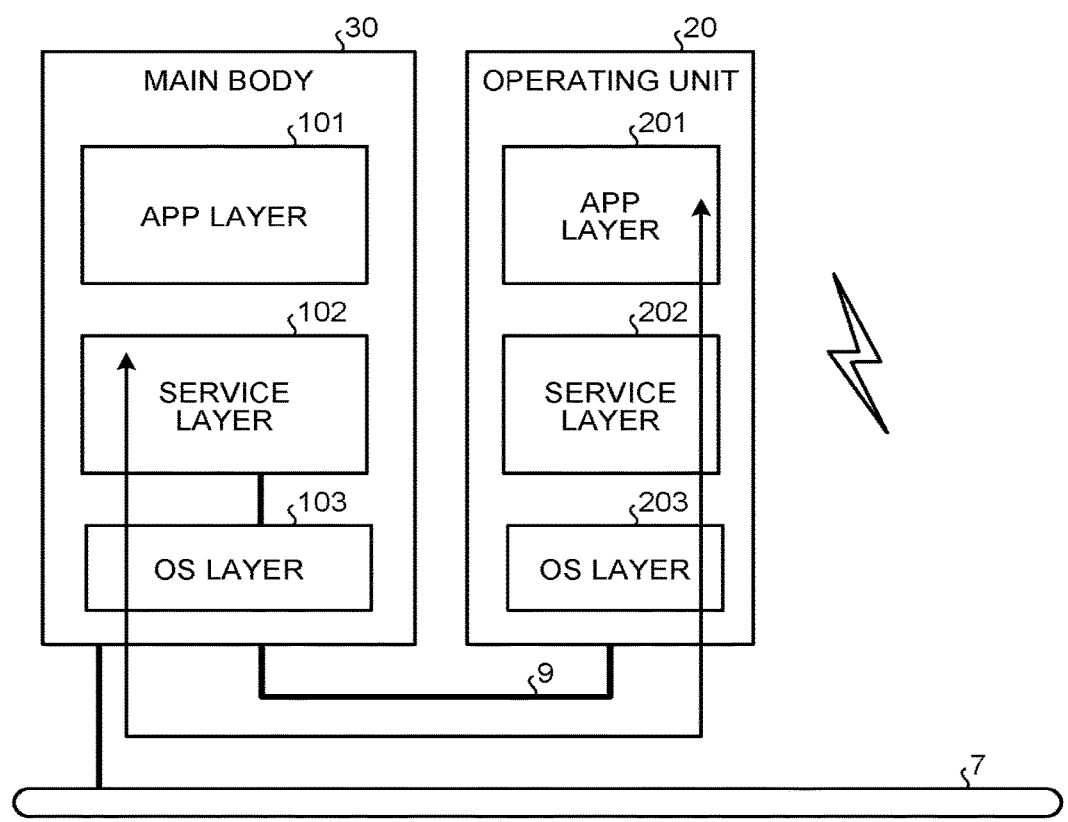
FIG. 4 is a schematic diagram of an example of a software configuration of the information processing apparatus.

The following describes a software configuration of the information processing apparatus 2. FIG. 4 is a schematic diagram of an example of the software configuration of the information processing apparatus 2.

The main body 30 includes an app layer 101, a service layer 102, and an OS layer 103. The entities of the app layer 101, the service layer 102, and the OS layer 103 are various kinds of software stored in the ROM 32, the HDD 34, or the like. The CPU 31 executes these pieces of software, thereby providing various kinds of functions.

The software of the app layer 101 is an application program (may be referred to simply as an "app" in the following description) for operating hardware resources to provide certain functions. Examples of the app include a copy app for providing a copying function, a scanner app for providing a scanner function, a fax app for providing a fax function, and a printer app for providing a printer application.

The software of the service layer 102 is software that is interposed between the app layer 101 and the OS layer 103 to provide the app with an interface for using the hardware resources of the main body 30. More specifically, the software of the service layer 102 is software for providing the function of performing the acceptance of operation requests to the hardware resources and the arbitration of the operation requests. Examples of the operation requests that the service layer 102 accepts include requests for reading by a scanner and printing by a plotter.

The function of the interface by the service layer 102 is not only provided to the app layer 101 of the main body 30 but also to an app layer 201 of the operating unit 20. In other words, the app layer 201 (app) of the operating unit 20 can also implement functions using the hardware resources (the engine unit 37, for example) of the main body 30 via the interface function of the service layer 102.

The software of the OS layer 103 is basic software (an operating system) for providing basic functions that control the hardware of the main body 30. The software of the service layer 102 converts requests for using the hardware resources from the various kinds of apps into commands that the OS layer 103 can interpret and delivers the requests to the OS layer 103. The software of the OS layer 103 executes the commands, thereby causing the hardware resources to perform operations corresponding to the requests by the apps.

Similarly, the operating unit 20 includes the app layer 201, a service layer 202, and an OS layer 203. The app layer 201, the service layer 202, and the OS layer 203 of the operating unit 20 are similar to the main body 30 in their hierarchical structure. However, functions provided by the app of the app layer 201 and the types of operation requests that the service layer 202 can accept are different from those of the main body 30. Although the app of the app layer 201 may be software that operates the hardware resources of the operating unit 20 to provide certain functions, it is software for mainly providing the function of a user interface (UI) for performing operations and display about the functions (the copying function, the scanner function, the fax function, and the printer function) of the main body 30 and the like.

In the present embodiment, in order to maintain functional independency, the software of the OS layer 103 of the main body 30 and the software of the OS layer 203 of the operating unit 20 are different from each other. In other words, the main body 30 and the operating unit 20 operate independently of each other on separate operating systems. Linux (registered trademark) can be used for the software of the OS layer 103 of the main body 30, whereas Android (registered trademark) can be used for the software of the OS layer 203 of the operating unit 20, for example.

As described above, in the present embodiment, the main body 30 and the operating unit 20 operate on separate operating systems. Consequently, the communication between the main body 30 and the operating unit 20 is performed not as inter-process communication within the common apparatus but as communication between different apparatuses. The communication includes processing (command communication) to transfer input (instruction contents from the user) that the operating unit 20 has accepted to the main body 30 and processing in which the main body 30 reports an event to the operating unit 20. In the present embodiment, the operating unit 20 performs command communication with the main body 30 and can thereby use the functions of the main body 30. Examples of the event reported from the main body 30 to the operating unit 20 include an operation execution state in the main body 30 and contents set by the main body 30.

The present embodiment describes a case in which electric power supply to the operating unit 20 is performed from the main body 30 through the communication path 9. However, the power supply control of the operating unit 20 may be performed separately from (independently of) the power supply control of the main body 30.

Figure 5:
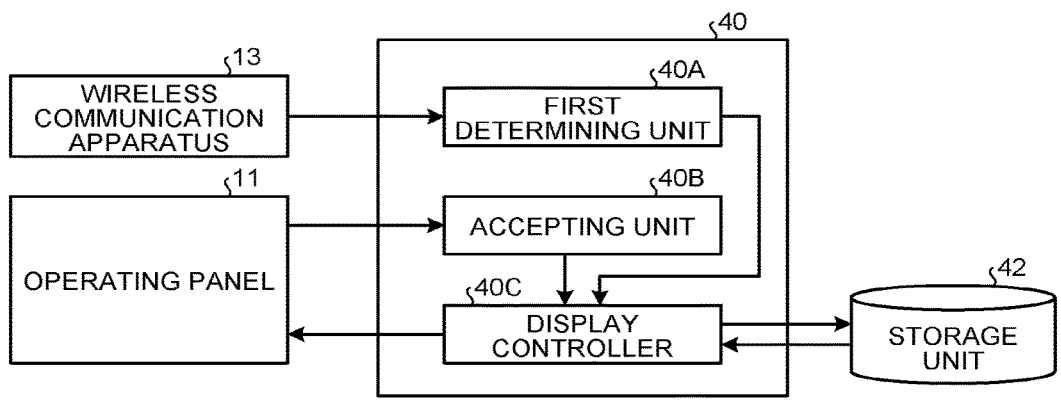
FIG. 5 is a block diagram of a functional configuration example of the terminal apparatus.

The following describes a functional configuration of the terminal apparatus 1. FIG. 5 is a block diagram of a functional configuration example of the terminal apparatus 1. The following mainly describes functions about display processing executed by the terminal apparatus 1.

The terminal apparatus 1 includes the wireless communication apparatus 13, the operating panel 11, a controller 40, and a storage unit 42. The wireless communication apparatus 13, the operating panel 11, and the storage unit 42 are connected to the controller 40 so as to enable data and the like to be exchanged therewith. The storage unit 42 stores therein various kinds of data. The storage unit 42 is implemented by the SSD 18, for example.

The controller 40 controls the entire terminal apparatus 1. The controller 40 is implemented by the CPU 15, the ROM 16, the RAM 17, and the like. The controller 40 may be implemented by a circuit and the like.

The controller 40 includes a first determining unit 40A, an accepting unit 40B, and a display controller 40C. Part or the whole of the first determining unit 40A, the accepting unit 40B, and the display controller 40C may be implemented by causing a processor such as the CPU 15 to execute computer programs (that is, software), implemented by hardware such as an integrated circuit (IC), or implemented by using both of them, for example.

The first determining unit 40A determines whether the terminal apparatus 1 is positioned within a first communication range. The first determining unit 40A determines whether the terminal apparatus 1 is positioned within a second communication range.

Figure 6:
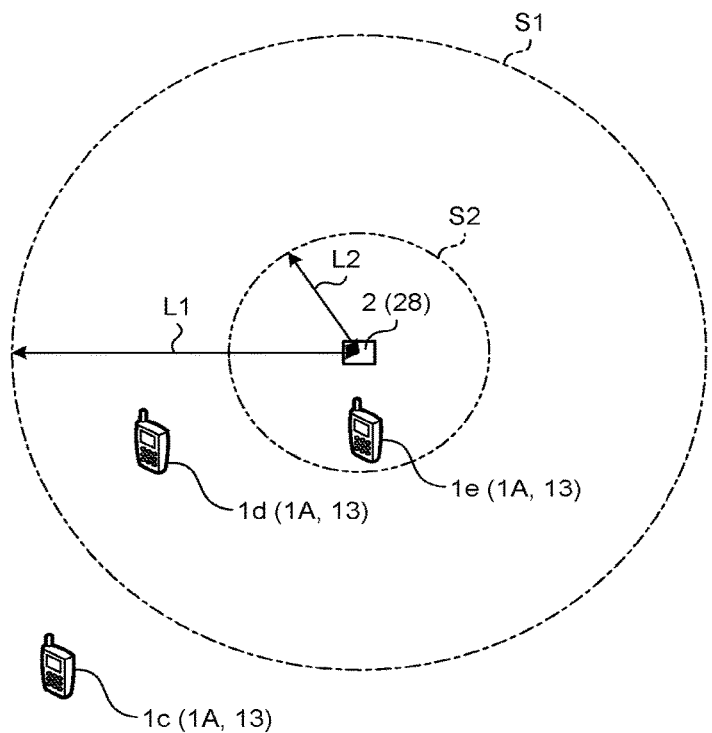
FIG. 6 is a schematic diagram of an example of communication ranges.

FIG. 6 is a schematic diagram of an example of wireless communication ranges. The information processing apparatus 2 includes the wireless communication apparatus 28, whereas a terminal apparatus 1A includes the wireless communication apparatus 13. With this configuration, the information processing apparatus 2 and the terminal apparatus 1A can wirelessly communicate with each other via the wireless communication apparatus 28 and the wireless communication apparatus 13.

The following description will be given based on the premise that the information processing apparatus 2 is fixedly arranged in the real space. In contrast, the terminal apparatus 1A is carried by a user and moves along with the movement of the user. Consequently, when the terminal apparatus 1A enters a first communication range S1, which is a communication range that enables wireless communication with the information processing apparatus 2, the information processing apparatus 2 positioned at the center of the first communication range S1 and the terminal apparatus 1A become a wirelessly communicable state. When the terminal apparatus 1A moves along with the movement of the user to reach outside the first communication range S1, the terminal apparatus 1A and the information processing apparatus 2 become a wirelessly incommunicable state.

FIG. 6 illustrates three terminal apparatuses 1A (a terminal apparatus 1c, a terminal apparatus 1d, and a terminal apparatus 1e) as an example. In the example illustrated in FIG. 6, the terminal apparatus 1c positioned outside the first communication range S1 cannot wirelessly communicate with the information processing apparatus 2. In contrast, the terminal apparatus 1d and the terminal apparatus 1e positioned within the first communication range S1 can wirelessly communicate with the information processing apparatus 2.

The first communication range S1 is a range having the information processing apparatus 2 at the circle center and having a first distance L1, which is a maximum distance over which the terminal apparatus 1A and the information processing apparatus 2 can wirelessly communicate with each other, as the radius. A second communication range S2 is a range having the information processing apparatus 2 as the circle center and having a second distance L2 as the radius. The second distance L2 is less than the first distance L1.

The present embodiment will be described assuming that the first distance L1, which is the maximum wirelessly communicable distance, is 5 meters similarly to the first embodiment. The second distance L2 described is 1 meter, for example. The first distance L1 and the second distance L2 are not limited.

Referring back to FIG. 5, in other words, the first determining unit 40A determines whether the terminal apparatus 1 is positioned within the first communication range S1. The first determining unit 40A determines whether the wireless communication apparatus 13 is in a state that can wirelessly communicate with the information processing apparatus 2, thereby determining whether the terminal apparatus 1 is positioned within the first communication range S1.

It is assumed that the wireless communication apparatus 28 of the information processing apparatus 2 repeatedly transmits a predetermined signal, for example. The first determining unit 40A determines that the terminal apparatus 1 is positioned within the first communication range S1 when the wireless communication apparatus 13 receives the signal transmitted from the information processing apparatus 2.

It is assumed that the wireless communication apparatus 13 transmits a response request signal. The first determining unit 40A may determine that the terminal apparatus 1 is positioned within the first communication range S1 when the wireless communication apparatus 13 receives a response signal from the information processing apparatus 2 in response to the response request signal.

The present embodiment describes an embodiment in which the wireless communication apparatus 28 of the information processing apparatus 2 repeatedly transmits the predetermined signal as an example.

The first determining unit 40A determines whether the terminal apparatus 1 is positioned within the second communication range S2.

The first determining unit 40A calculates the distance to the information processing apparatus 2 from the signal intensity of a signal that has been received by the wireless communication apparatus 13 from the wireless communication apparatus 28 of the information processing apparatus 2. The first determining unit 40A may determine that the terminal apparatus 1 is positioned within the second communication range S2 when the calculated distance is a distance indicating being within the second communication range S2. The first determining unit 40A may determine that the terminal apparatus 1 is positioned within the first communication range S1 and outside the second communication range S2 when the calculated distance is a distance indicating being outside the second communication range S2.

The accepting unit 40B accepts instruction information indicated by an operation instruction on the operating panel 11 by the user. The display controller 40C displays various kinds of screens on the operating panel 11.

As described above, the operating panel 11 displays the various kinds of screens such as the standard screen and the authentication screen and images.

The standard screen is a screen displayed first on the operating panel 11 after a locked state that does not accept any operation input on the operating panel 11 by the user, is released. The standard screen is the most basic screen among a plurality of screens prepared as screens displayed on the operating panel 11 of the terminal apparatus 1. On the standard screen, displayed is information that serves as the base of services that the terminal apparatus 1 can provide and the like. The standard screen may also be referred to as a home screen.

In the present embodiment, the standard screen is a screen that does not contain the authentication image 60. In contrast, the authentication screen is a screen that contains the authentication image 60. In the present embodiment, the authentication screen is a screen displayed in place of the standard screen when conditions described below are satisfied.

Figure 7A:
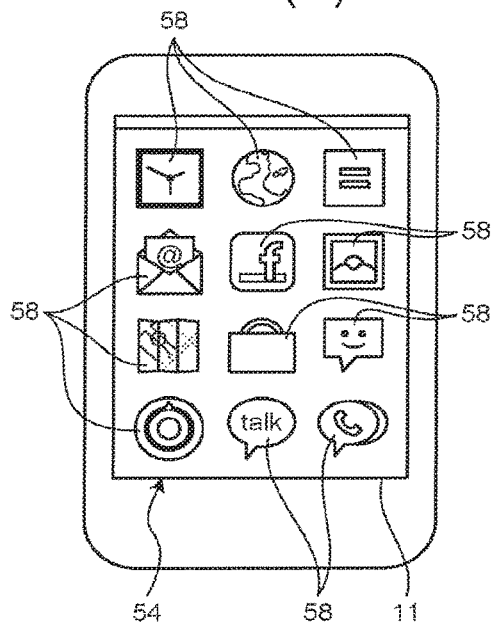
FIGS. 7(A), 7(B), and 7(C) are schematic diagrams of examples of screens displayed on an operating panel.
Figure 7B:
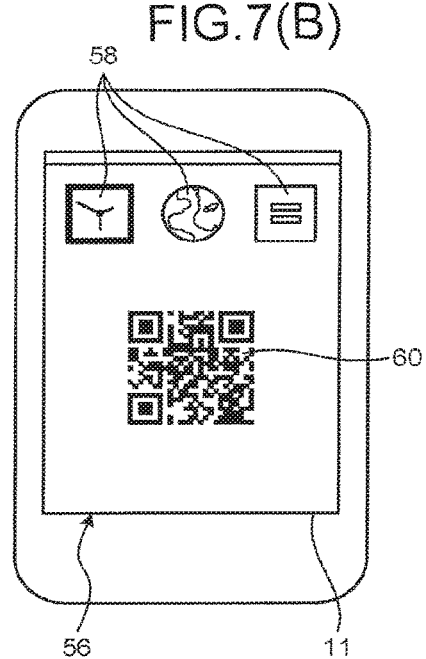
Figure 7C:
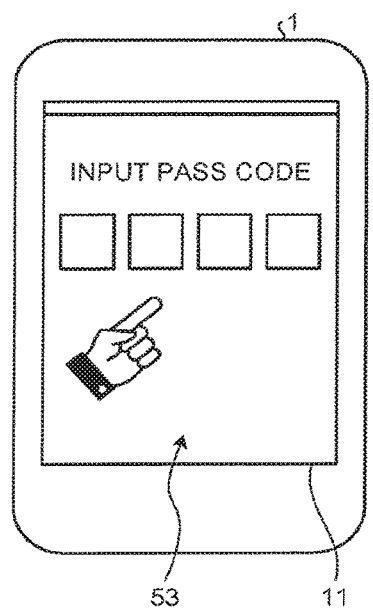

FIGS. 7(A), 7(B), and 7(C) are schematic diagrams of examples of screens displayed on the operating panel 11.

FIG. 7(A) is a schematic diagram of an example of a standard screen 54. FIG. 7(B) is a schematic diagram of an example of an authentication screen 56.

The standard screen 54 contains one or a plurality of symbolic images 58. However, the standard screen 54 does not contain the authentication image 60. The symbolic images 58 are images indicating application programs for executing predetermined functions. The application programs are installed in the terminal apparatus 1 in advance.

The symbolic image 58 is an icon image for accepting a startup instruction for an application program, a thumbnail image indicating an image or the like stored in the terminal apparatus 1 in a reduced size, a folder icon indicating the place of various kinds of data stored in the terminal apparatus 1, or a widget image of a widget program operating on the operating panel 11, for example. The symbolic image 58 does not include the authentication image 60.

The authentication screen 56 contains the authentication image 60. In the present embodiment, the authentication screen 56 contains the authentication image 60 and one or a plurality of symbolic images 58.

Referring back to FIG. 5, when there is no operation instruction performed by the user, the display controller 40C displays an accepting screen on the operating panel 11. FIG. 7(C) is a schematic diagram of an example of an accepting screen 53. The accepting screen 53 is a screen that prompts the release of the locked state that does not accept any operation input by the user. The accepting screen 53 contains an entry field for a password for releasing the locked state, for example.

The user operates the operating panel 11, thereby inputting a predetermined password to the entry field for the password on the accepting screen 53 displayed on the operating panel 11. The operating panel 11 outputs the input password to the accepting unit 40B.

When the password received from the operating panel 11 matches the predetermined password for releasing the locked state of the operating panel 11, the accepting unit 40B accepts the password accepted from the operating panel 11 as release instruction information. The release instruction information is information indicating the release of the locked state.

When the accepting unit 40B accepts the release instruction information, the display controller 40C displays the standard screen 54 or the authentication screen 56 on the operating panel 11.

In the present embodiment, when the first determining unit 40A determines that the terminal apparatus 1 is positioned within the second communication range S2, the display controller 40C performs control to display the authentication screen 56 on the operating panel 11. The storage unit 42 stores therein the authentication image data of the authentication image 60 in advance, for example. The display controller 40C acquires the authentication image data from the storage unit 42 and generates the authentication screen 56 containing the authentication image 60 of the authentication image data. The display controller 40C displays the authentication screen 56 on the operating panel 11.

When the first determining unit 40A determines that the terminal apparatus 1 is positioned outside the second communication range S2, the display controller 40C performs control to display the standard screen 54 on the operating panel 11.

Consequently, when the terminal apparatus 1 is positioned outside the second communication range S2, the operating panel 11 displays the standard screen 54 illustrated in FIG. 7(A). When the terminal apparatus 1 carried by the user enters the second communication range S2 by the movement of the user, the operating panel 11 automatically displays the authentication screen 56 illustrated in FIG. 7(B).

The terminal apparatus 1 in the locked state that does not accept any operation input by the user may enter the second communication range S2 along with the movement of the user carrying the terminal apparatus 1. Given this situation, the display controller 40C may perform control to display the authentication screen 56 in place of the standard screen 54 on the operating panel 11 when it is determined by the first determining unit 40A that the terminal apparatus 1 is positioned within the second communication range S2 and when the accepting unit 40B has accepted the release instruction information, which indicates the release of the locked state.

Figure 8:
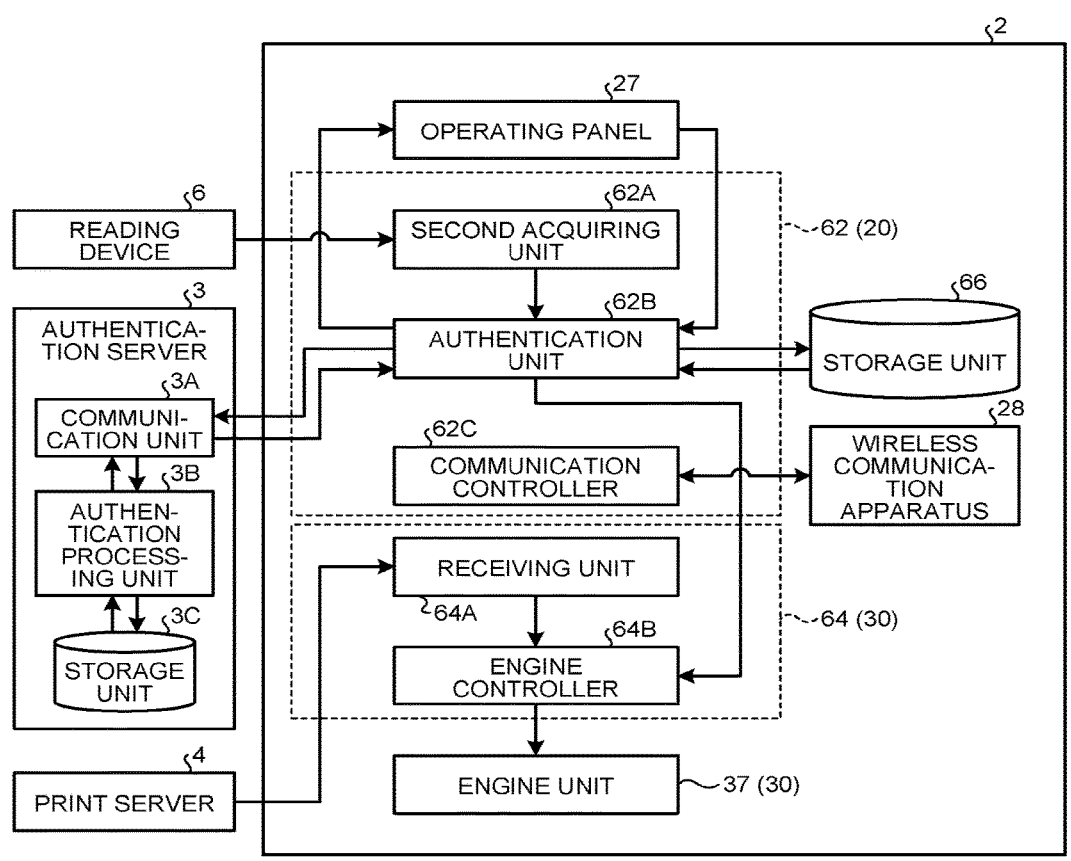
FIG. 8 is a block diagram of a functional configuration example of the information processing apparatus.

The following describes a functional configuration of the information processing apparatus 2. FIG. 8 is a block diagram of a functional configuration example of the information processing apparatus 2. The following mainly describes functions about the authentication of the terminal apparatus 1.

The information processing apparatus 2 includes the operating panel 27, a controller 62, a storage unit 66, the wireless communication apparatus 28, a controller 64, and the engine unit 37. The operating panel 27 and the storage unit 66 are connected to the controller 62 so as to enable data and the like to be exchanged therewith. The controller 62 and the controller 64 are connected to each other so as to enable data and the like to be exchanged with each other. The controller 64 and the engine unit 37 are connected to each other so as to enable data and the like to be exchanged with each other. The controller 62 and the storage unit 66 are provided in the operating unit (refer to FIG. 3). The controller 64 and the engine unit 37 are provided in the main body 30 (refer to FIG. 3).

The storage unit 66 stores therein various kinds of data. The storage unit 66 is implemented by the flash memory 24 (refer to FIG. 3), for example.

The controller 62 controls the operating unit 20. The controller 62 is implemented by the CPU 21, the ROM 22, the RAM 23, and the like. The controller 62 may be implemented by a circuit and the like.

The controller 62 includes a second acquiring unit 62A, an authentication unit 62B, and a communication controller 62C. Part or the whole of the second acquiring unit 62A, the authentication unit 62B, and the communication controller 62C may be implemented by causing a processor such as the CPU 21 to execute computer programs (that is, software), implemented by hardware such as an IC, or implemented by using both of them, for example.

The second acquiring unit 62A acquires the authentication information. The second acquiring unit 62A acquires the authentication image data as the read result of the authentication image 60 from the reading device 6, for example. The second acquiring unit 62A then decodes the acquired authentication image data using a known method, thereby acquiring the authentication information indicated by the authentication image 60.

The second acquiring unit 62A can also acquire the authentication information from the operating panel 27. In this case, the second acquiring unit 62A displays a login screen on the operating panel 27. The login screen contains an entry field for receiving input of the user identification information contained in the authentication information. The user directly inputs the user identification information via the login screen. The second acquiring unit 62A then acquires the authentication information from the operating panel 27.

The second acquiring unit 62A acquires the authentication information containing a user name and a password as the user identification information, for example.

The authentication unit 62B authenticates whether the execution of the function provided in the information processing apparatus 2 is permitted for the user identified by the user identification information contained in the authentication information. This authentication may also be referred to as user authentication. The execution of the function provided in the information processing apparatus 2 is permitted, whereby the user is what is called "logged in" to the information processing apparatus 2.

In the present embodiment, the authentication unit 62B issues an authentication request to the authentication server 3. Specifically, the authentication unit 62B transmits authentication request information containing the authentication information accepted by the second acquiring unit 62A to the authentication server 3.

The authentication server 3 includes a communication unit 3A, an authentication processing unit 3B, and a storage unit 3C, for example. The storage unit 3C stores therein user management information in advance. The user management information is information that associates the authentication information of the user who can use the information processing apparatus 2 and authority information indicating the function of the information processing apparatus 2 that the user identified by the user identification information can use with each other.

Upon reception of the authentication request information from the information processing apparatus 2, the communication unit 3A of the authentication server 3 outputs the authentication request information to the authentication processing unit 3B. The authentication processing unit 3B determines whether the authentication information contained in the received authentication request information is registered in the user management information. If the authentication information is registered in the user management information, the authentication processing unit 3B transmits an authentication result containing information indicating normal authentication and the authority information corresponding to the authentication information to the information processing apparatus 2 via the communication unit 3A. In contrast, if the authentication information is not registered in the user management information, the authentication processing unit 3B transmits an authentication result containing abnormal authentication to the information processing apparatus 2 via the communication unit 3A.

The authentication unit 62B of the information processing apparatus 2 receives the authentication result from the authentication server 3 via the communication I/F (refer to FIG. 3). If the received authentication result contains normal authentication, the authentication unit 62B outputs the authentication result to the controller 64. The authentication unit 62B displays an operation screen containing a button image for selecting the function of the information processing apparatus 2 indicated by the authority information contained in the authentication result on the operating panel 27.

Consequently, in the case of normal authentication, the operating panel 27 displays, for the user identified by the user identification information contained in the authentication information, the operation screen containing the button image that can instruct the execution of the function permitted to the user. Consequently, the information processing apparatus 2 becomes able to execute the function corresponding to the button image contained in the operation screen.

In contrast, if the received authentication result contains abnormal authentication, the authentication unit 62B transmits the authentication result indicating abnormal authentication to the input source (the operating panel 27 or the terminal apparatus 1) of the authentication information.

The communication controller 62C controls the wireless communication apparatus 28. In the present embodiment, the communication controller 62C controls the wireless communication apparatus 28 so as to repeatedly transmit a predetermined signal. Consequently, the terminal apparatus 1 can determine that the terminal apparatus 1 has been positioned within the first communication range S1 by determining whether the signal transmitted from the wireless communication apparatus 28 has been received.

The following describes the controller 64. The controller 64 controls the main body 30. The controller 64 is implemented by the CPU 31, the ROM 32, the RAM 33, and the like. The controller 64 may be implemented by a circuit and the like.

The controller 64 includes a receiving unit 64A and an engine controller 64B. Part or the whole of second acquiring unit 62A and the engine controller 64B may be implemented by causing a processor such as the CPU 31 to execute a computer program (that is, software), implemented by hardware such as an IC, or implemented by using both of them, for example.

The receiving unit 64A receives a print job from the print server 4 and outputs the print job to the engine controller 64B. The engine controller 64B controls the engine unit 37 so as to execute the function corresponding to the button image instructed by an operation on the operating panel 27 by the user. When the execution of the printing function is instructed by the operation on the operating panel 27 by the user, for example, the engine controller 64B controls the engine unit 37 so as to execute printing based on the print job received by the receiving unit 64A.

In this process, the controller 62 displays a list of print jobs stored in the print server 4 on the operating panel 27. The engine controller 64B may execute the print job selected by an operation instruction by the user or the like.

Figure 9:
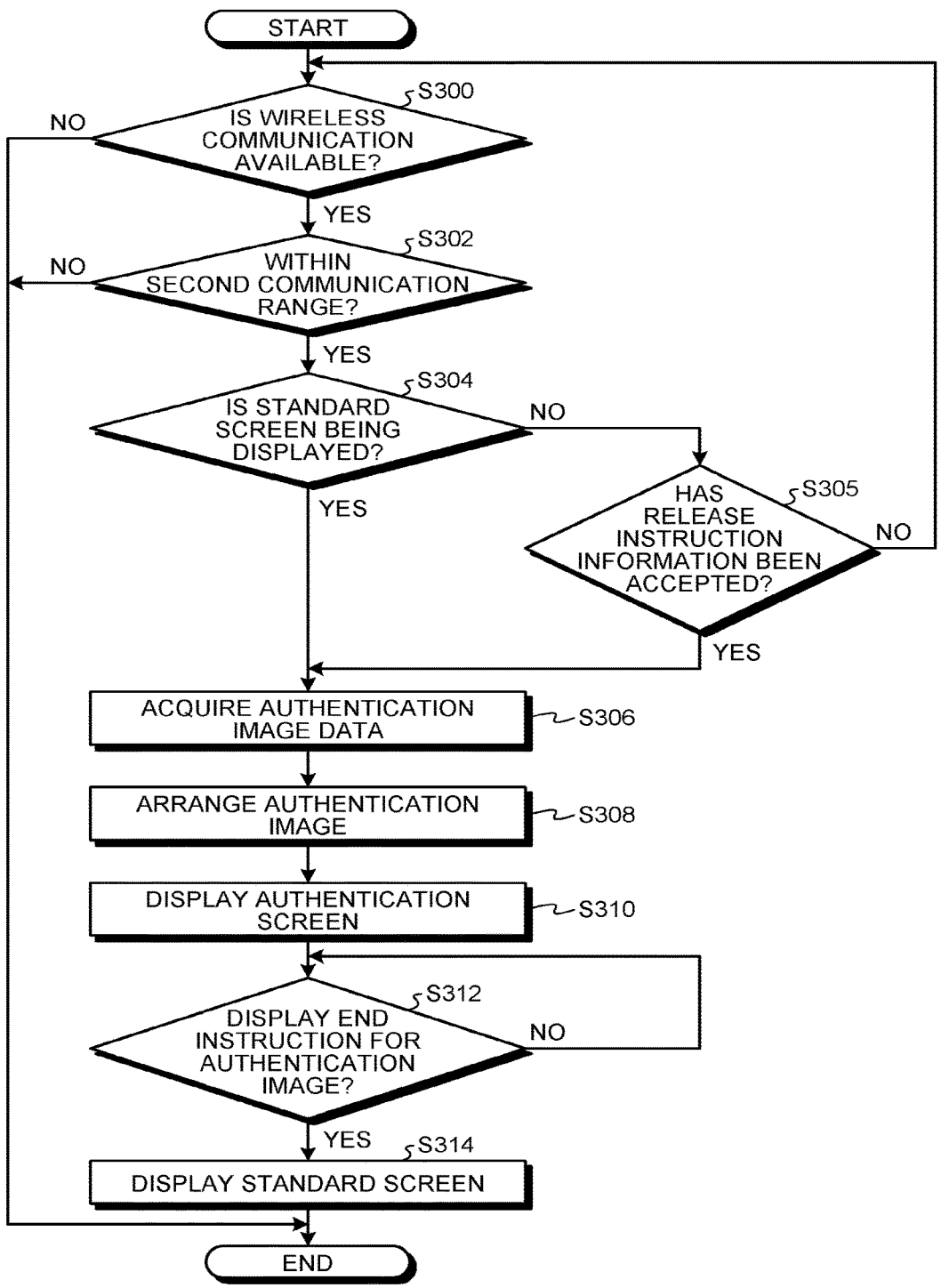
FIG. 9 is a flowchart of an example of a procedure of display processing.

FIG. 9 is a flowchart of an example of a procedure of display processing that the terminal apparatus 1 of the present embodiment executes.

First, the first determining unit 40A determines whether wireless communication is available with the information processing apparatus 2 (Step S300). If it is determined to be negative at Step S300 (No at Step S300), the present routine ends. The case when it is determined to be negative at Step S300 is a case when the terminal apparatus 1 is positioned outside the first communication range S1.

If it is determined to be affirmative at Step S300 (Yes at Step S300), the process advances to Step S302. The case when it is determined to be affirmative at Step S300 is a case when the terminal apparatus 1 is positioned within the first communication range S1.

At Step S302, the first determining unit 40A determines whether the terminal apparatus 1 is positioned within the second communication range S2 (Step S302). If it is determined to be negative at Step S302 (No at Step S302), the present routine ends. The case when it is determined to be negative at Step S302 is a case when the terminal apparatus 1 is positioned within the first communication range S1 and outside the second communication range S2.

If it is determined to be affirmative at Step S302 (Yes at Step S302), the process advances to Step S304. The case when it is determined to be affirmative at Step S302 is a case when the terminal apparatus 1 is positioned within the second communication range S2.

At Step S304, the display controller 40C determines whether the operating panel 11 is displaying the standard screen 54 (Step S304) (refer to FIG. 7(A)). In other words, the display controller 40C determines whether the locked state that does not accept any operation input on the operating panel 11 by the user, has been released. If it is determined to be affirmative at Step S304 (Yes at Step S304), the process advances to Step S306.

If it is determined to be negative at Step S304 (No at Step S304), the process advances to Step S305. If it is determined to be negative at Step S304, the display controller 40C displays the accepting screen 53 (refer to FIG. 7(C)) that prompts the release of the locked state on the operating panel 11.

At Step S305, the display controller 40C determines whether the receiving unit 64A has accepted the release instruction information (Step S305).

If it is determined to be negative at Step S305 (No at Step S305), the process returns to Step S300. In contrast, if it is determined to be affirmative at Step S305 (Yes at Step S305), the process advances to Step S306.

At Step S306, the display controller 40C acquires the authentication image data from the storage unit 42 (Step S306). Next, the display controller 40C arranges the authentication image 60 of the acquired authentication image data (Step S308). With this processing, the display controller 40C generates the authentication screen 56.

The display controller 40C performs control to display the authentication screen 56 on the operating panel 11 (Step S310). Consequently, the operating panel 11 of the terminal apparatus 1 becomes a state in which the authentication screen 56 containing the authentication image 60 is displayed.

Next, the accepting unit 40B determines whether it has accepted a display end instruction for the authentication image 60 from the operating panel 11 (Step S312). When the operating panel 11 displays the authentication image 60, the user holds the displayed authentication image 60 over the reading device 6. When the reading device 6 reads the authentication image 60, the user may instruct end of the display of the authentication image 60 by operating the operating panel 11. The accepting unit 40B may determine whether the display end instruction indicating the end of the display of the authentication image 60 has been accepted from the operating panel 11.

The accepting unit 40B repeats the negative determination (No at Step S312) until it is determined to be affirmative at Step S312 (Yes at Step S312). If it is determined to be affirmative at Step S312 (Yes at Step S312), the process advances to Step S314.

At Step S314, the display controller 40C performs control to display the standard screen 54 on the operating panel 11 (Step S314). Consequently, the authentication image 60 is made hidden from the operating panel 11. In other words, the terminal apparatus 1 becomes a state that can execute known processing to accept operation instructions for the respective symbolic images 58 displayed on the operating panel 11 and to execute pieces of processing corresponding to the accepted operation instructions. The present routine then ends.

As illustrated in FIG. 7(B), the authentication screen 56 may contain the symbolic images 58 together with the authentication image 60. Consequently, when the operating panel 11 displays the authentication screen 56 at Step S310, a symbolic image 58 may be indicated by an operation instruction on the operating panel 11 by the user. In this case, the controller 40 of the terminal apparatus 1 may execute the application program indicated by the indicated symbolic image 58.

Figure 10:
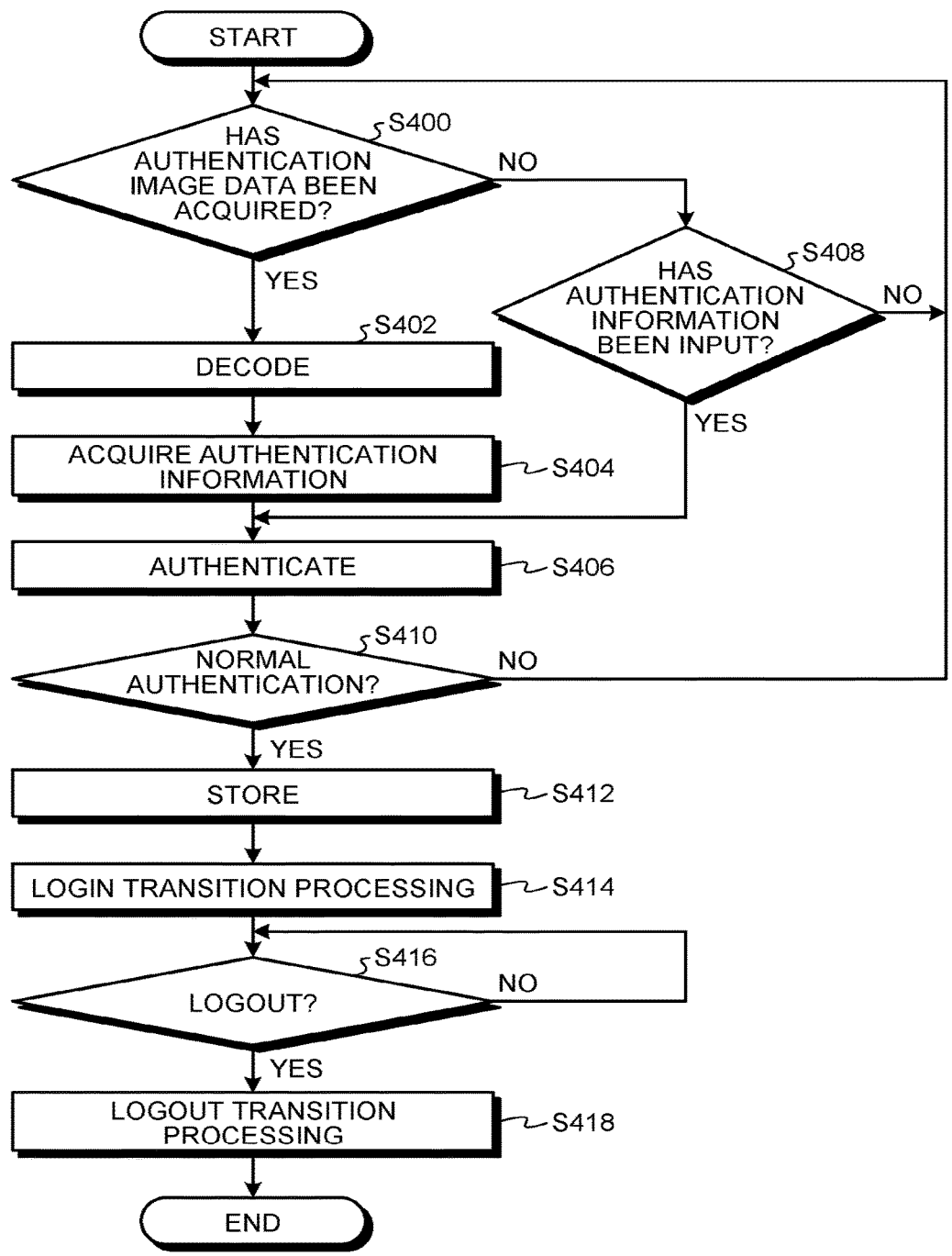
FIG. 10 is a flowchart of an example of a procedure of authentication processing.

The following describes an example of a procedure of authentication processing executed by the information processing apparatus 2. FIG. 10 is a flowchart of an example of the procedure of the authentication processing executed by the information processing apparatus 2.

First, the second acquiring unit 62A determines whether it has acquired the authentication image data of the authentication image 60 from the reading device 6 (Step S400). If it is determined to be affirmative at Step S400 (Yes at Step S400), the process advances to Step S402.

At Step S402, the second acquiring unit 62A decodes the authentication image data acquired at Step S400 using a known method (Step S402). With this processing, the second acquiring unit 62A acquires the authentication information indicated by the authentication image 60 (Step S404). The process then advances to Step S406.

In contrast, if it is determined to be negative at Step S400 (No at Step S400), the process advances to Step S408. At Step S408, it is determined whether the authentication information has been input from the operating panel 27 (Step S408). If it is determined to be affirmative at Step S408 (Yes at Step S408), the second acquiring unit 62A acquires the authentication information input from the operating panel 27, and the process advances to Step S406. If it is determined to be negative at Step S408 (No at Step S408), the process returns to Step S400.

At Step S406, the authentication unit 62B performs authentication using the authentication information acquired by the second acquiring unit 62A (Step S406).

If the authentication result by the authentication unit 62B is abnormal authentication (No at Step S410), the process returns to Step S400. In contrast, if the authentication result is normal authentication (Yes at Step S410), the authentication unit 62B stores the user identification information contained in the authentication information in the storage unit 66 (Step S412)

The authentication unit 62B then executes login transition processing (Step S414). The login transition processing is processing to output the authentication result (containing the authentication information and the authority information) to the controller 64 and to display the operation screen containing the button image for selecting the function of the information processing apparatus 2 indicated by the authority information contained in the authentication result on the operating panel 27.

Consequently, in the case of normal authentication, the operating panel 27 displays, for the user identified by the user identification information contained in the authentication information, the operation screen containing the button image that can instruct the execution of the function permitted to the user. In the case of normal authentication, the information processing apparatus 2 becomes able to execute the function the execution of which has been instructed by the operation on the operating panel 27 by the user by the engine unit 37.

Next, the authentication unit 62B determines whether logout has been instructed (Step S416). The authentication unit 62B performs the determination at Step S416 by determining whether logout has been instructed by an operation instruction on the operating panel 27 by the user, for example.

The authentication unit 62B repeats the negative determination (No at Step S416) until it is determined to be affirmative at Step S416 (Yes at Step S416). If it is determined to be affirmative at Step S416 (Yes at Step S416), the process advances to Step S418.

At Step S418, the authentication unit 62B executes logout transition processing (Step S418). The logout transition processing is processing to delete the user identification information stored in the storage unit 66 at Step S412 from the storage unit 66. The logout transition processing also includes processing to display a login screen containing an entry field for receiving input of the user identification information of a new user on the operating panel 27. Consequently, the information processing apparatus 2 makes a transition to a state (a logout state) that disables the execution of the function provided in the information processing apparatus 2 for the user identified by the user identification information used in the immediately preceding login transition processing.

The present routine then ends.

As described above, the authentication system 1000 of the present embodiment includes the terminal apparatus 1 and the information processing apparatus 2. The information processing apparatus 2 acquires, from the read result of the authentication image 60 indicating authentication information, the authentication information. The terminal apparatus 1 includes the wireless communication apparatus 13 (the communication unit), the first determining unit 40A, and the display controller 40C.

The wireless communication apparatus 13 wirelessly communicates with the information processing apparatus 2. The first determining unit 40A determines whether the terminal apparatus 1 is positioned within the second communication range S2, in which the distance from the information processing apparatus 2 is a threshold or less, within the first communication range S1, which is wirelessly communicable with the information processing apparatus 2. When it is determined that the terminal apparatus 1 is positioned within the second communication range S2, the display controller 40C performs control to display the authentication screen 56 containing the authentication image 60 on the operating panel 11 (the display unit).

The authentication system 1000 of the present embodiment thus automatically displays the authentication screen 56 containing the authentication image 60 illustrated in FIG. 7(B) on the operating panel 11 when the terminal apparatus 1 is positioned within the second communication range S2. When the terminal apparatus 1 is positioned outside the second communication range S2, the operating panel 11 displays the standard screen 54, which is a normal screen that does not contain the authentication image 60, illustrated in FIG. 7(A).

Consequently, the authentication system 1000 of the present embodiment can improve the operability of the terminal apparatus 1 when the authentication image 60 is displayed.

The terminal apparatus 1 in the locked state that does not accept any operation input by the user may enter the second communication range S2 along with the movement of the user carrying the terminal apparatus 1.

Given this situation, the terminal apparatus 1 preferably includes the accepting unit 40B. The accepting unit 40B receives the release instruction information indicating the release of the locked state that does not accept any operation input by the user. The display controller 40C preferably performs control to display the authentication screen 56 on the operating panel 11 (the display unit) when it is determined that the terminal apparatus 1 is positioned within the second communication range S2 and when the release instruction information has been accepted.

Consequently, when the terminal apparatus 1 is positioned within the second communication range S2, when the locked state is released by an operation instruction on the operating panel 11 by the user, the operating panel 11 of the terminal apparatus 1 displays the authentication screen 56.

Various operations by a user have conventionally been required in order to cause the terminal apparatus 1 to display the authentication image 60.

FIGS. 11(A) to 11(E) are schematic diagrams of screen transitions in a conventional terminal apparatus 900. It is assumed that along with the movement of a user W carrying the terminal apparatus 900, the terminal apparatus 900 has entered the vicinity of the information processing apparatus 2 (within the second communication range S2) (refer to FIG. 11(A)), for example. In this state, it is assumed that the user W has input a pass code for releasing the locked state via the accepting screen 53 (refer to FIG. 11(B)). In this conventional example, the operating panel 11 of the terminal apparatus 900 then displays the standard screen 54 (refer to FIG. 11(C)).

Furthermore, the user W instructs the display position of the symbolic image 58 (a symbolic image 58X, for example) for displaying the authentication image 60 contained in the standard screen 54. The operating panel 11 of the terminal apparatus 900 then displays an identification information input screen 55 for accepting the release of the locking of an application program for executing the display of the authentication image 60 (refer to FIG. 11(D)). When the user W then inputs identification information via the identification information input screen 55, the operating panel 11 displays a display screen 57 containing the authentication image 60 (FIG. 11(E)).

As described above, in order to cause the terminal apparatus 1 to display the authentication image 60, many operation stages have conventionally been required to complicate operation.

In contrast, the authentication system 1000 of the present embodiment can improve the operability of the terminal apparatus 1.

Figure 12A:
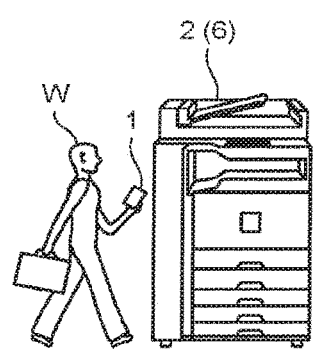
FIGS. 12(A), 12(B), and 12(C) are schematic diagrams of an example of screen transitions in the terminal apparatus of the present embodiment.
Figure 12B:
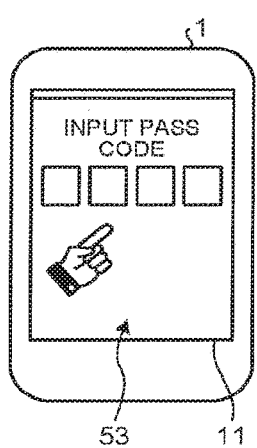
Figure 12C:
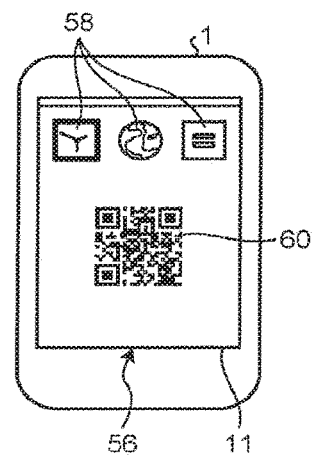

FIGS. 12(A), 12(B), and 12(C) are schematic diagrams of an example of screen transitions in the terminal apparatus 1 of the present embodiment. It is assumed that along with the movement of the user W carrying the terminal apparatus 1, the terminal apparatus 1 has entered the vicinity of the information processing apparatus 2 (within the second communication range S2) (refer to FIG. 12(A)), for example. In this state, it is assumed that the user has input a pass code for releasing the locked state via the accepting screen 53 (refer to FIG. 12(B)). In the present embodiment, the operating panel 11 of the terminal apparatus 1 then displays the authentication screen 56 (refer to FIG. 12(C)). Consequently, the user W carrying the terminal apparatus 1 only performs a release operation for the locked state near the information processing apparatus 2 (within the second communication range S2), whereby the operating panel 11 displays the authentication image 60.

The authentication system 1000 of the present embodiment can thus simplify the operation for displaying the authentication image 60 on the terminal apparatus 1 compared with the conventional technique. Consequently, the authentication system 1000 of the present embodiment can improve the operability of the terminal apparatus 1.

The authentication screen 56 containing the authentication image 60 may contain the symbolic images 58. Consequently, even when the operating panel 11 displays the authentication image 60, the user can operate the symbolic images 58 contained in the authentication screen 56. In other words, the user can also input execution instructions for the application programs indicated by the symbolic images 58 contained in the authentication screen 56 via the authentication screen 56 containing the authentication image 60.

When it is determined that the terminal apparatus 1 is positioned outside the second communication range S2, the display controller 40C performs control to display the standard screen 54 not containing the authentication image 60 on the operating panel 11 (the display unit).

Consequently, in the present embodiment, the terminal apparatus 1 can display the authentication screen 56 on the operating panel 11 when the terminal apparatus 1 carried by the user is positioned within the second communication range S2 and can display the standard screen 54 on the operating panel 11 when the terminal apparatus 1 is positioned outside the second communication range S2.

Consequently, the authentication system 1000 of the present embodiment can further improve the operability of the terminal apparatus 1.

A computer program executed by the terminal apparatus 1 of the present embodiment is a computer program executed by a computer including the wireless communication apparatus 13 (the communication unit) that wirelessly communicates with the information processing apparatus 2 that acquires, from the read result of the authentication image 60 indicating authentication information, the authentication information. The computer program includes determining whether the computer is positioned within the second communication range S2, in which the distance from the information processing apparatus 2 is the threshold or less, within the first communication range S1, which enables wireless communication with the information processing apparatus 2, and performing control to display the authentication screen 56 containing the authentication image 60 on the operating panel 11 (the display unit) when it is determined that the computer is positioned within the second communication range S2.

Second Embodiment

The present embodiment describes an embodiment that adjusts the arrangement position of the authentication image 60 on the authentication screen 56.

FIG. 1 is a schematic diagram of an example of a configuration of an authentication system 1000A of the present embodiment. The authentication system 1000A is similar to the authentication system 1000 of the first embodiment except that it includes a terminal apparatus 1A in place of the terminal apparatus 1 and that it includes an information processing apparatus 2A in place of the information processing apparatus 2. A hardware configuration of the terminal apparatus 1A is similar to the hardware configuration of the terminal apparatus 1 (refer to FIG. 2). A hardware configuration of the information processing apparatus 2A is similar to the hardware configuration of the information processing apparatus 2 (refer to FIG. 3).

Figure 13:
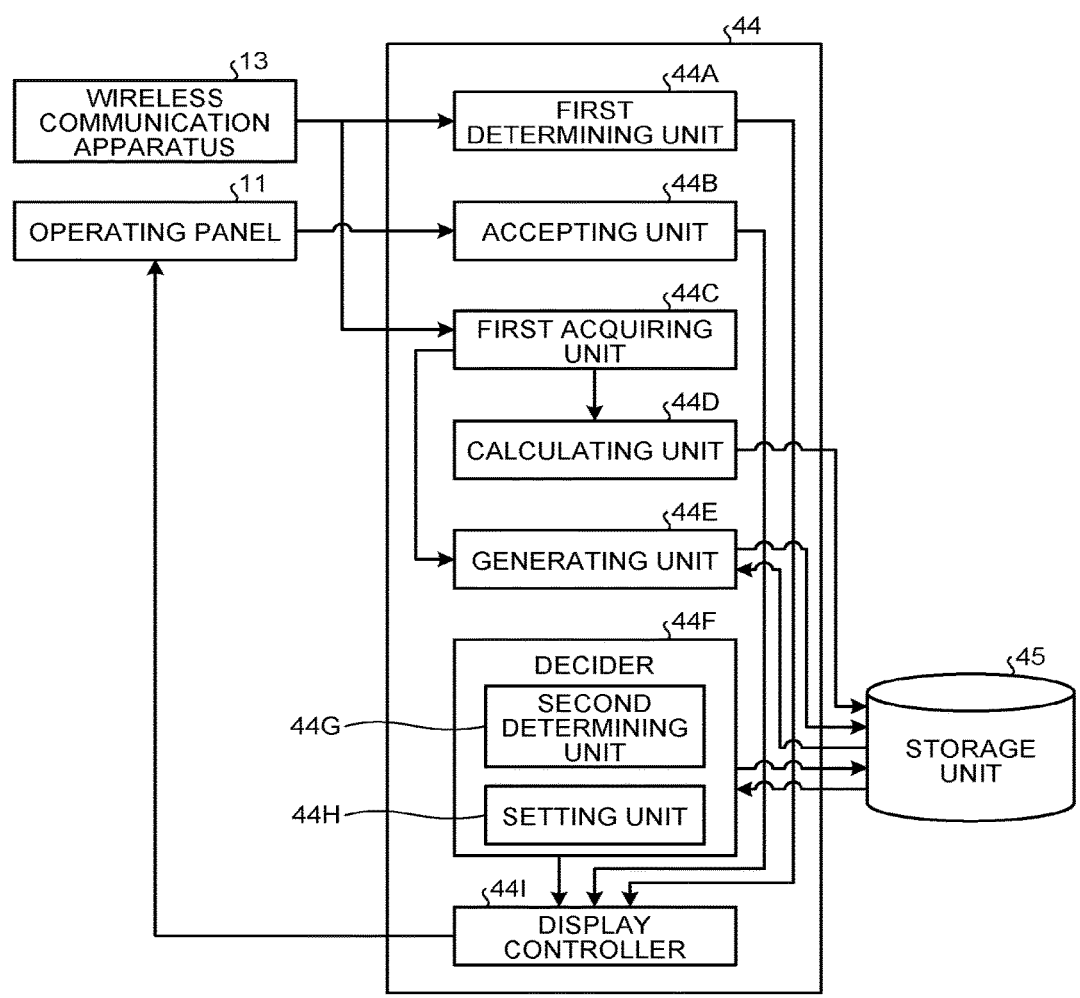
FIG. 13 is a block diagram of a functional configuration example of a terminal apparatus.

FIG. 13 is a block diagram of a functional configuration example of the terminal apparatus 1A.

The terminal apparatus 1A includes the wireless communication apparatus 13, the operating panel 11, a controller 44, and a storage unit 45. The wireless communication apparatus 13, the operating panel 11, and the storage unit 45 are connected to the controller 44 so as to enable data and the like to be exchanged therewith.

The storage unit 45 stores therein various kinds of data. The storage unit 45 is implemented by the SSD 18, for example. In the present embodiment, the storage unit 45 stores therein setting information, an authentication image database (DB), and arrangement information.

The setting information is information that prescribes the display positions of the respective symbolic images 58 contained in the standard screen 54 on the standard screen 54. The arrangement information is information that prescribes the display positions of the respective symbolic images 58 and the authentication image 60 contained in the authentication screen 56.

FIG. 14 is a diagram of an example of a data configuration of setting information 70. FIG. 14 illustrates setting information 70A as an example of the setting information 70. The setting information 70A illustrated in FIG. 14 associates display position information, an application ID (APID), the display size information of the symbolic image 58, exclusion affirmative/negative information, and display position change affirmative/negative information with each other.

The display position information is information indicating the display position of the symbolic image 58 on the standard screen 54. In the present embodiment, the display position information is indicated by two-dimensional coordinates on the operating panel 11.

FIGS. 15(A) and 15(B) are explanatory diagrams of the display position. In the present embodiment, two-dimensional coordinates on an XY plane along the display surface of the operating panel 11 with one apex (the upper-left apex in FIG. 15(A)) of the rectangular operating panel 11 as an origin O are used as the display position information.

The present embodiment describes a case in which the positions of the respective areas obtained by dividing the XY plane of the operating panel 11 in a grid manner along an X-axial direction (refer to the arrow X direction) and a Y-axial direction (refer to the arrow Y direction) are used as the display position information. Given this situation, pieces of display position information (1,1), (2,1), and (3,1) indicated by XY coordinates are described as ones corresponding to the respective positions of areas $P_1$, $P_2$, and $P_3$, respectively, in FIG. 15(A).

Similarly, pieces of display information (1,2), (2,2), (3,2), (1,3), (2,3), (3,3), (1,4), (2,4), and (3,4) indicated by XY coordinates are described as ones corresponding to the respective positions of areas $P_4$, $P_5$, $P_6$, $P_7$, $P_8$, $P_9$, $P_{10}$, $P_{11}$, and $P_{12}$, respectively, in FIG. 15(A).

In other words, although the present embodiment describes a case in which the display positions on the operating panel 11 are handled by being divided into 3×4, or 12 areas as an example, this is not limiting.

The APID is the identification information of the symbolic image 58 arranged on the standard screen 54. The symbolic image 58 identified by the APID may be registered in the setting information 70A in place of the APID.

The display size information is information indicating the size of the symbolic image 58 when being displayed. In the example illustrated in FIG. 14, a display size "1×1" corresponds to the size of one area P. A display size "2×2" corresponds to the size of a total of four (2×2) areas P obtained by contiguously arranging two ones in the X-axial direction and two ones in the Y-axial direction, for example.

When the setting information 70A illustrated in FIG. 14 is stored in the storage unit 45, processing by the controller 44 described below causes the operating panel 11 to display the standard screen 54 illustrated in FIG. 15(B).

In other words, the symbolic images 58 identified by the respective APIDs set in the setting information 70A are displayed at the display positions of the display position information corresponding to the respective APIDs with the display sizes of the display size information corresponding to the respective APIDs.

Referring back to FIG. 14, the exclusion affirmative/negative information in the setting information 70A is information indicating whether exclusion from the standard screen 54 is permitted. The exclusion from the standard screen 54 indicates being made hidden from the standard screen 54. The display position change affirmative/negative information is information indicating whether the display position can be changed when the corresponding exclusion affirmative/negative information is exclusion "negative."

The setting information 70A can be changed as appropriate by an operation instruction on the operating panel 11 by the user or the like. In other words, the user can set and change as appropriate the type of the symbolic images 58 of the application programs to be displayed on the standard screen 54, the display positions of the symbolic images 58, the exclusion affirmative/negative information, the display position change affirmative/negative information, or the like.

The following describes the authentication image DB stored in the storage unit 45. FIG. 16 is a diagram of an example a data configuration of an authentication image DB 71. The authentication image DB 71 associates the authentication image data, the type information, a data amount, the display size information, and the information processing apparatus ID with each other.

The information processing apparatus ID is the identification information of the information processing apparatus 2A. The authentication image data is the authentication image data of the authentication image 60 for use in authentication for the information processing apparatus 2A identified by the corresponding information processing ID. The type information registered in the authentication image DB 71 is information indicating the type of the user identification information for use in authentication in the information processing apparatus 2A identified by the corresponding information processing apparatus ID. The data amount indicates the data size of the authentication information for use in authentication in the information processing apparatus 2A identified by the corresponding information processing apparatus ID. The present embodiment presents a case in which the number of characters is used as the data amount.

The setting information 70 (the setting information 70A) and the authentication image DB 71 are stored in the storage unit 45 in advance and are changed or updated by processing described below by the controller 44, an operation instruction on the operating panel 11 by the user, or the like.

Referring back to FIG. 13, the controller 44 controls the entire terminal apparatus 1A. The controller 44 is implemented by the CPU 15, the ROM 16, the RAM 17, and the like. The controller 44 may be implemented by a circuit and the like.

The controller 44 includes a first determining unit 44A, an accepting unit 44B, a first acquiring unit 44C, a calculating unit 44D, a generating unit 44E, a decider 44F, and a display controller 44I. The decider 44F includes a second determining unit 44G and a setting unit 44H.

Part or the whole of the first determining unit 44A, the accepting unit 44B, the first acquiring unit 44C, the calculating unit 44D, the generating unit 44E, the decider 44F, the second determining unit 44G, the setting unit 44H, and the display controller 44I may be implemented by causing a processor such as the CPU 15 to execute computer programs (that is, software), implemented by hardware such as an IC, or implemented by using both of them, for example.

The first determining unit 44A is similar to the first determining unit 40A of the first embodiment. In other words, the first determining unit 44A determines whether the terminal apparatus 1A is positioned within the first communication range S1 and whether the terminal apparatus 1A is positioned within the second communication range S2. A method of determination of the first determining unit 44A is similar to that of the first determining unit 40A.

The accepting unit 44B is similar to the accepting unit 40B of the first embodiment. In other words, the accepting unit 44B accepts instruction information indicated by an operation instruction on the operating panel 11 by the user.

As described in the first embodiment, the authentication information contains one or a plurality of types of user identification information. The type of the user identification information contained in the authentication information varies depending on the information processing apparatus 2A. The data amount of the authentication information varies depending on the information processing apparatus 2A. In other words, the type of the user identification information and the data amount of the authentication information required for authentication vary depending on the information processing apparatus 2A.

Given this situation, in the present embodiment, the first acquiring unit 44C acquires the data amount of the authentication information and the type information indicating the type of the user identification information contained in the authentication information from the information processing apparatus 2A.

The wireless communication apparatus 28 of the information processing apparatus 2A repeatedly transmits a transmission signal containing the identification information of the information processing apparatus 2A (referred to as the information processing apparatus ID), the data amount of the authentication information, and the type information, for example. The first acquiring unit 44C may acquire the data amount and the type information by reading the data amount and the type information contained in the transmission signal received from the information processing apparatus 2A.

The first acquiring unit 44C registers the acquired data amount and type information in the authentication image DB 71 (refer to FIG. 16) in association with the information processing apparatus ID contained in the received transmission signal.

The first determining unit 44A may determine that the terminal apparatus 1 has been positioned within the first communication range S1 when the wireless communication apparatus 13 has received the transmission signal. The first determining unit 44A may determine that the terminal apparatus 1 has been positioned within the second communication range S2 from the signal intensity of the transmission signal similarly to the first determining unit 40A of the first embodiment.

The calculating unit 44D calculates display size information indicating the size when being displayed (hereinafter, referred to as a display size) of the authentication image 60 in accordance with the data amount acquired by the first acquiring unit 44C. The display size of the authentication image 60 is determined in accordance with the data amount of the authentication information indicated by the authentication image 60. Consequently, the calculating unit 44D may calculate the display size information in line with the standard of the authentication image 60 from the data amount acquired by the first acquiring unit 44C.

The calculating unit 44D then registers the calculated display size information of the authentication image 60 in the authentication image DB 71. In this process, the calculating unit 44D may register the display size information in the authentication image DB 71 in association with the information processing apparatus ID contained in the transmission signal containing the data amount of the calculation source of the display size information.

The generating unit 44E generates the authentication image 60. Every time at least one of the type information and the data amount in the authentication image DB 71 is updated or registered, the generating unit 44E generates the corresponding authentication image 60, for example.

The storage unit 45 stores therein a plurality of types of user identification information of the user who uses the terminal apparatus 1A in advance, for example. The generating unit 44E reads the type of the type information contained in the transmission signal acquired from the information processing apparatus 2A. The generating unit 44E reads the user identification information of the read type from the storage unit 45 and generates, from the authentication information containing the read user identification information, the authentication image 60 indicating the authentication information. For a method for generating the authentication image 60, a known method may be used.

The generating unit 44E registers the authentication image data of the generated authentication image 60 in the authentication image DB 71 in association with the information processing apparatus ID contained in the transmission signal acquired by the first acquiring unit 44C (refer to FIG. 16).

The decider 44F decides the display positions of the symbolic images 58 and the authentication image 60 on the authentication screen 56 based on the setting information (the setting information 70A) and the display size information of the authentication image 60.

Specifically, the decider 44F includes the second determining unit 44G and the setting unit 44H.

The second determining unit 44G determines whether there is any vacant area for arranging the authentication image 60 on the standard screen 54 based on the setting information 70 and the display size information of the authentication image 60.

Specifically, the second determining unit 44G arranges the symbolic images 58 identified by the respective APIDs registered in the setting information 70 at the display positions indicated by the corresponding display position information with the display sizes indicated by the corresponding display size information. As described above, the setting information 70 is the information that prescribes the display positions of the respective symbolic images 58 contained in the standard screen 54 on the standard screen 54. Given this situation, with this arrangement processing, the second determining unit 44G recognizes the display positions and the display sizes of the respective symbolic images 58 on the standard screen 54.

The second determining unit 44G determines whether there is any vacant area where the authentication image 60 to be arranged can be arranged, on the standard screen 54 in which the symbolic images 58 are arranged in accordance with the setting information 70.

The authentication image 60 to be arranged is the authentication image 60 of the authentication image data corresponding to the information processing apparatus ID contained in transmission signal received from the information processing apparatus 2A in the authentication image DB 71 (refer to FIG. 16).

The second determining unit 44G reads the display size information corresponding to the authentication image data of the authentication image 60 to be arranged registered in the authentication image DB 71. The second determining unit 44G then determines whether there is any vacant area the size of which is the display size of the display size information or more within the standard screen 54 in which the symbolic images 58 are arranged in accordance with the setting information 70.

The setting unit 44H sets the display position of the authentication image 60 on the authentication screen 56. Specifically, the setting unit 44H generates arrangement information that prescribes the display position of the authentication image 60.

The arrangement information is the information that prescribes the display positions of the symbolic images 58 and the authentication image 60 on the authentication screen 56.

The setting unit 44H generates the arrangement information in accordance with the determination result of the second determining unit 44G.

Specifically, when the second determining unit 44G determines that there is a vacant area, the setting unit 44H sets the determined vacant area on the standard screen 54 as the display position of the authentication image 60 on the authentication screen 56. The setting unit 44H generates the setting information that prescribes the display position information of the symbolic images 58 identified by the respective APIDs indicated by the setting information 70 and the display position information indicating the set display position of the authentication image 60.

The display controller 44I displays the authentication screen 56 in which the symbolic images 58 in the setting information are arranged at the display positions indicated by the corresponding display position information and the authentication image 60 is arranged at the display position set by the setting unit 44H on the operating panel 11. The display timing of the authentication screen 56 by the display controller 44I is similar to that of the display controller 40C of the first embodiment.

Figure 18A:
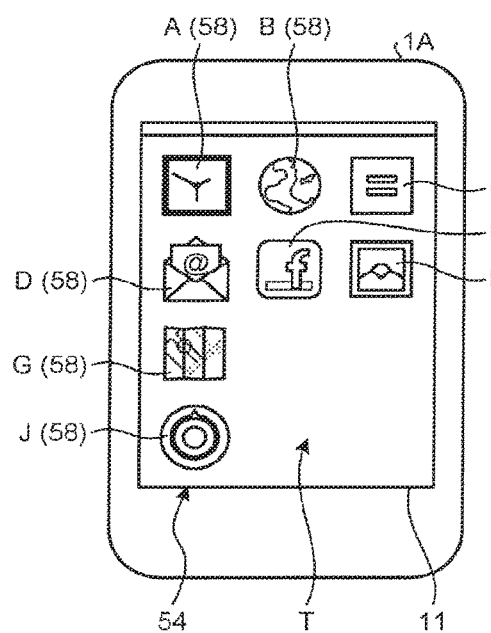
FIGS. 18(A) and 18(B) are explanatory diagrams of screens displayed on the operating panel.
Figure 18B:
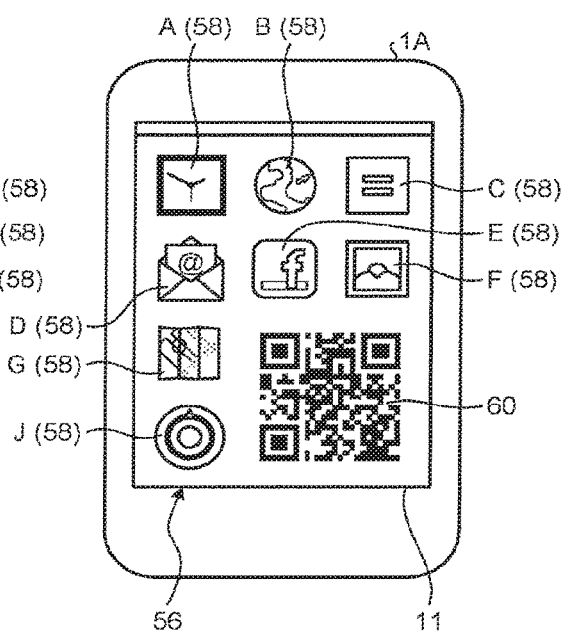

FIGS. 17(A) and 17(B) are diagrams of examples of data structures of the setting information 70 and arrangement information 72. FIGS. 18(A) and 18(B) are explanatory diagrams of screens displayed on an operating panel 11.

It is assumed that setting information 70B (refer to FIG. 17(A)) as the setting information 70 is stored in the storage unit 45, for example.

In this case, the second determining unit 44G arranges the symbolic images 58 identified by the respective APIDs ("A" to "J") registered in the setting information 70B at the display positions indicated by the corresponding display position information with the display sizes indicated by the corresponding display size information. With this processing, the second determining unit 44G recognizes the display positions and the display sizes of the respective symbolic images 58 on the standard screen 54 illustrated in FIG. 18(A).

The second determining unit 44G reads the display size information corresponding to the authentication image data of the authentication image 60 to be arranged registered in the authentication image DB 71. The second determining unit 44G then determines whether there is any vacant area the size of which is the display size of the display size information or more within the standard screen 54 in which the symbolic images 58 are arranged in accordance with the setting information 70B.

In this case, as illustrated in FIG. 18(A), the lower-right area T of the operating panel 11 is a vacant area where the authentication image 60 can be arranged. Given this situation, the second determining unit 44G determines the area T on the generated standard screen 54 to be the vacant area.

The setting unit 44H sets the vacant area (refer to the vacant area T in FIG. 18(A)) determined by the second determining unit 44G on the standard screen 54 (refer to FIG. 18(A)) in which the symbolic images 58 are arranged as the display position of the authentication image 60 on the authentication screen 56 (refer to FIG. 18(B)).

In this case, the setting unit 44H generates arrangement information 72B illustrated in FIG. 17(B) from the setting information 70B illustrated in FIG. 17(A), for example. The arrangement information 72B is setting information that prescribes vacant areas where no APID is arranged in the setting information 70B as the display position of the authentication image 60. In FIG. 17(B), "QR" is the identification information of the authentication image 60.

With this processing, the setting unit 44H generates the arrangement information 72B that prescribes the display position information of the symbolic images 58 identified by the respective APIDs indicated by the setting information 70B and the display position information indicating the set display position of the authentication image 60.

The display controller 44I arranges the symbolic images 58 identified by the respective APIDs prescribed in the arrangement information 72B at the display positions indicated by the corresponding display position information based on the arrangement information 72B. The display controller 44I arranges the authentication image 60 at the display position indicated by the display position information corresponding to the identification information ("QR" in FIG. 17(B)) indicating the authentication image 60 prescribed in the arrangement information 72B based on the arrangement information 72B. With this processing, the display controller 44I generates the authentication screen 56 based on the arrangement information 72B and displays the authentication screen 56 on the operating panel 11 (refer to FIG. 18(B)).

With this processing, the display controller 44I displays the authentication screen 56 in which the authentication image 60 is arranged at the vacant area determined by the second determining unit 44G on the standard screen 54 on the operating panel 11 (refer to FIG. 18(B)).

In contrast, if the second determining unit 44G determines that there is no vacant area, the setting unit 44H sets the symbolic images 58 identified by at least one APID in the setting information 70 to be hidden from the authentication screen 56 so as to enable the authentication image 60 to be arranged.

In this process, the setting unit 44H may set the symbolic images 58 arranged at predetermined display positions to be hidden from the authentication screen 56, for example. The setting unit 44H may set a plurality of symbolic images 58 arranged at the central part of the screen to be hidden from the authentication screen 56, for example.

The setting unit 44H may set the symbolic images 58 to be hidden from the authentication screen 56 based on the exclusion affirmative/negative information registered in the setting information 70.

It is assumed that the setting information 70A (refer to FIG. 14) as the setting information 70 is stored in the storage unit 45, for example.

In this case, the second determining unit 44G arranges the symbolic images 58 identified by the respective APIDs ("A" to "L") registered in the setting information 70A at the display positions indicated by the corresponding display position information with the display sizes indicated by the corresponding display size information.

Figure 19A:
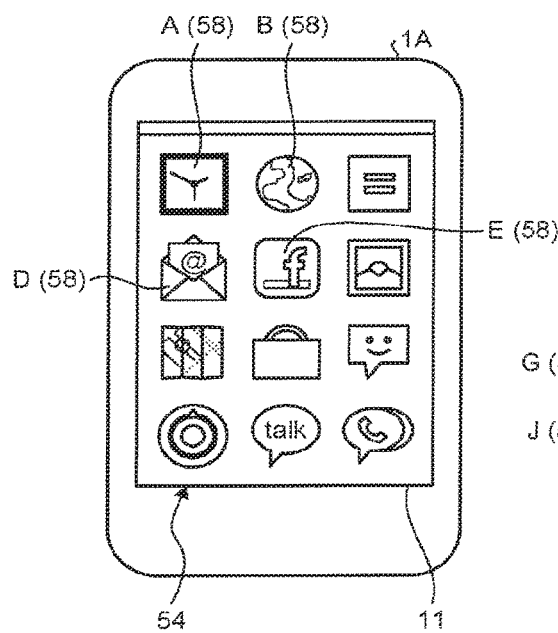
FIGS. 19(A) and 19(B) are schematic diagrams of an example of a screen transition.
Figure 19B:
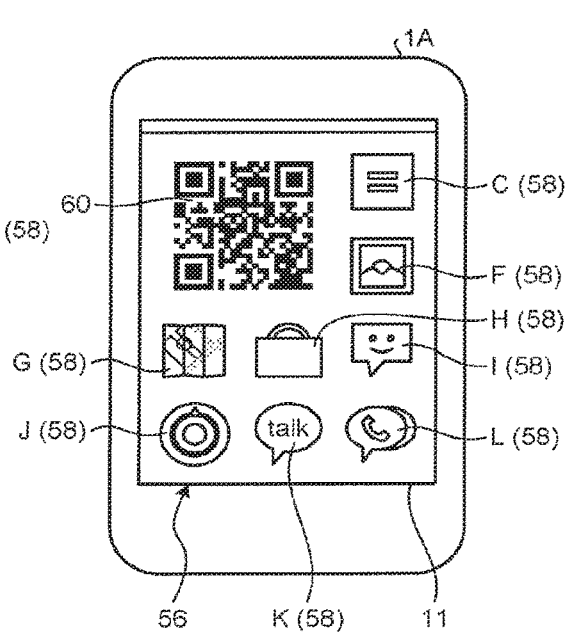

FIGS. 19(A) and 19(B) are schematic diagrams of an example of a screen transition. With this processing, the second determining unit 44G recognizes the display positions and the display sizes of the respective symbolic images 58 on the standard screen 54 illustrated in FIG. 19(A).

The second determining unit 44G reads the display size information corresponding to the authentication image data of the authentication image 60 to be arranged registered in the authentication image DB 71. The second determining unit 44G then determines whether there is any vacant area the size of which is the display size of the display size information or more within the standard screen 54 in which the symbolic images 58 are arranged in accordance with the setting information 70A.

There is no vacant area where the authentication image 60 can be arranged, on the standard screen 54 illustrated in FIG. 19(A). Consequently, in this case, the second determining unit 44G determines that there is no vacant area.

When it is determined that there is no vacant area, the setting unit 44H selects the APIDs indicating exclusion "affirmative" in the setting of the "exclusion affirmative/negative information" from among the respective APIDs ("A" to "L") registered in the setting information 70A (refer to FIG. 14). In the example illustrated in FIG. 14, the setting unit 44H selects the APIDs "A," "B," "D," "E," and "F." The setting unit 44H then sets the symbolic images 58 identified by the selected APIDs to be hidden from the authentication screen 56.

The setting unit 44H may set the symbolic images 58 for ensuring a minimum vacant area required for arranging the authentication image 60 to be arranged among the symbolic images 58 identified by the APIDs indicating exclusion "affirmative" in the setting of the "exclusion affirmative/negative information" to be hidden from the authentication screen 56. The setting unit 44H may select the APIDs "A," "B," "D," and "E," for example. The setting unit 44H then sets the symbolic images 58 identified by the selected APIDs to be hidden from the authentication screen 56.

In other words, the symbolic images 58 identified by the APIDs "A," "B," "D," and "E" on the standard screen 54 illustrated in FIG. 19(A) are set to be hidden from the authentication screen 56.

The setting unit 44H generates the arrangement information 72 indicating the authentication screen 56 (refer to FIG. 19(B)) in which the authentication image 60 is arranged at the display positions of the symbolic images 58 set to be hidden on the standard screen 54 in which the symbolic images 58 are arranged. In other words, the setting unit 44H sets the display positions of the authentication screen 56 set to be hidden from the authentication screen 56 among the symbolic images 58 contained in the standard screen 54 as the display position of the authentication image 60.

In other words, the setting unit 44H generates the arrangement information 72 that prescribes the display position information of the symbolic images 58 other than the symbolic images 58 set to be hidden among the symbolic images 58 identified by the respective APIDs indicated by the setting information 70A and the display position information indicating the display position of the authentication image 60.

In this case, the setting unit 44H generates arrangement information 72A illustrated in FIG. 20 from the setting information 70A illustrated in FIG. 14, for example. FIG. 20 is a diagram of an example of a data configuration of the arrangement information 72A. The arrangement information 72A is setting information that prescribes the display position information corresponding to the respective APIDs of the symbolic images 58 set to be hidden from the authentication screen 56 in the setting information 70A as the display position information of the authentication image 60. In FIG. 20, "QR" is the identification information of the authentication image 60.

The setting unit 44H thus generates the arrangement information 72A (refer to FIG. 20) that prescribes the display position information of the symbolic images 58 other than the symbolic images 58 set to be hidden among the symbolic images 58 identified by the respective APIDs indicated by the setting information 70A and the display position information indicating the display position of the authentication image 60.

The display controller 44I then displays the authentication screen 56 in which the symbolic images 58 other than the symbolic images 58 set to be hidden in the setting information 70 and the authentication image 60 are arranged on the operating panel 11.

In other words, the display controller 44I arranges the symbolic images 58 identified by the respective APIDs prescribed in the arrangement information 72A at the display positions indicated by the corresponding display position information based on the arrangement information 72A (refer to FIG. 20). The display controller 44I arranges the authentication image 60 at the display position indicated by the display position information corresponding to the identification information ("QR" in FIG. 20) indicating the authentication image 60 prescribed in the arrangement information 72A based on the arrangement information 72A. The display controller 44I arranges the authentication image 60 with the display size indicated by the corresponding display size information prescribed in the authentication image DB 71.

With this processing, the display controller 44I generates the authentication screen 56 based on the arrangement information 72B and displays the authentication screen 56 on the operating panel 11 (refer to FIG. 19(B)).

With this processing, the display controller 44I displays the authentication screen 56 in which the authentication image 60 is arranged at the display positions of the symbolic images 58 set to be hidden by the setting unit 44H on the standard screen 54 on the operating panel 11 (refer to FIG. 19(B)).

Even when the symbolic images 58 identified by the respective APIDs in which "affirmative," which indicates excludable, is registered in the exclusion affirmative/negative information indicated in the setting information 70 are set to be hidden, an area where the authentication image 60 to be arranged can be arranged may fail to be ensured.

In such a case, the setting unit 44H may change the display position of the symbolic image 58 identified by the APID in which "affirmative," which indicates that the display position can be changed, is registered in the display position change affirmative/negative information in the setting information 70 so as to enable the authentication image 60 to be arranged to be arranged.

Figure 21:
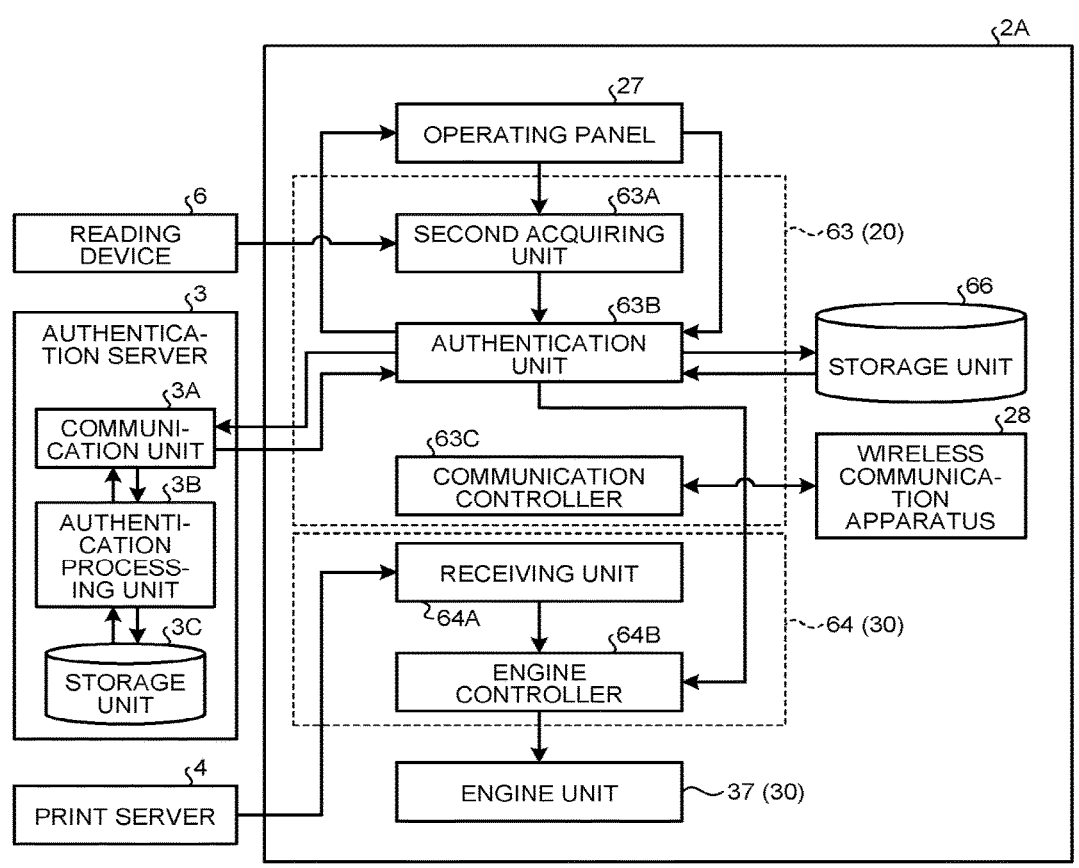
FIG. 21 is a block diagram of a functional configuration example of an information processing apparatus.

The following describes a functional configuration of the information processing apparatus 2A. FIG. 21 is a block diagram of a functional configuration example of the information processing apparatus 2A.

The information processing apparatus 2A includes the operating panel 27, a controller 63, the storage unit 66, the wireless communication apparatus 28, the controller 64, and the engine unit 37. The operating panel 27 and the storage unit 66 are connected to the controller 63 so as to enable data and the like to be exchanged therewith. The controller 63 and the controller 64 are connected to each other so as to enable data and the like to be exchanged with each other. The controller 64 and the engine unit 37 are connected to each other so as to enable data and the like to be exchanged with each other. The controller 63 and the storage unit 66 are provided in the operating unit (refer to FIG. 3). The controller 64 and the engine unit 37 are provided in the main body 30 (refer to FIG. 3).

The operating panel 27, the controller 64, the storage unit 66, the wireless communication apparatus 28, and the engine unit 37 are similar to those of the first embodiment. The controller 63 is similar to the controller 62 of the first embodiment except that it includes a communication controller 63C in place of the communication controller 62C.

The communication controller 63C controls the wireless communication apparatus 28. In the present embodiment, the communication controller 63C repeatedly transmits a transmission signal containing the information processing apparatus ID of the information processing apparatus 2A, the data amount of the authentication information for use in authentication in the information processing apparatus 2A, and the type information indicating the type of the user identification information contained in the authentication information for use in authentication in the information processing apparatus 2.

Figure 22:
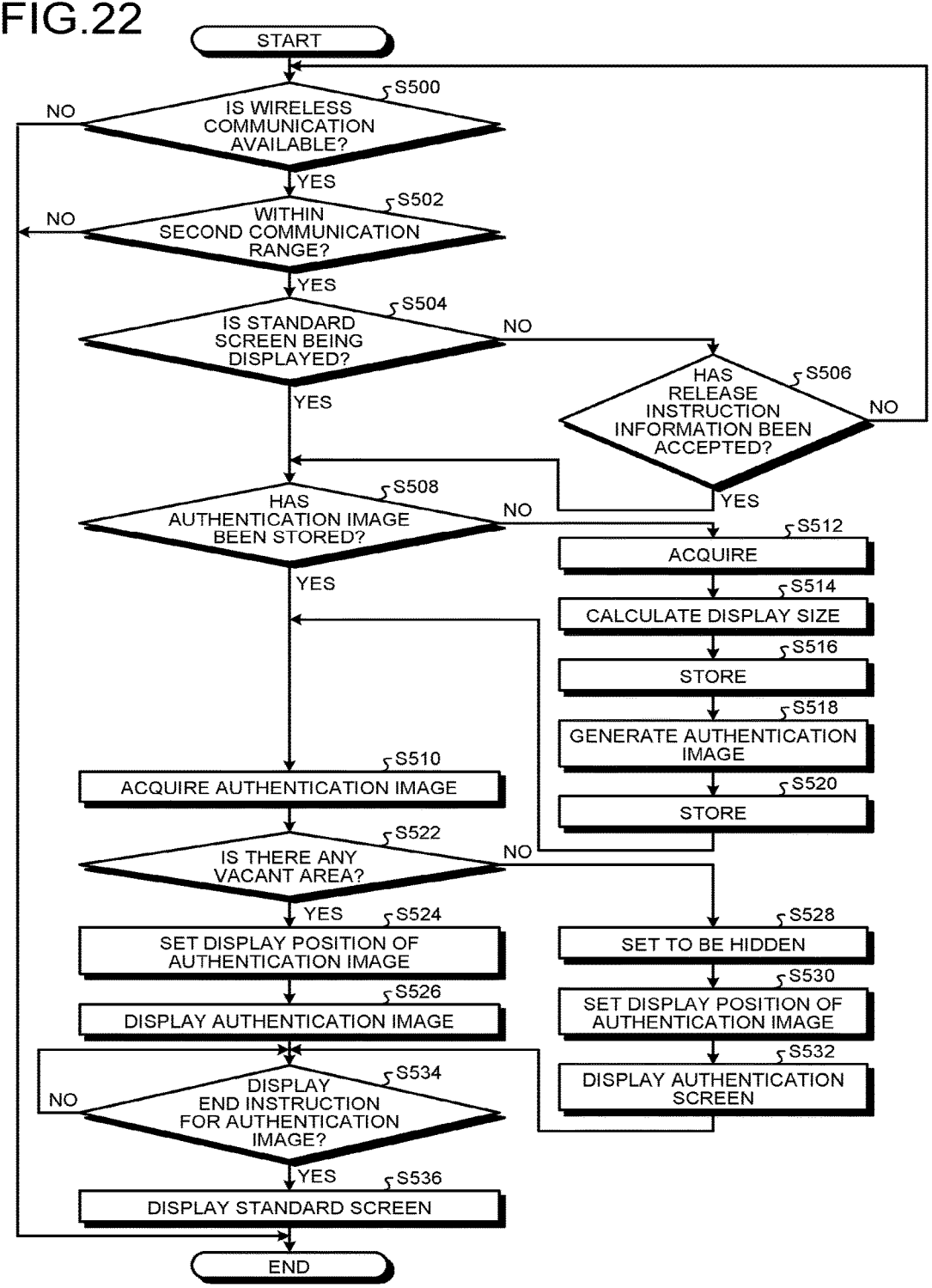
FIG. 22 is a flowchart of an example of the procedure of the display processing.

The following describes an example of a procedure of display processing that the terminal apparatus 1A of the present embodiment executes. FIG. 22 is a flowchart of an example of the procedure of the display processing that the terminal apparatus 1A of the present embodiment executes.

First, similarly to Step S300 to Step S305 (refer to FIG. 9) of the first embodiment, pieces of processing at Step S500 to Step S506 are executed.

In other words, first, the first determining unit 44A determines whether wireless communication is available with the information processing apparatus 2A (Step S500). If it is determined to be negative at Step S500 (No at Step S500), the present routine ends.

If it is determined to be affirmative at Step S500 (Yes at Step S500), the process advances to Step S502. At Step S502, the first determining unit 44A determines whether the terminal apparatus 1A is positioned within the second communication range S2 (Step S502). If it is determined to be negative at Step S502 (No at Step S502), the present routine ends.

If it is determined to be affirmative at Step S502 (Yes at Step S502), the process advances to Step S504. At Step S504, the display controller 44I determines whether the operating panel 11 is displaying the standard screen 54 (Step S504). If it is determined to be affirmative at Step S504 (Yes at Step S504), the process advances to Step S508.

If it is determined to be negative at Step S504 (No at Step S504), the process advances to Step S506. At Step S506, the display controller 44I determines whether the release instruction information has been accepted (Step S506). If it is determined to be negative at Step S506 (No at Step S506), the process returns to Step S500. In contrast, if it is determined to be affirmative at Step S506 (Yes at Step S506), the process advances to Step S508.

At Step S508, the first acquiring unit 44C determines whether the authentication image 60 to be arranged has been stored in the storage unit 45 (Step S508). The first acquiring unit 44C determines whether the authentication image data corresponding to the information processing apparatus ID contained in the transmission signal received from the information processing apparatus 2A at Step S500 has been registered in the authentication image DB 71 (refer to FIG. 16) of the storage unit 45. With this determination, the first acquiring unit 44C performs the determination at Step S508.

If it is determined to be affirmative at Step S508 (Yes at Step S508), the process advances to Step S510.

In contrast, if it is determined to be negative at Step S508 (No at Step S508), the process advances to Step S512. At Step S512, the first acquiring unit 44C acquires the data amount of the authentication information and the type information indicating the type of the user identification information contained in the authentication information contained in the transmission signal acquired from the information processing apparatus 2A at Step S500 (Step S512).

The first acquiring unit 44C may transmit a data request signal to the information processing apparatus 2A via the wireless communication apparatus 13 and acquire the data amount and the type information from the information processing apparatus 2A via the wireless communication apparatus 13.

Next, the calculating unit 44D calculates the display size information of the authentication image 60 in accordance with the data amount acquired at Step S512 (Step S514). The calculating unit 44D then registers the calculated display size information of the authentication image 60 in the authentication image DB 71 in association with the information processing apparatus ID contained in the transmission signal received from the information processing apparatus 2A at Step S500 (refer to FIG. 16). With this processing, the calculating unit 44D stores the display size information of the authentication image 60 in the storage unit 45 (Step S516).

Next, the generating unit 44E generates the authentication image 60 indicating the authentication information containing the user identification information of the type indicated by the type information acquired at Step S512 (Step S518).

The generating unit 44E then registers the authentication image data of the generated authentication image 60 in the authentication image DB 71 in association with the information processing apparatus ID contained in the transmission signal received at Step S500 (refer to FIG. 16). With this processing, the generating unit 44E stores the authentication image data in the storage unit 45 (Step S520). The process then advances to Step S510.

At Step S510, the decider 44F acquires the authentication image 60 of the authentication image data (Step S510). The decider 44F reads the authentication image data corresponding to the information processing apparatus ID contained in the transmission signal received from the information processing apparatus 2A at Step S500 from the authentication image DB 71, thereby acquiring the authentication image data.

Next, the second determining unit 44G determines whether there is any vacant area for arranging the authentication image 60 on the standard screen 54 in which the symbolic images 58 are arranged based on the setting information 70 (Step S522).

If it is determined that there is a vacant area (Yes at Step S522), the setting unit 44H sets the vacant area determined by the second determining unit 44G on the standard screen 54 as the display position of the authentication image 60 (Step S524). In other words, the setting unit 44H generates the arrangement information 72 (the arrangement information 72B) indicating the setting that arranges the authentication image 60 at the vacant area determined by the second determining unit 44G. As described above, the arrangement information 72 prescribes the display positions of the symbolic images 58 and the authentication image 60 on the authentication screen 56.

The display controller 44I generates the authentication screen 56 based on the arrangement information 72 generated at Step S524. The display controller 44I then performs control to display the generated authentication screen 56 on the operating panel (Step S526).

With the processing at Step S526, the operating panel 11 displays the authentication screen 56 in which the authentication image 60 is arranged at the vacant area on the standard screen 54 (refer to FIG. 18(B)). The process then advances to Step S534 described below.

In contrast, if the second determining unit 44G determines that there is no vacant area (No at Step S522), the process advances to Step S528. At Step S528, the setting unit 44H sets the symbolic images 58 identified by at least one APID registered in the setting information 70 to be hidden from the authentication screen 56 so as to enable the authentication image 60 to be arranged (Step S528).

Next, the setting unit 44H sets the display positions of the symbolic images 58 set to be hidden by the decider 44F on the standard screen 54 as the display position of the authentication image 60 (Step S530). In other words, the setting unit 44H generates the arrangement information 72 indicating the setting that arranges the authentication image 60 at the display positions of the symbolic images 58 set to be hidden from the authentication screen 56. In this case, the setting unit 44H generates the arrangement information 72A illustrated in FIG. 20 from the setting information 70A illustrated in FIG. 14, for example.

Next, the display controller 44I generates the authentication screen 56 based on the arrangement information 72 (the arrangement information 72A) generated at Step S530. The display controller 44I then performs control to display the generated authentication screen 56 on the operating panel 11 (Step S532).

With the processing at Step S532, the operating panel 11 displays the authentication screen 56 in which the authentication image 60 in place of the symbolic images 58 is arranged at the areas of the symbolic images 58 set hidden on the standard screen 54 (refer to FIG. 19(B)). The process then advances to Step S534 described below.

At Step S534, the accepting unit 44B determines whether it has accepted a display end instruction for the authentication image 60 from the operating panel 11 (Step S534). When the operating panel 11 displays the authentication image 60, the user holds the displayed authentication image 60 over the reading device 6. When the reading device 6 reads the authentication image 60, the user may instruct end of the display of the authentication image 60 by operating the operating panel 11. The accepting unit 44B may determine whether the display end instruction indicating the end of the display of the authentication image 60 has been accepted from the operating panel 11.

The accepting unit 44B repeats the negative determination (No at Step S534) until it is determined to be affirmative at Step S534 (Yes at Step S534). If it is determined to be affirmative at Step S534 (Yes at Step S534), the process advances to Step S536.

At Step S536, the display controller 44I performs control to display the standard screen 54 on the operating panel 11 based on the setting information 70 (Step S536). In other words, the display controller 44I arranges the symbolic images 58 identified by the respective APIDs prescribed in the setting information 70 at the display positions indicated by the display position information prescribed in the setting information 70 with the display sizes prescribed in the setting information 70, thereby generating the standard screen 54. The display controller 44I then performs control to display the generated standard screen 54 on the operating panel 11. Consequently, the authentication image 60 is made hidden from the operating panel 11.

The present routine then ends.

The following describes an example of a procedure of authentication processing executed by the information processing apparatus 2A. The authentication processing executed by the information processing apparatus 2A is similar to that by the information processing apparatus 2 of the first embodiment except that the communication controller 63C repeatedly transmits the transmission signal via the wireless communication apparatus 28 (refer to FIG. 10). Given this situation, the present embodiment omits the description.

As described above, the terminal apparatus 1A of the authentication system 1000A of the present embodiment includes the storage unit 45 and the decider 44F in addition to the configuration of the terminal apparatus 1 of the first embodiment.

The storage unit 45 stores therein the setting information 70 and the display size information of the authentication image 60. The setting information 70 is information that associates the symbolic images 58 arranged on the standard screen 54, the display position information indicating the display positions of the symbolic images 58 on the standard screen 54, and the display size information of the symbolic images 58 with each other. The decider 44F decides the display positions of the symbolic images 58 and the authentication image 60 on the authentication screen 56 based on the setting information 70 and the display size information of the authentication image 60. The display controller 44I performs control to display the authentication screen 56 in which the symbolic images 58 and the authentication image 60 are arranged at the decided positions on the operating panel 11 (the display unit).

Consequently, the authentication system 1000A of the present embodiment can display the authentication screen 56 with the display position of the authentication image 60 adjusted in accordance with the symbolic images 58 contained in the standard screen 54 in addition to the effect of the first embodiment.

The decider 44F preferably includes the second determining unit 44G and the setting unit 44H. The second determining unit 44G determines whether there is any vacant area for arranging the authentication image 60 on the standard screen 54 based on the setting information 70 and the display size information of the authentication image 60. If it is determined that there is no vacant area, the setting unit 44H sets at least one symbolic image 58 in the setting information 70 to be hidden from the authentication screen 56 so as to enable the authentication image 60 to be arranged. The display controller 44I then displays the authentication screen 56 in which the symbolic images 58 other than the symbolic images 58 set to be hidden in the setting information 70 and the authentication image 60 are arranged on the operating panel 11 (the display unit).

Consequently, the authentication system 1000A of the present embodiment can display the authentication screen 56 in which the authentication image 60 is arranged on the standard screen 54 even when the standard screen 54 does not contain any vacant area where the authentication image 60 can be arranged.

If it is determined that there is a vacant area, the setting unit 44H sets the vacant area on the standard screen 54 as the display position of the authentication image 60 on the authentication screen 56. The display controller 44I displays the authentication screen 56 in which the symbolic images 58 in the setting information 70 are arranged at the display positions indicated by the corresponding display position information and the authentication image 60 is arranged at the display position set by the setting unit 44H on the operating panel 11 (the display unit).

Consequently, the authentication system 1000A of the present embodiment can display the authentication screen 56 in which the authentication image 60 is arranged at the vacant area on the standard screen 54.

The authentication information preferably contains one or a plurality of types of user identification information. The terminal apparatus 1A preferably further includes the first acquiring unit 44C, the calculating unit 44D, and the generating unit 44E.

The first acquiring unit 44C acquires the data amount of the authentication information and the type information indicating the type of the user identification information contained in the authentication information from the information processing apparatus 2A. The calculating unit 44D calculates the display size information of the authentication image 60 in accordance with the data amount. The generating unit 44E generates the authentication image 60 indicating the authentication information containing the user identification information of the type of the type information.

Consequently, the authentication system 1000A of the present embodiment can dynamically generate the authentication image 60 for use in the information processing apparatus 2A to be authenticated in the terminal apparatus 1A in addition to the effect of the first embodiment.

Third Embodiment

The present embodiment describes processing of the information processing apparatus 2 when a different user other than the user who enters the second communication range S2 while carrying the terminal apparatus 1 is operating the information processing apparatus 2 in advance.

FIG. 1 is a schematic diagram of an example of a configuration of an authentication system 1000B of the present embodiment. The authentication system 1000B is similar to the authentication system 1000 of the first embodiment except that it includes an information processing apparatus 2B in place of the information processing apparatus 2. A hardware configuration of the information processing apparatus 2B is similar to the hardware configuration of the information processing apparatus 2 (refer to FIG. 3).

Figure 23:
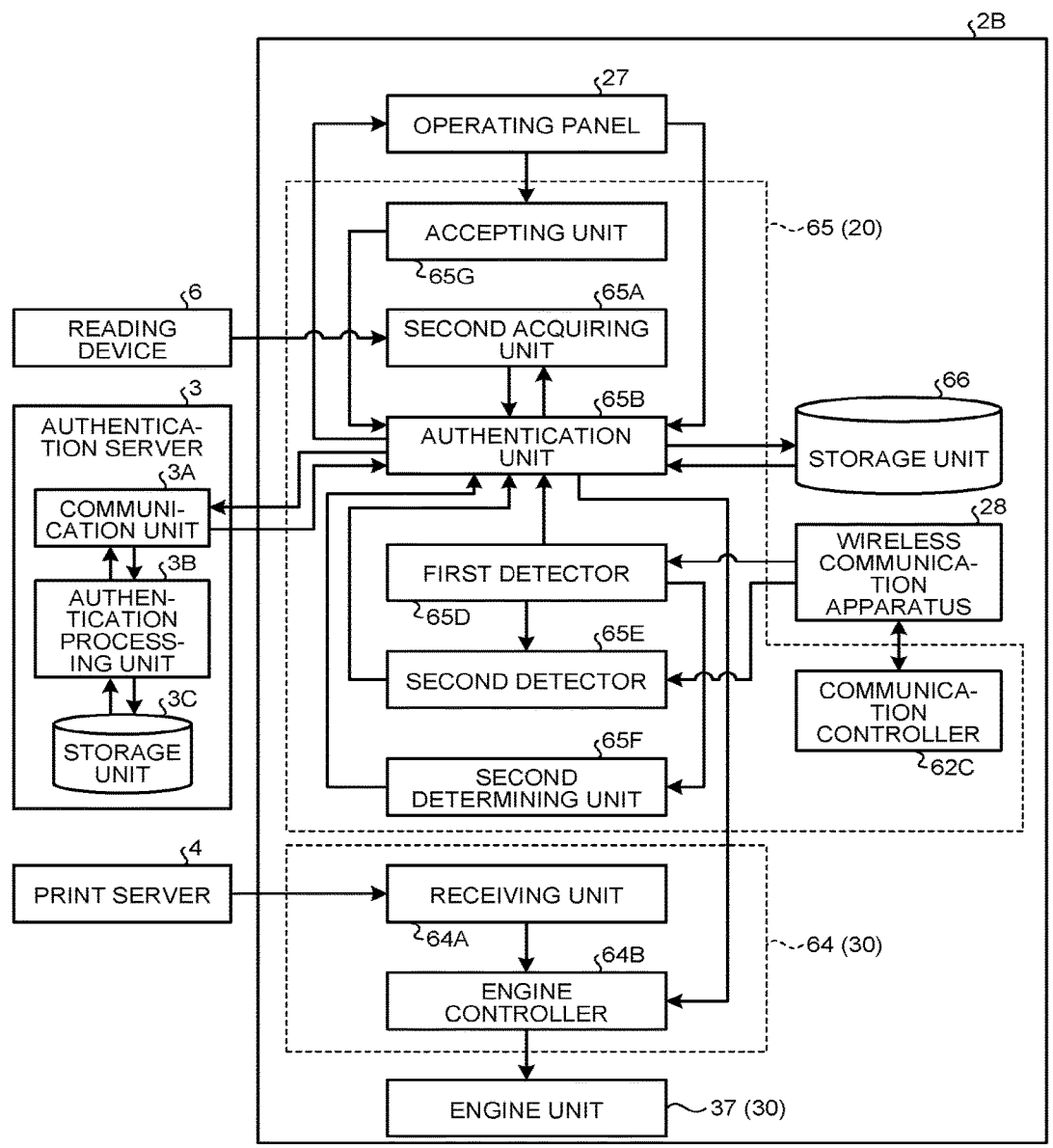
FIG. 23 is a block diagram of a functional configuration example of an information processing apparatus.

FIG. 23 is a block diagram of a functional configuration example of the information processing apparatus 2B.

The information processing apparatus 2B includes the operating panel 27, a controller 65, the storage unit 66, the wireless communication apparatus 28, the controller 64, and the engine unit 37. The operating panel 27 and the storage unit 66 are connected to the controller 65 so as to enable data and the like to be exchanged therewith. The controller 65 and the controller 64 are connected to each other so as to enable data and the like to be exchanged with each other. The controller 64 and the engine unit 37 are connected to each other so as to enable data and the like to be exchanged with each other. The controller 65 and the storage unit 66 are provided in the operating unit (refer to FIG. 3). The controller 64 and the engine unit 37 are provided in the main body 30 (refer to FIG. 3).

The information processing apparatus 2B is similar to the information processing apparatus 2 of the first embodiment except that it includes the controller 65 in place of the controller 62.

The controller 65 controls the operating unit 20. The controller 65 is implemented by the CPU 21, the ROM 22, the RAM 23, and the like. The controller 65 may be implemented by a circuit and the like.

The controller 65 includes an accepting unit 65G, a second acquiring unit 65A, an authentication unit 65B, a communication controller 62C, a first detector 65D, a second detector 65E, and a second determining unit 65F. Part or the whole of the accepting unit 65G, the second acquiring unit 65A, the authentication unit 65B, the communication controller 62C, the first detector 65D, the second detector 65E, and the second determining unit 65F may be implemented by causing a processor such as the CPU 21 to execute computer programs (that is, software), implemented by hardware such as an IC, or implemented by using both of them, for example.

The second acquiring unit 65A acquires the authentication information similarly to the second acquiring unit 62A of the first embodiment. The second acquiring unit 65A acquires the authentication image data as the read result of the authentication image 60 from the reading device 6, for example. The second acquiring unit 65A then decodes the acquired authentication image data using a known method, thereby acquiring the authentication information indicated by the authentication image 60.

The second acquiring unit 65A can also acquire the authentication information from the operating panel 27. In this case, the second acquiring unit 65A displays a login screen on the operating panel 27. The login screen contains an entry field for receiving input of the user identification information contained in the authentication information. The user directly inputs the user identification information via the login screen. The second acquiring unit 65A then acquires the authentication information from the operating panel 27.

The authentication unit 65B performs authentication similarly to the authentication unit 62B of the first embodiment. The authentication unit 65B authenticates whether the execution of the function provided in the information processing apparatus 2B is permitted for the user identified by the user identification information contained in the authentication information. This authentication may also be referred to as user authentication. The execution of the function provided in the information processing apparatus 2B is permitted, whereby the user is what is called "logged in" to the information processing apparatus 2B.

In the present embodiment, the authentication unit 65B issues an authentication request to the authentication server 3 similarly to the authentication unit 62B of the first embodiment. Specifically, the authentication unit 62B transmits authentication request information containing the authentication information accepted by the second acquiring unit 62A to the authentication server 3.

The authentication server 3 is similar to that of the first embodiment. Upon reception of the authentication request information from the information processing apparatus 2B, the authentication server 3 performs the authentication processing. The authentication server 3 then transmits the authentication result containing normal authentication or abnormal authentication to the information processing apparatus 2B.

The authentication unit 65B of the information processing apparatus 2B receives the authentication result from the authentication server 3 via the communication I/F (refer to FIG. 3). If the received authentication result contains normal authentication, the authentication unit 65B outputs the authentication result (containing the authentication information and the authority information) to the controller 64.

When the authentication result contains normal authentication, the authentication unit 65B stores the user identification information used in the authentication in the storage unit 66 as logged-in user identification information. The authentication unit 65B displays an operation screen containing a button image for selecting the function of the information processing apparatus 2B indicated by the authority information contained in the authentication result on the operating panel 27.

Consequently, in the case of normal authentication, the operating panel 27 displays, for the user identified by the user identification information contained in the authentication information, the operation screen containing the button image that can instruct the execution of the function permitted to the user. Consequently, the information processing apparatus 2B becomes able to execute the function corresponding to the button image contained in the operation screen.

In contrast, if the received authentication result contains abnormal authentication, the authentication unit 65B transmits the authentication result indicating abnormal authentication to the input source (the operating panel 27 or the terminal apparatus 1) of the authentication information.

The accepting unit 65G accepts an operation instruction from the user from the operating panel 27. Specifically, the accepting unit 65G accepts the operation instruction by the user from the operating panel 11 from when the execution of the function is permitted by the authentication unit 65B until logging out.

The first detector 65D detects whether the terminal apparatus 1 has entered the first communication range S1. Similarly to the first determining unit 40A of the terminal apparatus 1, the first detector 65D may detect whether the terminal apparatus 1 has entered the first communication range S1 using a signal received from the terminal apparatus 1 by the wireless communication apparatus 28.

The second detector 65E detects whether the terminal apparatus 1 is positioned within the second communication range S2. Similarly to the first determining unit 40A of the terminal apparatus 1, the first detector 65D may detect whether the terminal apparatus 1 is positioned within the second communication range S2 using the signal intensity of the signal received from the terminal apparatus 1 by the wireless communication apparatus 28.

The second determining unit 65F determines the presence or absence of a user who is permitted to execute the function of the information processing apparatus 2B when the first detector 65D detects the entrance of the terminal apparatus 1 into the first communication range S1. In other words, the second determining unit 65F determines the presence or absence of a user who is logged in to the information processing apparatus 2B. The second determining unit 65F determines whether there is any logged-in user by determining whether the logged-in user identification information is stored in the storage unit 66, for example.

In the present embodiment, when the first detector 65D detects that the terminal apparatus 1 has entered the first communication range S1, the authentication unit 65B performs the following processing. In other words, when the second determining unit 65F determines that the user who is permitted to execute the function (who is logged in) is present, when the terminal apparatus 1 is positioned within the second communication range S2, and when the acceptance of an operation instruction from the user is absent for a predetermined time or more, the authentication unit 65B disables the execution of the function for the logged-in user.

After the execution of the function has been disabled for the logged-in user by the authentication unit 65B, the second acquiring unit 65A acquires the authentication information from the read result of the reading device 6 that reads the authentication image 60.

The following describes an example of a procedure of authentication processing executed by the information processing apparatus 2B of the present embodiment. The display processing of the terminal apparatus 1 is similar to that of the first embodiment, and a description thereof will be omitted.

Figure 24:
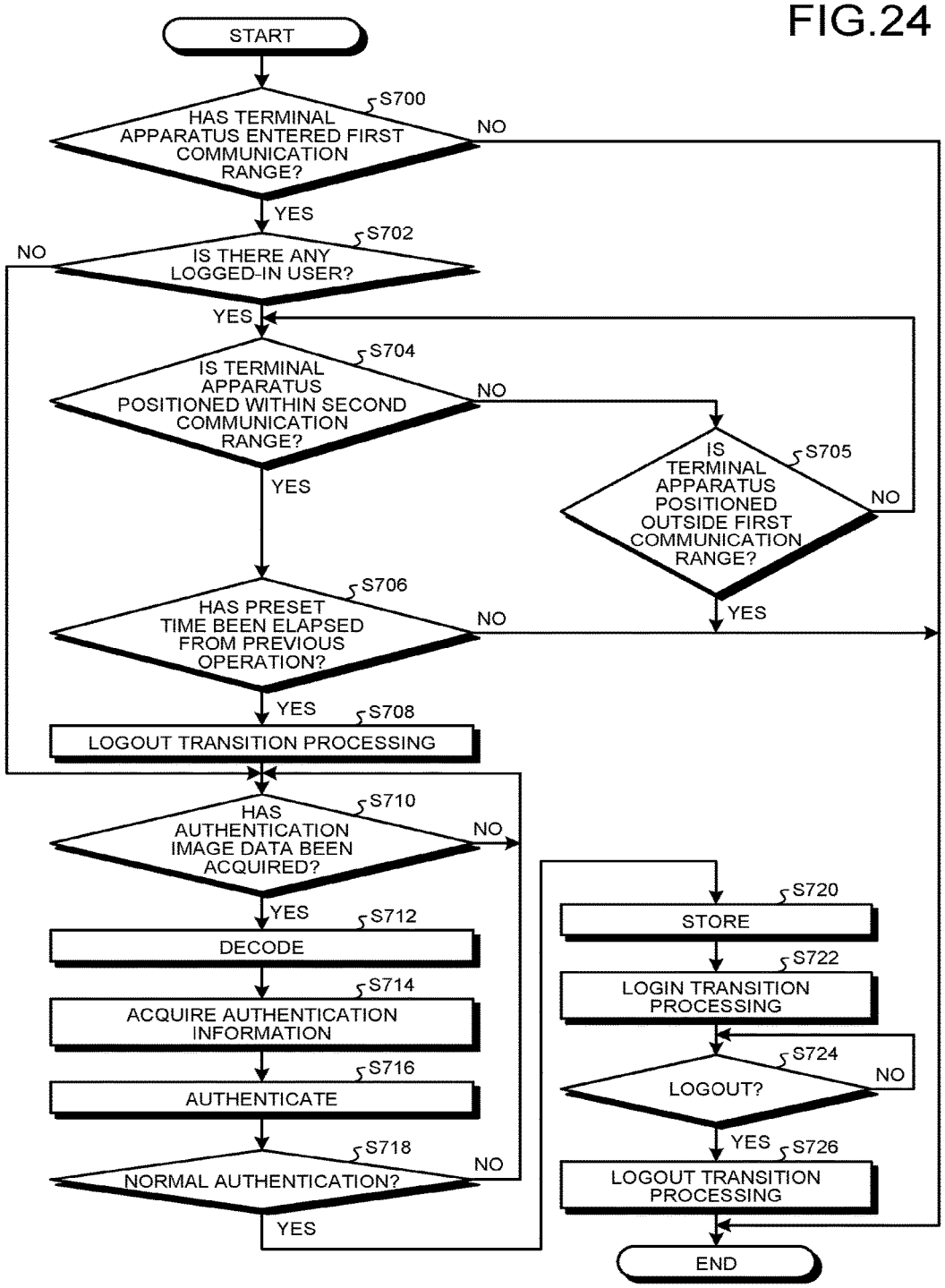
FIG. 24 is a flowchart of an example of the procedure of the authentication processing.

FIG. 24 is a flowchart of an example of the procedure of the authentication processing executed by the information processing apparatus 2B of the present embodiment.

First, the first detector 65D detects whether the terminal apparatus 1 has entered the first communication range S1 of the information processing apparatus 2B (Step S700). If it is determined to be negative at Step S700 (No at Step S700), the present routine ends. If it is determined to be affirmative at Step S700 (Yes at Step S700), the process advances to Step S702.

At Step S702, the second determining unit 65F determines whether there is any user who is permitted to execute the function of the information processing apparatus 2B (Step S702). In other words, the second determining unit 65F determines whether there is any user who is logged in to the information processing apparatus 2B.

If it is determined that there is no logged-in user (No at Step S702), the process advances to Step S710 described below.

In contrast, if it is determined that there is a logged-in user (Yes at Step S702), the process advances to Step S704.

At Step S704, the second detector 65E determines whether the terminal apparatus 1, the entrance into the first communication range S1 of which has been detected at Step S700, is positioned within the second communication range S2 (Step S704). If the terminal apparatus 1 is positioned outside the second communication range S2 (No at Step S704), the process advances to Step S705.

At Step S705, the first detector 65D determines whether the terminal apparatus 1, the entrance into the first communication range S1 of which has been detected at Step S700, is positioned outside the first communication range S1. If it is determined that the terminal apparatus 1 is positioned outside the first communication range S1 (Yes at Step S705), the present routine ends. If it is determined that the terminal apparatus 1 is positioned within the first communication range S1 (No at Step S705), the process returns to Step S704.

At Step S704, if it is determined that the terminal apparatus 1 is positioned within the second communication range S2 (Yes at Step S704), the process advances to Step S706.

At Step S706, the authentication unit 65B determines whether a predetermined time has been elapsed from the acceptance of the previous operation instruction (Step S706). In other words, the authentication unit 65B determines whether the predetermined time has been elapsed from when the accepting unit 65G accepted the operation instruction by the user from the operating panel 27 the previous time.

If it is determined to be negative at Step S706 (No at Step S706), the present routine ends. If it is determined affirmative at Step S706 (Yes at Step S706), the process advances to Step S708.

At Step S708, the authentication unit 65B executes logout transition processing (Step S708). The logout transition processing is processing to delete the logged-in user identification information stored in the storage unit 66 from the storage unit 66. The logout transition processing also includes processing to display a login screen containing an entry field for receiving input of the user identification information of a new user on the operating panel 27. Consequently, the information processing apparatus 2B makes a transition to a state (a logout state) that disables the execution of the function provided in the information processing apparatus 2B for the user identified by the user identification information used in the immediately preceding login transition processing.

Next, the second acquiring unit 65A determines whether it has acquired the authentication image data of the authentication image 60 from the reading device 6 (Step S710). At Step S710, the negative determination (No at Step S710) is repeated until it is determined to be affirmative (Yes at Step S710).

If it is determined to be affirmative (Yes at Step S710), the process advances to Step S712.

At Step 712, the second acquiring unit 65A decodes the authentication image data acquired at Step S710 using a known method (Step S712). With this processing, the second acquiring unit 65A acquires the authentication information indicated by the authentication image 60 (Step S714).

Next, the authentication unit 65B performs authentication using the authentication information acquired at Step S714 (Step S716).

Next, if the authentication result is normal authentication (Yes at Step S718), the authentication unit 65B stores the user identification information indicated by the authentication information in the storage unit 66 (Step S720).

The authentication unit 65B then executes login transition processing (Step S722). The login transition processing is similar to that of the first embodiment.

Next, the authentication unit 65B determines whether logout has been instructed (Step S724). The authentication unit 65B performs the determination at Step S724 by determining whether logout has been instructed by an operation instruction on the operating panel 27 by the user, for example.

The authentication unit 65B repeats the negative determination (No at Step S724) until it is determined to be affirmative at Step S724 (Yes at Step S724). If it is determined to be affirmative at Step S724 (Yes at Step S724), the process advances to Step S726.

At Step S726, the authentication unit 65B performs the logout transition processing similarly to Step S708 (Step S726). The present routine then ends.

As described above, the authentication system 1000B of the present embodiment includes the information processing apparatus 2B. The information processing apparatus 2B includes the second acquiring unit 65A, the accepting unit 65G, the authentication unit 65B, the first detector 65D, the second detector 65E, and the second determining unit 65F.

The second acquiring unit 65A acquires the authentication information containing the user identification information. The authentication unit 65B authenticates whether the execution of the function provided in the information processing apparatus 2B is permitted for the user identified by the user identification information. The accepting unit 65G accepts an operation instruction from the user. The first detector 65D detects whether the terminal apparatus 1 has entered the first communication range S1. The second detector 65E detects whether the terminal apparatus 1 is positioned within the second communication range S2.

The second determining unit 65F determines the presence or absence of a user who is permitted to execute the function of the information processing apparatus 2B when the entrance of the terminal apparatus 1 into the first communication range S1 is detected. When it is detected that the terminal apparatus 1 has entered the first communication range S1, when it is determined that the user who is permitted to execute the function is present, when the terminal apparatus 1 is positioned within the second communication range S2, and when the acceptance of an operation instruction from the user is absent for a predetermined time or more, the authentication unit 65B disables the execution of the function for the permitted user. After the execution of the function for the user has been disabled, the second acquiring unit 65A acquires the authentication information from the read result of the reading device 6 that reads the authentication image 60.

When the terminal apparatus 1 carried by the user has entered the first communication range S1 along with the movement of the user, a different user may have already logged in to the information processing apparatus 2B positioned at the center of the first communication range S1. The user may further move toward the information processing apparatus 2B to which the different user has logged in, and the terminal apparatus 1 carried by the user may enter the second communication range S2 along with the movement of the user.

As described above, in the present embodiment, when it is detected that the terminal apparatus 1 has entered the first communication range S1, when it is determined that the user who is permitted to execute the function is present, when the terminal apparatus 1 is positioned within the second communication range S2, and when the acceptance of an operation instruction from the user is absent for a predetermined time or more, the authentication unit 65B of the information processing apparatus 2B disables the execution for the permitted (logged in) user. After the execution of the function for the user has been disabled, that is, logging out, the second acquiring unit 65A acquires the authentication information from the read result of the authentication image 60 by the reading device 6.

Consequently, when the user carrying the terminal apparatus 1 has entered the first communication range S1, when the different user has already logged in to the information processing apparatus 2B positioned at the center of the first communication range S1, when an operation by the different user is absent for a predetermined time or more, and when the terminal apparatus 1 has further entered the second communication range S2, the information processing apparatus 2B executes logout processing for the logged-in user. The information processing apparatus 2B then becomes able to accept the authentication image 60 from the reading device 6.

Consequently, before the user who has entered the first communication range S1 further reaches the second communication range S2 and holds the authentication image 60 displayed on the terminal apparatus 1 over the reading device 6, the information processing apparatus 2B can execute the logout processing for the user who has already logged in thereto.

Various kinds of information stored in the information processing apparatuses 2, 2A, and 2B of the embodiments in advance may be stored in the authentication server 3, the print server 4, a storage medium such as an external hard disk drive, an external apparatus (not illustrated), or the like connected to the network 7.

As a matter of course, the system configuration in which the main body 30 and the operating unit 20 are connected to each other in the information processing apparatuses 2, 2A, and 2B described in the embodiments is an example, and there are various system configuration examples in accordance with uses and objects.

Computer programs for executing the display processing and the authentication processing executed by the terminal apparatuses 1 and 1A and the information processing apparatuses 2, 2A, and 2B in the embodiments may be recorded and provided in a computer-readable recording medium such as a compact disc read only memory (CD-ROM), a flexible disk (FD), a compact disc recordable (CD-R), a digital versatile disc (DVD), and a Universal Serial Bus (USB) memory as an installable or executable file or provided or distributed via a network such as the Internet. The various kinds of computer programs may be embedded and provided in a ROM, for example.

Although some embodiments have been described, these embodiments have been presented by way of example and do not intend to limit the scope of the invention. These novel embodiments can be performed in various other forms, and various omissions, replacements, and changes can be made without departing from the essence of the invention. These embodiments are included in the scope and essence of the invention and are included in the inventions described in the claims and equivalents thereof.

Second Embodiment

The following describes a second embodiment using the same configurations as the example of the configuration of the authentication system in FIG. 1, the example of the hardware configuration of the terminal apparatus in FIG. 2, the example of the hardware configuration of the information processing apparatus in FIG. 3, and the example of the software configuration of the information processing apparatus in FIG. 4 referred to in the first embodiment.

First Embodiment

Figure 25:
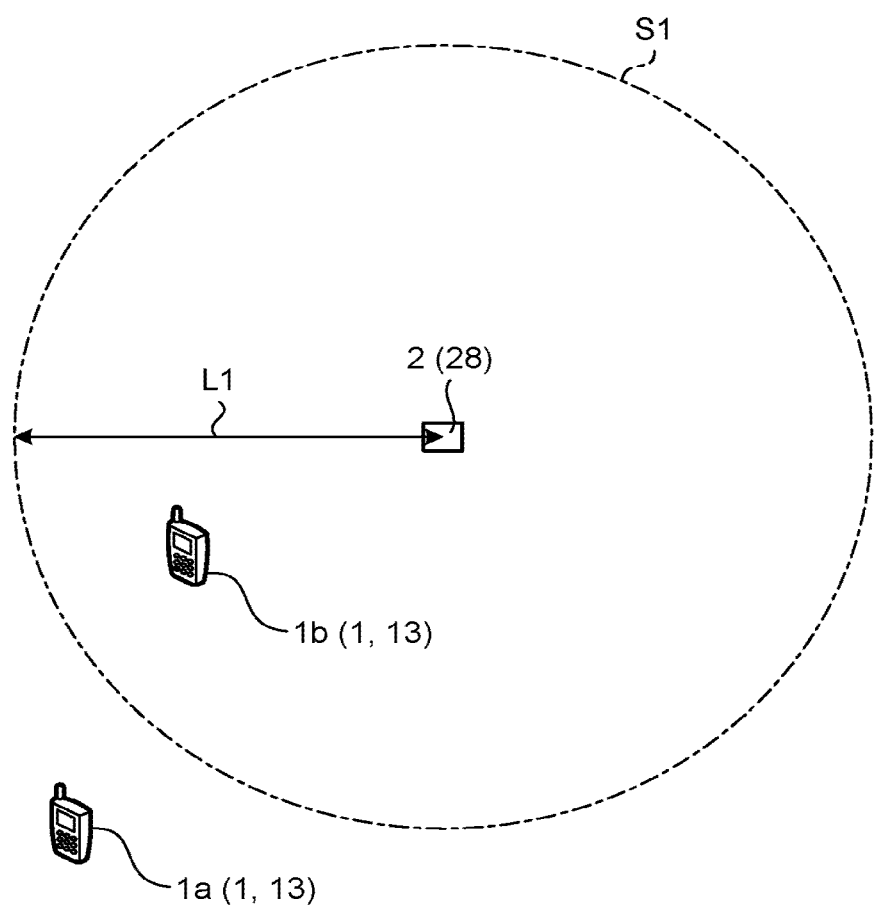
FIG. 25 is a schematic diagram of an example of a wireless communication range according to a second embodiment.

FIG. 25 is a schematic diagram of an example of a wireless communication range. As described above, the information processing apparatus 2 includes the wireless communication apparatus 28, whereas the terminal apparatus 1 includes the wireless communication apparatus 13. With this configuration, the information processing apparatus 2 and the terminal apparatus 1 can wirelessly communicate with each other via the wireless communication apparatus 28 and the wireless communication apparatus 13.

The following description will be given based on the premise that the information processing apparatus 2 is fixedly arranged in the real space. In contrast, the terminal apparatus 1 is carried by a user and moves along with the movement of the user. Consequently, when the terminal apparatus 1 enters the first communication range S1, which is a communication range that enables wireless communication with the information processing apparatus 2, the information processing apparatus 2 positioned at the center of the first communication range S1 and the terminal apparatus 1 become a wirelessly communicable state. When the terminal apparatus 1 moves along with the movement of the user to reach outside the first communication range S1, the terminal apparatus 1 and the information processing apparatus 2 become a wirelessly incommunicable state.

FIG. 25 illustrates two terminal apparatuses 1 (a terminal apparatus 1a and a terminal apparatus 1b) as an example. In the example illustrated in FIG. 25, the terminal apparatus 1a positioned outside the first communication range S1 cannot wirelessly communication with the information processing apparatus 2. In contrast, the terminal apparatus 1b positioned within the first communication range S1 can wirelessly communicate with the information processing apparatus 2.

The first communication range S1 is a range having the information processing apparatus 2 as the circle center and having the first distance L1, which is a maximum distance over which the terminal apparatus 1 and the information processing apparatus 2 can wirelessly communicate with each other, as the radius. The present embodiment will be described assuming that the first distance L1, which is the maximum wirelessly communicable distance, is 5 meters as described above.

The following describes a functional configuration of the terminal apparatus 1. FIG. 26 is a block diagram of a functional configuration example of the terminal apparatus 1. The following mainly describes functions about display processing executed by the terminal apparatus 1. The functional configuration in FIG. 26 is different from the configuration in FIG. 5 in the configuration of the controller 40.

The controller 40 includes the first determining unit 40A, the accepting unit 40B, and the display controller 40C. The display controller 40C includes a first display controller 40D and a second display controller 40E.

Part or the whole of the first determining unit 40A, the accepting unit 40B, the display controller 40C, the first display controller 405, and the second display controller 40E may be implemented by causing a processor such as the CPU 15 to execute computer programs (that is, software), implemented by hardware such as an integrated circuit (IC), or implemented by using both of them, for example.

The accepting unit 40B accepts instruction information from the user. The user operates the operating panel 11, thereby inputting various kinds of instructions. The operating panel 11 outputs instruction information indicating respective instruction contents indicated by operation instructions by the user to the accepting unit 40B.

In other words, in accordance with display contents displayed on the operating panel 11 and an instruction position by the user on the operating panel 11, the operating panel 11 outputs the instruction information corresponding to the display contents and the instruction position to the accepting unit 40B. The accepting unit 40B accepts the instruction information indicating the respective instruction contents indicated by the operation instructions by the user from the operating panel 11.

The display controller 40C performs control about the display of various kinds of screens and images on the operating panel 11. In the present embodiment, the display controller 40C includes the first display controller 40D and the second display controller 40E.

The first display controller 40D performs control to display various kinds of screens and images on the operating panel 11. In the present embodiment, the first display controller 40D performs control to display various kinds of screens such as the standard screen and the authentication screen and images on the operating panel 11.

The standard screen is a screen displayed first on the operating panel 11 after a locked state that does not accept any operation input on the operating panel 11 by the user, is released. The standard screen is the most basic screen among a plurality of screens prepared as screens displayed on the operating panel 11 of the terminal apparatus 1. On the standard screen, displayed is information that serves as the base of services that the terminal apparatus 1 can provide and the like. The standard screen may also be referred to as a home screen.

In the present embodiment, the standard screen is a screen that does not contain the authentication image 60. In contrast, the authentication screen is a screen that contains the authentication image 60. The first display controller 40D can perform control to also display various kinds of screens other than the standard screen and the authentication screen on the operating panel 11.

An example of the screen displayed on the operating panel 11 is similar to FIGS. 7(A) and 7(B), and a duplicate description will be omitted.

The display size of the authentication image 60 contained in the authentication screen 56 is a size that can be read by the reading device 6 that reads the authentication image 60.

The present embodiment will be described based on the premise that when the authentication image 60 is displayed on the operating panel 11, the first display controller 40D displays the authentication screen 56 containing the authentication image 60 on the operating panel 11. The first display controller 405 performs control to read the authentication screen 56 from the storage unit 42 and to display the authentication screen 56 on the operating panel 11, for example. With this processing, the operating panel 11 displays the authentication screen 56 containing the authentication image 60 (refer to FIG. 7(B)).

The timing when the first display controller 40D displays the authentication screen 56 on the operating panel 11 is not limited.

The present embodiment describes a case in which when a display instruction for the authentication image 60 is performed by an operation instruction on the operating panel 11 by the user, the first display controller 40D performs control to display the authentication screen 56 on the operating panel 11 as an example. In other words, in the present embodiment, when the display instruction information indicating the display instruction for the authentication image 60 is accepted from the operating panel 11 as the instruction information, the first display controller 40D performs control to display the authentication screen 56 on the operating panel 11.

Referring back to FIG. 26, the description continues. The authentication image 60 is an image indicating the authentication information and thus requires confidentiality. For this reason, in the present embodiment, the controller 40 includes the first determining unit 40A and the second display controller 40E.

The first determining unit 40A determines whether the authentication image 60 displayed on the operating panel 11 is made hidden based on a signal received from the information processing apparatus 2 via wireless communication by the wireless communication apparatus 13.

The signal received from the information processing apparatus 2 by the wireless communication apparatus 13 may contain authentication result information indicating an authentication result. The authentication result is a result of user authentication performed by the information processing apparatus 2 using the authentication information indicated by the authentication image 60 displayed on the operating panel 11. The authentication result information indicates successful authentication or failed authentication of the authentication information.

When the signal received from the information processing apparatus 2 by the wireless communication apparatus 13 contains the authentication result information indicating failed authentication, the signal may further contain information on the number of times of failures indicating the number of times of the failed authentication (the number of times of failed authentication). The present embodiment describes a case in which when the signal received by the wireless communication apparatus 13 contains the authentication result information indicating failed authentication, the signal also contains the information on the number of times of failures as an example.

The signal received from the information processing apparatus 2 by the wireless communication apparatus 13 does not necessarily contain the authentication result information. The signal received from the information processing apparatus 2 by the wireless communication apparatus 13 may be information (such as an acknowledgement (ACK) signal or a negative acknowledgement (NAK) signal) indicating a response to a signal transmitted from the terminal apparatus 1, for example. These signals do not contain the authentication result information.

In the present embodiment, the first determining unit 40A determines whether the signal received from the information processing apparatus 2 by the wireless communication apparatus 13 contains the authentication result information.

The first determining unit 40A determines that the displayed authentication image 60 is made hidden when the authentication result information contained in the signal indicates successful authentication.

The first determining unit 40A may determine that the authentication image 60 is made hidden when a time from when the operating panel 11 displays the authentication image 60 until when the signal containing the authentication result information is received is a predetermined elapsed time or more. This elapsed time may be predetermined and stored in the storage unit 42. This elapsed time may also be able to be changed as appropriate by an operation instruction on the operating panel 11 by the user or the like.

When the signal received from the information processing apparatus 2 by the wireless communication apparatus 13 contains the authentication result information indicating failed authentication, the first determining unit 40A may determine that the authentication image 60 is made hidden when the number of failures indicated by the information on the number of times of failures contained in the signal is a threshold or more. This threshold may be predetermined and stored in the storage unit 42. This threshold may also be able to be changed as appropriate by an operation instruction on the operating panel 11 by the user or the like.

The first determining unit 40A may determine that the displayed authentication image 60 is made hidden when the number of times of failures indicated by the information on the number of times of failures contained in the signal received from the information processing apparatus 2 by the wireless communication apparatus 13 is less than the threshold, and when not performing reauthentication is instructed by the user.

When not performing reauthentication is instructed by an operation instruction on the operating panel 11 by the user, for example, the operating panel 11 outputs instruction information indicating not performing reauthentication to the accepting unit 40B. The first determining unit 40A may determine that the displayed authentication image 60 is made hidden when the accepting unit 40B accepts the instruction information indicating not performing reauthentication.

The first determining unit 40A may determine that the authentication image 60 is made hidden when at least one condition is satisfied among that the authentication result information contained in the signal indicates successful authentication, that the time from when the authentication image 60 is displayed until when the signal containing the authentication result information is received is the elapsed time or more, that the number of times of failures indicated by the information on the number of times of failures contained in the signal is the threshold or more, and that the number of times of failures is less than the threshold and not performing reauthentication is instructed by the user.

The second display controller 40E performs control to make the displayed authentication image 60 hidden when it is determined by the first determining unit 40A that the authentication image 60 is made hidden. The second display controller 40E performs control to make the authentication image 60 displayed on the operating panel 11 hidden, for example.

In the present embodiment, the second display controller 40E performs control to display the standard screen 54 (FIG. 7(A)) on the operating panel 11 in place of the authentication screen 56 (FIG. 7(B)) displayed on the operating panel 11. The second display controller 40E performs control to read the standard screen 54 from the storage unit 42 and to display the standard screen 54 on the operating panel 11, for example.

With this processing, the operating panel 11 displays the standard screen 54, which is a screen not containing the authentication image 60, and thus the authentication image 60 is made hidden.

The authentication image 60 is an image to be read by the reading device 6. For this reason, owing to an error in reading the authentication image 60 by the reading device 6 or the like, authentication may fail by the information processing apparatus 2.

Given this situation, when the authentication result information contained in the signal received from the information processing apparatus 2 by the wireless communication apparatus 13 indicates failed authentication, the first display controller 40D preferably performs control to display the authentication image 60 displayed on the operating panel 11 in an enlarged view. Displaying in an enlarged view indicates that the display size of the authentication image 60 contained in the authentication screen 56 that the first display controller 40D has just displayed is enlarged than the display size being displayed.

When the authentication result information contained in the signal received from the information processing apparatus 2 by the wireless communication apparatus 13 indicates failed authentication, the first display controller 40D preferably displays a message image within the authentication screen 56 in a superimposed manner.

FIGS. 27(A) and 27(B) are schematic diagrams of an example of a screen transition of the operating panel 11. When the authentication result information contained in the signal received from the information processing apparatus 2 by the wireless communication apparatus 13 indicates failed authentication, for example, the first display controller 40D performs control to display an authentication screen 56B as the authentication screen 56 on the operating panel 11. The authentication screen 56B is a screen containing the symbolic images 58 and the authentication image 60 similarly to the authentication screen 56. The authentication screen 56B contains a message image 76 and a message image 77 as the message image within the screen. The message image 76 is an image of letters or the like indicating failed authentication. The message image 77 is an image of letters or the like indicating whether the reauthentication of the authentication information indicated by the displayed authentication image 60 is instructed.

It is assumed that the reauthentication of the authentication information has been instructed by an operation instruction on the operating panel 11 by the user. When the user operates a button image "YES" for instructing the reauthentication displayed on the authentication screen 56B, for example, the operating panel 11 outputs reauthentication instruction information for instructing the reauthentication of the authentication information to the accepting unit 40B. Upon acceptance of the reauthentication instruction information, the accepting unit 40B outputs the reauthentication instruction information to the first display controller 40D.

When the reauthentication instruction information has been accepted, the first display controller 40D may perform control to display the authentication image 60 displayed on the operating panel 11 in an enlarged view. As illustrated in FIG. 8(B), the first display controller 40D performs control to display the authentication screen 56 in which an authentication image 60B as the authentication image 60 contained in the authentication screen 56B as an authentication image 60C enlarged than the authentication image 60B is arranged within the authentication screen 56 on the operating panel 11, for example. With this processing, the operating panel 11 displays the authentication image 60 displayed in an enlarged view.

When the operating panel 11 is displaying the authentication image 60, the controller 40 of the terminal apparatus 1 may execute another application program other than a computer program about the processing to display the authentication image 60.

When the operating panel 11 is displaying the authentication image 60, the display controller 40C may perform processing to display a message indicating e-mail reception on the operating panel 11 caused by the execution of an application program that performs e-mail transmission and reception, for example.

In the present embodiment, the authentication screen 56 contains the symbolic images 58 together with the authentication image 60 (refer to FIG. 7(B)). Given this situation, when the operating panel 11 is displaying the authentication screen 56, any of the symbolic images 58 may be indicated by an operation instruction on the operating panel 11 by the user. In this case, the controller 40 of the terminal apparatus 1 executes an application program indicated by the indicated symbolic image 58. By this execution of the application program, the display controller 40C may perform processing to display various kinds of messages in line with the application program being executed on the operating panel 11.

Given this situation, in the present embodiment, when the operating panel 11 is displaying the authentication screen 56, when an execution instruction for an application program other than a computer program about the display of the authentication screen 56 is accepted, the first display controller 40D displays an execution image indicating the execution of the application program on the authentication image 60 in a superimposed manner. The first display controller 40D preferably performs control to make the execution image hidden when the execution of the application program is ended.

The execution instruction is output to the controller 40 when the user performs an operation instruction on the symbolic images 58 displayed on the operating panel 11 or when the controller 40 executes predetermined interruption processing or the like, for example. The first display controller 40D may perform the processing when the execution instruction is accepted when the authentication image 60 is being displayed.

Figure 28:
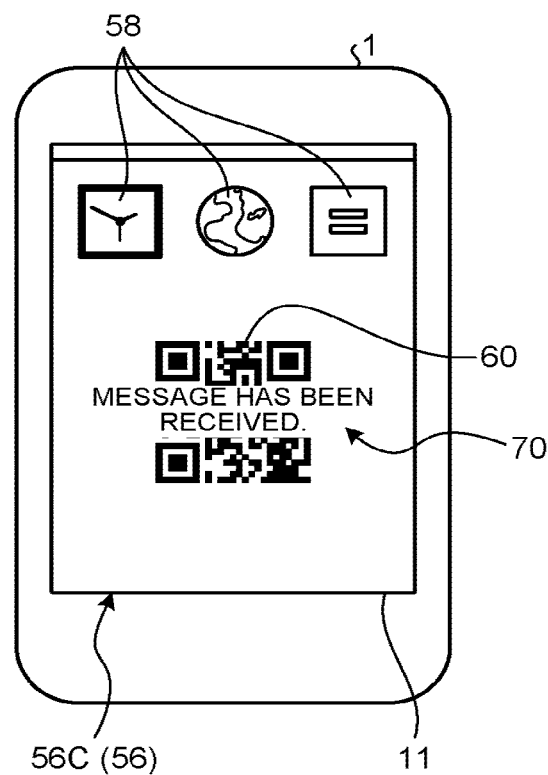
FIG. 28 is a schematic diagram of an example of an execution image according to the second embodiment.

FIG. 28 is a schematic diagram of an example of an execution image 70. When an execution instruction is accepted when the operating panel 11 is displaying the authentication image 60, the first display controller 40D preferably displays an authentication screen 56C with the execution image 70 illustrated in FIG. 28 superimposed on the operating panel 11, for example. In this process, the color of the authentication image 60 positioned behind the execution image 70 may be displayed while being adjusted to a color thinner than that when the execution image 70 is not superimposed.

The first display controller 40D may perform control to make the execution image 70 hidden when the execution of the application program is ended. The first display controller 40D may make the execution image 70 hidden by displaying the authentication screen 56 illustrated in FIG. 7(B) on the operating panel 11, for example.

The functional configuration of the information processing apparatus 2 is similar to FIG. 8 of the first embodiment, and its duplicate description will be omitted with reference to FIG. 8 using the same symbols.

In FIG. 8, when accepting the authentication result information from the authentication unit 62B, the communication controller 62C controls the wireless communication apparatus 28 so as to transmit a signal containing the accepted authentication result information.

Specifically, when accepting the authentication result information indicating successful authentication from the communication controller 62C, the communication controller 62C controls the wireless communication apparatus 28 so as to transmit a signal containing the authentication result information indicating successful authentication. In contrast, when accepting the authentication result information indicating failed authentication from the communication controller 62C, the communication controller 62C controls the wireless communication apparatus 28 so as to transmit a signal containing the authentication result information indicating failed authentication and the information on the number of times of failures accepted from the communication controller 62C.

Figure 29:
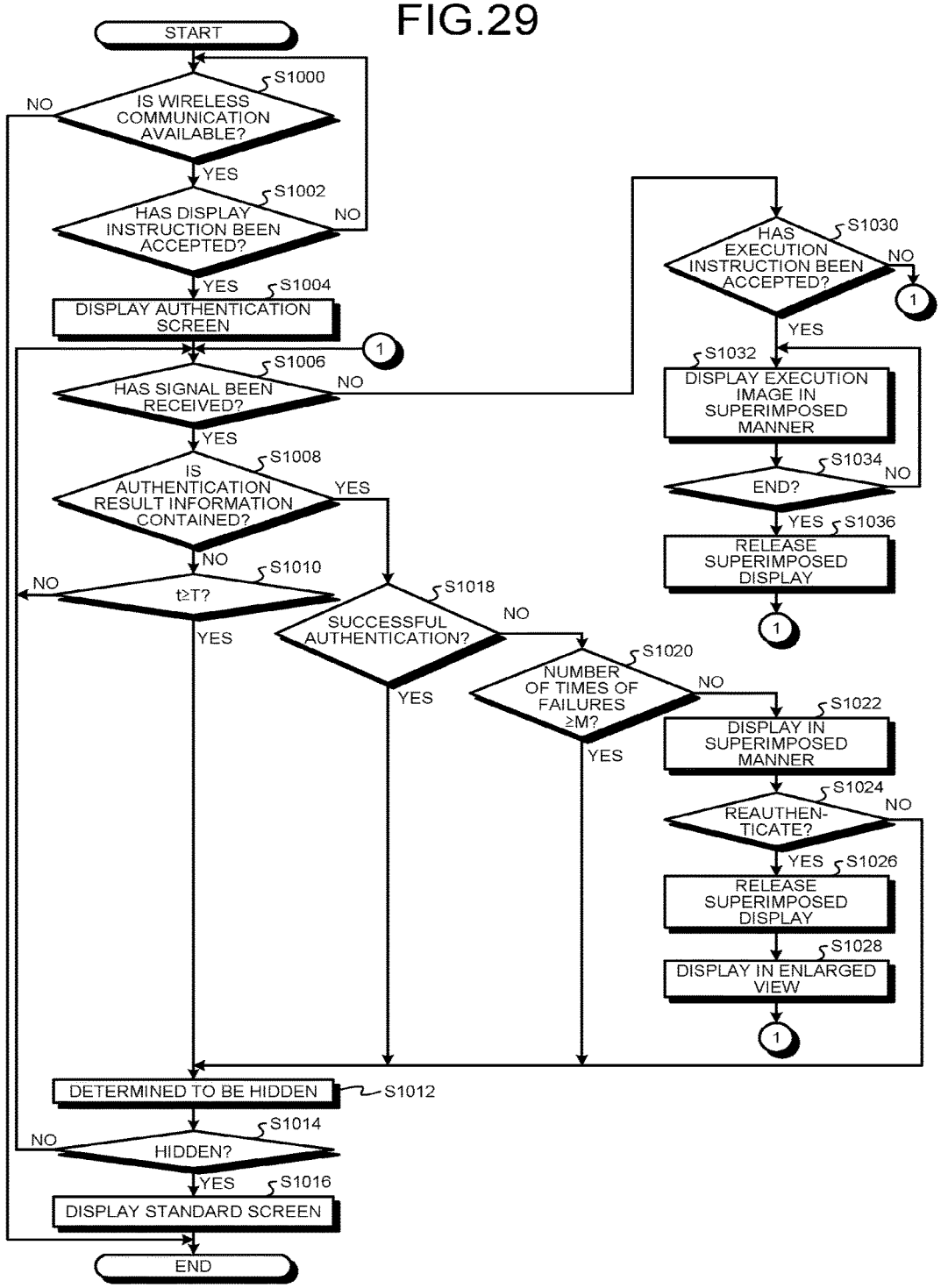
FIG. 29 is a flowchart of an example of a procedure of display processing according to the second embodiment.

FIG. 29 is a flowchart of an example of a procedure of display processing that the terminal apparatus 1 illustrated in FIG. 26 of the present embodiment executes.

First, the first determining unit 40A determines whether wireless communication is available with the information processing apparatus 2 (Step S1000). If it is determined to be negative at Step S300 (No at Step S1000), the present routine ends. The case when it is determined to be negative at Step S1000 is a case when the terminal apparatus 1 is positioned outside the first communication range S1.

If it is determined to be affirmative at Step S1000 (Yes at Step S1000), the process advances to Step S1002. The case when it is determined to be affirmative at Step S1000 is a case when the terminal apparatus 1 is positioned within the first communication range S1.

Next, the accepting unit 40B determines whether a display instruction for the authentication image 60 has been accepted from the operating panel 11 (Step S1002). If it is determined to be negative at Step S1002 (No at Step S1002), the process returns to Step S1000. If it is determined to be affirmative at Step S1002 (Yes at Step S1002), the process advances to Step S1004.

At Step S1004, the first display controller 40D performs control to display the authentication screen 56 on the operating panel 11 (Step S1004). With the processing at Step S1004, the operating panel 11 becomes a state in which the authentication image 60 is displayed (refer to FIG. 7(B)).

Next, the first determining unit 40A determines whether it has received a signal from the information processing apparatus 2 by the wireless communication apparatus 13 (Step S1006). If it is determined to be affirmative at Step S1006 (Yes at Step S1006), the process advances to Step S1008.

At Step S1008, the first determining unit 40A determines whether the signal received at Step S1006 contains the authentication result information (Step S1008). If the authentication result information is not contained, it is determined to be negative at Step S1008 (No at Step S1008), and the process advances to Step S1010.

At Step S1010, the second display controller 40E determines whether a time t from when the operating panel 11 displays the authentication screen 56 at Step S1004 is a predetermined elapsed time T or more (Step S1010). In other words, at Step S1010, the second display controller 40E determines whether the time t from when the operating panel 11 displays the authentication image 60 until when the signal containing the authentication result information is received is the predetermined elapsed time T or more.

If it is determined to be negative at Step S1010 (No at Step S1010), the process returns to Step S1006. If it is determined to be affirmative at Step S1010 (Yes at Step S1010), the process advances to Step S1012.

At Step S1012, the first determining unit 40A determines that the authentication image 60 is made hidden (Step S1012). If the first determining unit 40A determines that the authentication image 60 is made hidden (Yes at Step S1014), the process advances to Step S1016.

At Step S1016, the second display controller 40E performs control to make the authentication image 60 displayed on the operating panel 11 hidden (Step S1016). In the present embodiment, the second display controller 40E performs control to display the standard screen 54 (FIG. 7(A)) on the operating panel 11 in place of the authentication screen 56 (FIG. 7(B)) displayed on the operating panel 11. With this control, the second display controller 40E makes the authentication image 60 hidden. The present routine then ends.

If the first determining unit 40A does not determine that the authentication image 60 is made hidden (No at Step S1014), the process returns to Step S1006.

In contrast, if the first determining unit 40A determines that the signal received at Step S1006 contains the authentication result information at Step S1008 (Yes at Step S1008), the process advances to Step S1018.

At Step S1018, the first determining unit 40A determines whether the authentication result information contained in the signal received at Step S1006 indicates successful authentication (Step S1018). If the first determining unit 40A determines that the authentication result information indicates successful authentication (Yes at Step S1018), the process advances to Step S1012. In other words, the first determining unit 40A determines that the authentication image 60 is made hidden.

In contrast, if the first determining unit 40A determines that the authentication result information indicates failed authentication at Step S1018 (No at Step S1018), the process advances to Step S1020. At Step S1020, the first determining unit 40A determines whether the number of times of failures indicated by the information on the number of times of failures contained in the signal received at Step S1006 is a threshold M or more (Step S1020). M is an integer of 1 or more.

If the number of times of failures is the threshold M or more (Yes at Step S1020), the process advances to Step S1012. In other words, the first determining unit 40A determines that the authentication image 60 is made hidden.

If the number of times of failures is less than the threshold M (No at Step S1020), the process advances to Step S1022. At Step S1022, the first display controller 40D displays the message image 77 (refer to FIG. 27) on the authentication screen 56 in a superimposed manner (Step S1022). With the processing at Step S1022, the operating panel 11 displays the authentication screen 56B illustrated in FIG. 27.

Next, the first display controller 40D determines whether it has accepted the reauthentication instruction information for instructing the reauthentication of the authentication information from the operating panel 11 via the accepting unit 40B (Step S1024). If it is determined to be negative at Step S1024 (No at Step S1024), the process advances to Step S1012. In other words, the first determining unit 40A determines that the authentication image 60 is made hidden.

If it is determined that the reauthentication instruction information has been accepted (Yes at Step S1024), the process advances to Step S1026. At Step S1024, the first display controller 40D releases the superimposed display of the message image (refer to FIG. 27) (Step S1026). The first display controller 40D then performs control to display the authentication image 60 displayed on the operating panel 11 in an enlarged view (Step S1028). With the processing at Step S1028, the operating panel 11 displays the authentication screen 56 containing the enlarged authentication image 60C (refer to FIG. 27(B)). The process then returns to Step S1006.

In contrast, if the first determining unit 40A determines that no signal has been received from the information processing apparatus 2 by the wireless communication apparatus 13 at Step S1006 (No at Step S1006), the process advances to Step S1030.

At Step S1030, the accepting unit 40B determines whether it has accepted an execution instruction for an application program (Step S1030). At Step S1030, the accepting unit 40B determines whether the execution instruction for the application program indicated by any of the symbolic images 58 contained in the authentication screen 56 displayed on the operating panel 11 has been accepted. It is assumed that the user has indicated one display area of the symbolic images 58 contained in the authentication screen 56, for example. The operating panel 11 may then output the execution instruction for the application program indicated by the symbolic image 58 displayed at the indicated display area to the accepting unit 40B.

If the execution instruction has not been accepted (No at Step S1030), the process returns to Step S1006. In contrast, the execution instruction has been accepted (Yes at Step S1030), the process advances to Step S1032.

At Step S1032, the first display controller 40D displays the execution image displayed when the application program indicated by the execution instruction accepted at Step S1030 is being executed on the authentication screen 56 in a superimposed manner (Step S1032). With the processing at Step S1032, the operating panel 11 displays the authentication screen 56C with the execution image 70 superimposed (refer to FIG. 28), for example.

Next, the first display controller 40D determines whether the execution of the application program has been ended (Step S1034). If it is determined to be negative at Step S1034 (No at Step S1034), the process returns to Step S1032. In contrast, if it is determined to be affirmative at Step S1034 (Yes at Step S1034), the process advances to Step S1036.

At Step S1036, the first display controller 40D releases the superimposed display of the execution image (the execution image 70, for example) (Step S1036). With the processing at Step S1036, the operating panel 11 returns to a state in which the authentication screen 56 (refer to FIG. 7(B)) is displayed. The process then returns to Step S1036.

Figure 30:
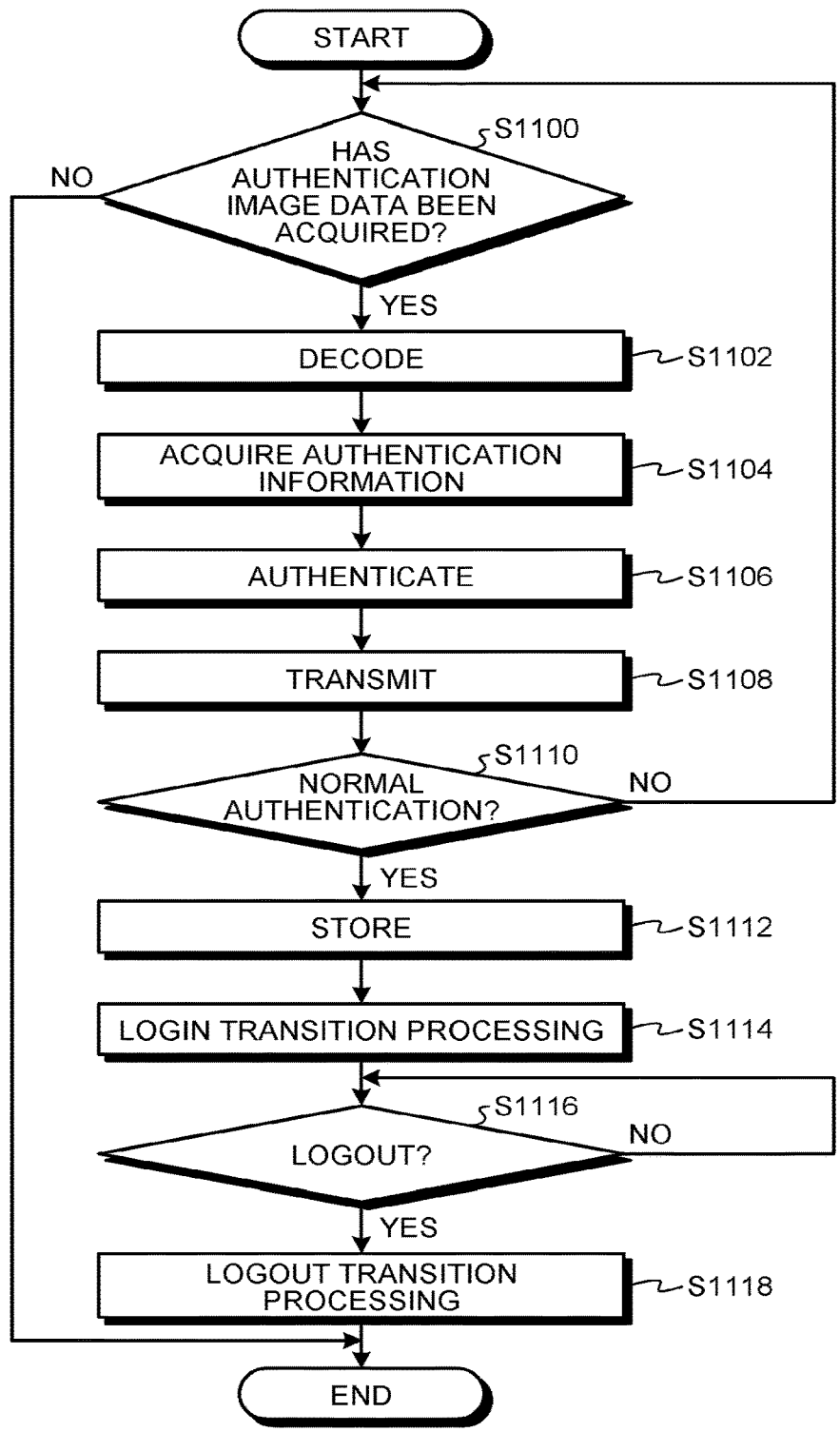
FIG. 30 is a flowchart of an example of a procedure of authentication processing according to the second embodiment.

The following describes an example of a procedure of authentication processing that the information processing apparatus 2 executes. FIG. 30 is a flowchart of an example of the procedure of the authentication processing executed by the information processing apparatus 2.

First, the second acquiring unit 62A determines whether it has acquired the authentication image data of the authentication image 60 from the reading device 6 (Step S1100). If it is determined to be negative at Step S1100 (No at Step S1100), the present routine ends. In contrast, if it is determined to be affirmative at Step S1100 (Yes at Step S1100), the process advances to Step S1102.

At Step S1102, the second acquiring unit 62A decodes the authentication image data acquired at Step S1100 using a known method (Step S1102). With this processing, the second acquiring unit 62A acquires the authentication information indicated by the authentication image 60 (Step S1104).

Next, the authentication unit 62B performs authentication using the authentication information acquired at Step S1104 (Step S1106)

Next, in the case of successful authentication, the authentication unit 62B controls the wireless communication apparatus 28 so as to transmit a signal containing the authentication result information indicating successful authentication to the terminal apparatus 1 as an authentication source (Step S1108). In the case of failed authentication, the authentication unit 62B controls the wireless communication apparatus 28 so as to transmit a signal containing the authentication result information indicating failed authentication and the information on the number of times of failures indicating the number of times of failures to the terminal apparatus 1 as the authentication source (Step S1108).

If the authentication at Step S1106 is failed authentication (No at Step S1110), the process returns to Step S1100. In contrast, if the authentication at Step S1106 is successful authentication (Yes at Step S1110), the user identification information contained in the authentication information used in the authentication is stored in the storage unit 66 (Step S1112).

The authentication unit 62B performs login transition processing (Step S1114). The login transition processing is processing to output the authentication information and the authority information to the controller 64 and to display an operation screen containing a button image for selecting the function of the information processing apparatus 2 indicated by the authority information contained in the result information accepted from the authentication server 3 on the operating panel 27.

Consequently, in the case of successful authentication, the operating panel 27 displays, for the user identified by the user identification information contained in the authentication information, the operation screen containing the button image that can instruct the execution of the function permitted to the user. In the case of successful authentication, the information processing apparatus 2 becomes able to execute the function the execution of which has been instructed by an operation on the operating panel 27 by the user by the engine unit 37.

Next, the authentication unit 62B determines whether logout has been instructed (Step S1116). The authentication unit 62B performs the determination at Step S1116 by determining whether logout has been instructed by the operation instruction on the operating panel 27 by the user, for example.

The authentication unit 62B repeats the negative determination (No at Step S1116) until it is determined to be affirmative at Step S1116 (Yes at Step S1116). If it is determined to be affirmative at Step S1116 (Yes at Step S1116), the process advances to Step S1118.

At Step S1118, the authentication unit 62B performs logout transition processing (Step S1118). The logout transition processing is processing to delete the user identification information stored in the storage unit 66 at Step S1112 from the storage unit 66. The logout transition processing also includes processing to display a login screen containing an entry field for receiving input of the user identification information of a new user on the operating panel 27.

Consequently, the information processing apparatus 2 makes a transition to a state (a logout state) that disables the execution of the function provided in the information processing apparatus 2 for the user identified by the user identification information used in the immediately preceding login transition processing. The present routine then ends.

As described above, the authentication system 1000 of the present embodiment includes the terminal apparatus 1 and the information processing apparatus 2. The information processing apparatus 2 acquires, from the read result of the authentication image 60 indicating authentication information, the authentication information. The terminal apparatus 1 includes the wireless communication apparatus 13 (the communication unit), the first display controller 40D, the first determining unit 40A, and the second display controller 40E.

The wireless communication apparatus 13 wirelessly communicates with the information processing apparatus 2. The first display controller 40D performs control to display the authentication image 60 on the operating panel (the display unit). The first determining unit 40A determines whether the displayed authentication image 60 is made hidden based on the signal received from the information processing apparatus 2 by wireless communication. The second display controller 40E performs control to make the displayed authentication image 60 hidden when it is determined that the authentication image 60 is made hidden.

In the authentication system 1000 of the present embodiment, the terminal apparatus 1 thus performs control to make the authentication image 60 displayed on the operating panel 11 hidden based on the signal received from the information processing apparatus 2 by wireless communication. Consequently, the authentication image 60 is prevented from being left displayed on the operating panel 11 continuously.

Consequently, the authentication system 1000 of the present embodiment can prevent the authentication image 60 from leaking.

The signal received from the information processing apparatus 2 can contain the authentication result information indicating successful authentication or failed authentication of the authentication information indicated by the authentication image 60. The first determining unit 40A can determine that the displayed authentication image 60 is made hidden when the authentication result information contained in this signal indicates successful authentication.

The first determining unit 40A can determine that the displayed authentication image 60 is made hidden when a time from when the operating panel 11 (the display unit) displays the authentication image 60 until when the signal containing the authentication result information is received is a predetermined elapsed time or more.

The first display controller 40D can perform control to display the displayed authentication image 60 in an enlarged view when the authentication result information contained in the signal received from the information processing apparatus 2 indicates failed authentication.

The terminal apparatus 1 can include the accepting unit 40B that accepts the reauthentication instruction information for instructing the reauthentication of the authentication information. The first display controller 40D can perform control to display the displayed authentication image 60 in an enlarged view when the authentication result information contained in this signal indicates failed authentication, and when the reauthentication instruction information has been accepted.

The signal can contain the authentication result information indicating failed authentication and the information on the number of times of failures indicating the number of times of failed authentication. The first determining unit 40A can determine that the displayed authentication image 60 is made hidden when the number of tomes of failures indicated by the information on the number of times of failures contained in the signal is a threshold or more.

The first display controller 40D can display the standard screen 54 containing the authentication image 60 and the symbolic images 58 indicating application programs for executing predetermined functions on the operating panel 11 (the display unit). The first display controller 40D can perform control to, when an execution instruction for an application program indicated by any of the symbolic images 58 is accepted, display the execution image 70 indicating the execution of the application program on the authentication image 60 in a superimposed manner and, when the execution of the application program is ended, to make the execution image 70 hidden.

Second Embodiment

The present embodiment describes an embodiment in which the first determining unit 40A determines whether the authentication image 60 is made hidden further using a plurality of conditions from the signal received from the information processing apparatus 2 by wireless communication.

Figure 31:
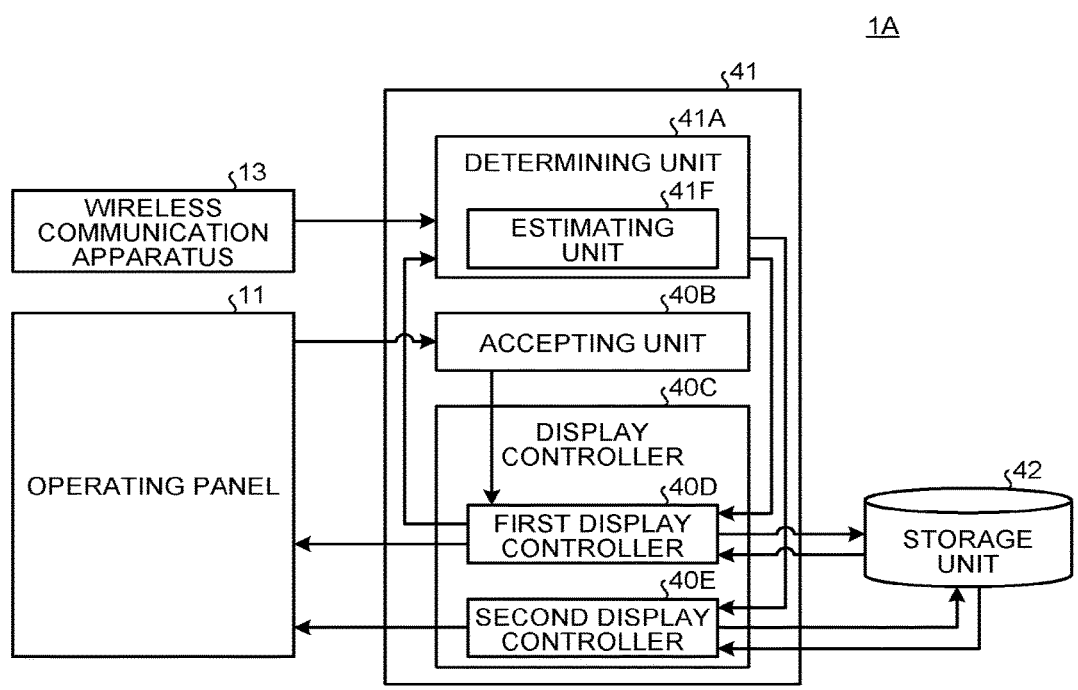
FIG. 31 is a block diagram of a functional configuration example of the terminal apparatus according to the second embodiment.

FIG. 31 is a block diagram of a functional configuration example of the terminal apparatus 1A.

The terminal apparatus 1A includes the wireless communication apparatus 13, the operating panel 11, a controller 41, and the storage unit 42. The wireless communication apparatus 13, the operating panel 11, and the storage unit 42 are connected to the controller 41 so as to enable data and the like to be exchanged therewith. The storage unit 42 stores therein various kinds of data. The storage unit 42 is implemented by the SSD 18, for example. The terminal apparatus 1A is similar to the terminal apparatus 1 of the first embodiment except that it includes the controller 41 in place of the controller 40.

The controller 41 controls the entire terminal apparatus 1A. The controller 41 is implemented by the CPU 15, the ROM 16, the RAM 17, and the like. The controller 41 may be implemented by a circuit and the like.

The controller 41 includes a determining unit 41A, the accepting unit 40B, and the display controller 40C. The display controller 40C includes the first display controller 40D and the second display controller 40E. Part or the whole of the determining unit 41A, the accepting unit 40B, the display controller 40C, the first display controller 40D, and the second display controller 40E may be implemented by causing a processor such as the CPU 15 to execute computer programs (that is, software), implemented by hardware such as an IC, or implemented by using both of them, for example.

The controller 41 is similar to the controller 40 of the first embodiment except that it includes the determining unit 41A in place of the first determining unit 40A.

The determining unit 41A has functions similar to those of the first determining unit 40A of the first embodiment. In other words, the determining unit 41A determines that the authentication image 60 is made hidden when at least one condition is satisfied among that the authentication result information contained in the signal received from the information processing apparatus 2 by wireless communication indicates successful authentication, that the time from when the authentication image 60 is displayed until when the signal containing the authentication result information is received is the elapsed time T or more, that the number of times of failures indicated by the information on the number of times of failures contained in the signal is the threshold M or more, and that the number of times of failures is less than the threshold M and not performing reauthentication is instructed by the user.

In the present embodiment, the determining unit 41A further determines that the authentication image 60 is made hidden also when any of the following conditions is satisfied.

In the present embodiment, the determining unit 41A includes an estimating unit 41F. The estimating unit 41F estimates the distance between the terminal apparatus 1A that installs the determining unit 41A and the information processing apparatus 2 based on the signal received from the information processing apparatus 2 by the wireless communication apparatus 13.

The estimating unit 41F estimates the distance between the terminal apparatus 1A and the information processing apparatus 2 from the signal intensity of the received signal, for example.

The determining unit 41A determines that the displayed authentication image 60 is made hidden when the distance estimated by the estimating unit 41F is a second distance or more. The second distance is a distance less than a first distance that is a maximum wirelessly communicable distance with the information processing apparatus 2. The first distance is similar to that of the first embodiment.

An example of the wireless communication range is the same as the schematic diagram in FIG. 6 of the first embodiment, and a description thereof will be given below with reference to FIG. 6 while omitting a duplicate description.

In the present embodiment, in FIG. 6, the estimating unit 41F of the terminal apparatus 1A estimates the distance between the terminal apparatus 1A and the information processing apparatus 2 from the signal intensity of the signal received from the information processing apparatus 2 by wireless communication. Consequently, estimation by the estimating unit 41F can obtain information (distance) that can estimate whether the terminal apparatus 1A is positioned outside the first communication range S1, is positioned within the second communication range S2, is positioned outside the second communication range S2, or is positioned within the second communication range S2.

Referring back to FIG. 31, the determining unit 41A determines that the displayed authentication image 60 is made hidden when the distance that the estimating unit 41F has estimated is the second distance or more. When it is estimated to be the second distance or more, the terminal apparatus 1A is positioned within the second communication range S2 of the information processing apparatus 2. Consequently, the determining unit 41A determines that the displayed authentication image 60 is made hidden when it is determined that the terminal apparatus 1A is positioned outside the second communication range S2 of the information processing apparatus 2 based on the distance that the estimating unit 41F has estimated.

The determining unit 41A may determine that the displayed authentication image 60 is made hidden when it is determined that the wireless communication with the information processing apparatus 2 is disabled. The determining unit 41A determines that the wireless communication is disabled when the wireless communication apparatus 13 does not receive the signal transmitted from the information processing apparatus 2 for a certain time or more, for example.

Figure 32:
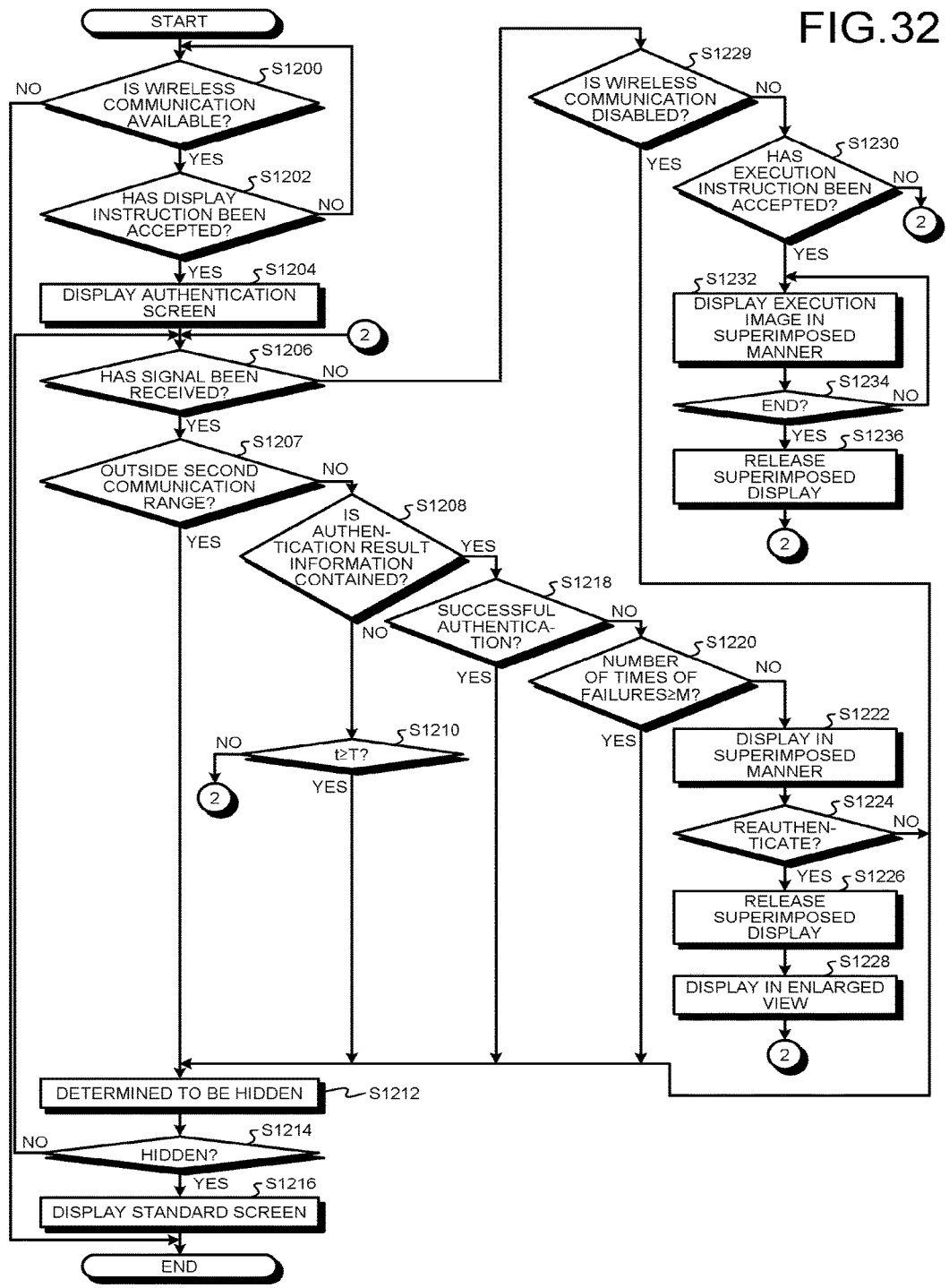
FIG. 32 is a flowchart of an example of the procedure of the display processing according to the second embodiment.

The following describes display processing that the terminal apparatus 1A of the present embodiment executes. FIG. 32 is a flowchart of an example of a procedure of the display processing that the terminal apparatus 1A of the present embodiment executes.

The terminal apparatus 1A performs pieces of processing at Step S1200 to Step S1206 similarly to Step S1000 to Step S1006 (refer to FIG. 29) in the terminal apparatus 1 of the first embodiment.

First, the determining unit 41A determines whether wireless communication is available with the information processing apparatus 2 (Step S1200). If it is determined to be negative at Step S1200 (No at Step S1200), the present routine ends.

If it is determined to be affirmative at Step S1200 (Yes at Step S1200), the process advances to Step S1202. Next, the accepting unit 40B determines whether it has accepted a display instruction for the authentication image 60 from the operating panel 11 (Step S1202). If it is determined to be negative at Step S1202 (No at Step S1202), the process returns to Step S1200. If it is determined to be affirmative at Step S1202 (Yes at Step S1202), the process advances to Step S1204.

At Step S1204, the first display controller 40D performs control to display the authentication screen 56 on the operating panel 11 (Step S1204). Next, the determining unit 41A determines whether it has received a signal from the information processing apparatus 2 by the wireless communication apparatus 13 (Step S1206). If it is determined to be affirmative at Step S506 (Yes at Step S1206), the process advances to Step S1207.

In the present embodiment, at Step S1207, the determining unit 41A determines whether the terminal apparatus 1A is positioned outside the second communication range S2 (Step S1207). At Step S1207, the estimating unit 41F estimates the distance to the information processing apparatus 2 from the signal intensity of the signal received at Step S1206. The determining unit 41A then determines that the terminal apparatus 1A is positioned outside the second communication range S2 when the distance that the estimating unit 41F has estimated is the second distance or more.

If it is determined to be affirmative at Step S1207 (Yes at Step S1207), the process advances to Step S1212. At Step S1212, the determining unit 41A determines that the authentication image 60 is made hidden similarly to Step S1012 (refer to FIG. 29) (Step S1212). If the determining unit 41A determines that the authentication image 60 is made hidden (Yes at Step S1214), the process advances to Step S1216.

At Step S1216, the second display controller 40E performs control to make the authentication image 60 displayed on the operating panel 11 hidden (Step S1216). The processing at Step S1216 is similar to that at Step S1014 (refer to FIG. 29). With this processing, the second display controller 40E makes the authentication image 60 hidden. The present routine then ends.

If the determining unit 41A does not determine that the authentication image 60 is made hidden (No at Step S1214), the process returns to Step S1206.

In contrast, if it is determined to be negative at Step S1207 (No at Step S1207), the process advances to Step S1208. The case when it is determined to be negative at Step S1207 is a case when the terminal apparatus 1A is positioned within the first communication range S1 and within the second communication range S2.

In the terminal apparatus 1A, the controller 41 executes pieces of processing at Step S1208, Step S1210, and Step S1218 to Step S1228 similarly to Step S1008, Step S1010, and Step S1018 to Step S1028 (refer to FIG. 29) of the first embodiment.

In contrast, if it is determined to be negative at Step S1206 (No at Step S1206), the process advances to Step S1229 in the present embodiment. At Step S1229, the determining unit 41A determines whether the wireless communication with the information processing apparatus 2 is disabled. (Step S1229)

If it is determined to be affirmative at Step S1229 (Yes at Step S1229), the process advances to Step S1212. In contrast, if it is determined to be negative at Step S1229 (No at Step S1229), the process advances to Step S1230.

The terminal apparatus 1A executes pieces of processing at Step S1230 to Step S1236 similarly to Step S1030 to Step S1036 (refer to FIG. 29) of the first embodiment.

As described above, the authentication system 1000A of the present embodiment can include the terminal apparatus 1A in place of the terminal apparatus 1 in the authentication system 1000 of the first embodiment. The terminal apparatus 1A includes the controller 41 in place of the controller 40 of the first embodiment. The controller 41 is the same as the controller 40 except that it includes the determining unit 41A in place of the first determining unit 40A.

The determining unit 41A includes the estimating unit 41F. The estimating unit 41F estimates the distance between the terminal apparatus 1A and the information processing apparatus 2 based on the signal that the wireless communication apparatus 13 has received from the information processing apparatus 2. The determining unit 41A determines that the displayed authentication image 60 is made hidden when the estimated distance is the second distance L2, which is less the first distance L1, which is the maximum wirelessly communicable distance with the information processing apparatus 2, or more.

Consequently, the authentication system 1000A of the present embodiment can prevent the authentication image 60 from leaking similarly to the first embodiment.

The determining unit 41A may determine that the displayed authentication image 60 is made hidden when it is determined that the wireless communication with the information processing apparatus 2 is disabled.

Various kinds of information stored in the information processing apparatus 2 of the embodiment in advance may be stored in the authentication server 3, the print server 4, a storage medium such as an external hard disk drive, an external apparatus (not illustrated), or the like connected to the network 7.

As a matter of course, the system configuration in which the main body 30 and the operating unit 20 are connected to each other in the information processing apparatus 2 described in the embodiment is an example, and there are various system configuration examples in accordance with uses and objects.

According to the present embodiments, it is possible to improve the operability of the terminal apparatus when the authentication image is displayed.

Furthermore, according to the present embodiments, it is possible to prevent the authentication image from leaking.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An authentication system comprising:
an information processing apparatus configured to acquire, from a read result of an authentication image indicating authentication information, the authentication information; and
a terminal apparatus configured to communicate with the information processing apparatus,
the terminal apparatus comprising:
a communication unit, implemented by circuitry, configured to perform wireless communication with the information processing apparatus,
an accepting unit, implemented by the circuitry, configured to accept release instruction information indicating release of a locked state that restricts operation by a user, and
a display controller, implemented by the circuitry, configured to perform control to display an authentication screen containing the authentication image on a display when the terminal apparatus is positioned within a communication range that enables wireless communication with the information processing apparatus and when the release instruction information has been accepted.

2. The authentication system according to claim 1, wherein the authentication screen contains symbolic images indicating application programs for executing predetermined functions.

3. The authentication system according to claim 2, wherein
the terminal apparatus comprises:
a memory configured to store therein setting information that associates the symbolic images arranged on a standard screen not containing the authentication image, display position information indicating display positions of the symbolic images on the standard screen, and display size information of the symbolic images with each other and display size information of the authentication image, and
a decider, implemented by the circuitry, configured to decide display positions of the symbolic images and the authentication image on the authentication screen based on the setting information and the display size information of the authentication image, wherein
the display controller performs control to display the authentication screen in which the symbolic images and the authentication image are arranged at the decided display positions on the display.

4. The authentication system according to claim 3, wherein
the decider comprises:
a second determining unit configured to determine whether there is any vacant area for arranging the authentication image on the standard screen based on the setting information and the display size information of the authentication image, and
a setting unit configured to, when it is determined that there is no vacant area, set at least one of the symbolic images in the setting information to be hidden from the authentication screen so as to enable the authentication image to be arranged, wherein
the display controller displays the authentication screen in which the symbolic images other than the symbolic images set to be hidden in the setting information and the authentication image are arranged on the display.

5. The authentication system according to claim 4, wherein
when it is determined that there is a vacant area, the setting unit sets the vacant area on the standard screen as a display position of the authentication image on the authentication screen, and
the display controller displays the authentication screen in which the symbolic images are arranged in the setting information at display positions indicated by the corresponding display position information and the authentication image is arranged at the display position set by the setting unit on the display.

6. The authentication system according to claim 1, wherein
the authentication information contains one or a plurality of types of user identification information, and
the terminal apparatus comprises:
a first acquiring unit, implemented by the circuitry, configured to acquire a data amount of the authentication information and type information indicating a type of the user identification information contained in the authentication information from the information processing apparatus, a calculating unit, implemented by the circuitry, configured to calculate display size information of the authentication image in accordance with the data amount, and a generating unit, implemented by the circuitry, configured to generate the authentication image indicating the authentication information containing the user identification information of a type of the type information.

7. The authentication system according to claim 1, wherein the information processing apparatus comprises:

a second acquiring unit, implemented by information processing circuitry, configured to acquire the authentication information containing user identification information, an authentication unit, implemented by the information processing circuitry, configured to authenticate whether execution of a function provided in the information processing apparatus is permitted for a user identified by the user identification information, an accepting unit, implemented by the information processing circuitry, configured to accept an operation instruction from a user, a first detector, implemented by the information processing circuitry, configured to detect whether the terminal apparatus has entered the communication range, a second detector, implemented by the information processing circuitry, configured to detect whether the terminal apparatus is positioned within a second communication range in which a distance from the information processing apparatus is equal to or less than a threshold and which is narrower than the communication range that enables wireless communication with the information processing apparatus, and a second determining unit, implemented by the information processing circuitry, configured to determine presence or absence of a user who is permitted to execute the function provided in the information processing apparatus when an entrance of the terminal apparatus to the communication range has been detected, the authentication unit disables the execution of the function for the permitted user when it is detected that the terminal apparatus has entered the communication range, when it is determined that the user who is permitted to execute the function is present, when the terminal apparatus is positioned within the second communication range, and when acceptance of the operation instruction is absent for a predetermined time or more, and the second acquiring unit acquires the authentication information from a read result of a reading device that reads the authentication image after the execution of the function for the user has been disabled.

8. The authentication system according to claim 1, wherein the terminal apparatus comprises:

a first display controller, implemented by the circuitry, configured to perform control to display the authentication image on the display, a determining unit, implemented by the circuitry, configured to determine whether the displayed authentication image is made hidden based on a signal received from the information processing apparatus by the wireless communication, and a second display controller, implemented by the circuitry, configured to perform control to make the displayed authentication image hidden when it is determined that the displayed authentication image is made hidden.

9. The authentication system according to claim 8, wherein the signal contains authentication result information indicating successful authentication or failed authentication of the authentication information indicated by the authentication image, and the determining unit determines that the displayed authentication image is made hidden when the authentication result information contained in the signal indicates successful authentication.

10. The authentication system according to claim 8, wherein the determining unit determines that the displayed authentication image is made hidden when a time from when the display displays the authentication image until when the signal containing the authentication result information is received is a predetermined elapsed time or more.

11. The authentication system according to claim 8, wherein the first display controller performs control to display the displayed authentication image in an enlarged view when the authentication result information contained in the signal indicates failed authentication.

12. The authentication system according to claim 11, further comprising an accepting unit, implemented by the circuitry, configured to accept reauthentication instruction information for instructing reauthentication of the authentication information, wherein the first display controller performs control to display the displayed authentication image in an enlarged view when the authentication result information contained in the signal indicates failed authentication, and when the reauthentication instruction information has been accepted.

13. The authentication system according to claim 8, wherein the signal contains the authentication result information indicating failed authentication and information on the number of times of failures indicating the number of times of failed authentication, and the determining unit determines that the displayed authentication image is made hidden when the number of times of failures indicated by the information on the number of times of failures contained in the signal is equal to or greater than a threshold.

14. The authentication system according to claim 8, wherein the determining unit comprises an estimating unit configured to estimate a distance between the terminal apparatus and the information processing apparatus based on the signal, and the determining unit determines that the displayed authentication image is made hidden when the estimated distance is a second distance or more, the second distance being less than a first distance that is a maximum wirelessly communicable distance with the information processing apparatus.

15. The authentication system according to claim 1, wherein the display controller performs control to display a standard screen not containing the authentication image on the display after receiving the release instruction, and display the authentication screen on the display when the terminal apparatus is positioned within a second communication range in which a distance from the information processing apparatus is equal to or less than a threshold and which is narrower than the communication range that enables wireless communication with the information processing apparatus during display of the standard screen.

16. The authentication system according to claim 1, further comprising:
a first determining unit, implemented by the circuitry, configured to determine whether the terminal apparatus is positioned within a second communication range in which a distance from the information processing apparatus is equal to or less than a threshold and which is narrower than the communication range that enables wireless communication with the information processing apparatus, wherein
the display controller performs control to display the authentication screen containing the authentication image on the display when the terminal apparatus is positioned within the second communication range and when the release instruction information has been accepted.

17. A terminal apparatus comprising:
circuitry configured to
perform wireless communication with an information processing apparatus that acquires, from a read result of an authentication image indicating authentication information, the authentication information,
accept release instruction information indicating release of a locked state that restricts operation by a user, and
perform control to display an authentication screen containing the authentication image on a display when the terminal apparatus is positioned within a communication range that enables wireless communication with the information processing apparatus and when the release instruction information has been accepted.

18. An authentication method performed by a terminal apparatus, the method comprising:
performing wireless communication with an information processing apparatus that acquires, from a read result of an authentication image indicating authentication information, the authentication information;
accepting release instruction information indicating release of a locked state that restricts operation by a user; and
performing control to display an authentication screen containing the authentication image on a display when the terminal apparatus is positioned within a communication range that enables wireless communication with the information processing apparatus and when the release instruction information has been accepted.

* * * * *